United States Patent
Iqbal et al.

(10) Patent No.: US 12,356,184 B2
(45) Date of Patent: *Jul. 8, 2025

(54) SYSTEMS AND METHODS FOR DETECTED-CAPABILITY-BASED AUTHENTICATION OF A MOBILE DEVICE FOR PERFORMING AN ACCESS OPERATION WITH A LOCAL DEVICE

(71) Applicant: Capital One Services, LLC, McLean, VA (US)

(72) Inventors: Mohammed Zafar Iqbal, McLean, VA (US); Kevin Rosengren, Richmond, VA (US); Max Doerfler, Richmond, VA (US); Brian DeLuca, Midlothian, VA (US); Anurag Joshi, Glen Allen, VA (US); James Dillon, Midlothian, VA (US); Richie Hollins, Mechanicsville, VA (US); Jamie Warder, Bethesda, MD (US); William A. Hodges, Mechanicsville, VA (US); Ken Allen, Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 31 days.

This patent is subject to a terminal disclaimer.

(21) Appl. No.: 18/496,831

(22) Filed: Oct. 27, 2023

(65) Prior Publication Data
US 2025/0142325 A1     May 1, 2025

Related U.S. Application Data

(63) Continuation of application No. 17/343,241, filed on Jun. 9, 2021, now Pat. No. 11,829,988, which is a
(Continued)

(51) Int. Cl.
*H04W 12/06*     (2021.01)
*G06F 21/31*     (2013.01)
(Continued)

(52) U.S. Cl.
CPC ............ *H04W 12/06* (2013.01); *G06F 21/31* (2013.01); *G06Q 20/1085* (2013.01);
(Continued)

(58) Field of Classification Search
None
See application file for complete search history.

(56) References Cited

U.S. PATENT DOCUMENTS 5,608,778 A * 3/1997 Partridge, III ............ G07F 7/02
                                                              348/E7.063
5,668,876 A * 9/1997 Falk ....................... H04L 9/3226
                                                                      705/72
(Continued)

FOREIGN PATENT DOCUMENTS

EP             2976706 A2 * 1/2016 ............. G06F 21/31
WO    WO-2023212038 A1 * 11/2023 ........... H04L 9/3213

OTHER PUBLICATIONS

Chean et al "Authentication Scheme using Unique Identification Method with Homomorphic Encryption in Mobile Cloud Computing," IEEE, pp. 195-200 (Year: 2018).*
(Continued)

*Primary Examiner* — Luu T Pham
*Assistant Examiner* — James J Wilcox
(74) *Attorney, Agent, or Firm* — Foley & Lardner LLP

(57) ABSTRACT

In some embodiments, based on a wireless signal of a mobile device (e.g., obtained by a local device) the mobile device and a first authentication capability of the mobile device may be detected. Based on the detection of the mobile device, the mobile device may present access initia-
(Continued)

tion options on a user interface of the mobile device. Based on a selection of a first option of the access initiation options via the user interface to initiate an access request for an access operation with the local device, an authentication request may be generated, where the authentication request is associated with the first authentication capability and with a first authentication tier. For example, the authentication request may be generated based on (i) the first authentication capability being detected as an authentication capability of the mobile device and (ii) the first authentication tier corresponding to an access amount of the access request.

15 Claims, 17 Drawing Sheets

Related U.S. Application Data continuation of application No. 16/569,658, filed on Sep. 12, 2019, now abandoned, which is a continuation of application No. 14/680,857, filed on Apr. 7, 2015, now Pat. No. 10,430,779.

(60) Provisional application No. 62/102,857, filed on Jan. 13, 2015, provisional application No. 61/976,703, filed on Apr. 8, 2014.

(51) Int. Cl.
- *G06Q 20/10* (2012.01)
- *G07F 19/00* (2006.01)
- *H04W 12/63* (2021.01)

(52) U.S. Cl.
CPC .............. *G07F 19/00* (2013.01); *G07F 19/20* (2013.01); *H04W 12/63* (2021.01)

(56) References Cited

U.S. PATENT DOCUMENTS

| | | | | |
|---|---|---|---|---|
| 5,850,445 A * | 12/1998 | Chan | H04W 12/35 | 380/247 |
| 5,970,144 A * | 10/1999 | Chan | H04W 12/041 | 713/168 |
| 6,167,279 A * | 12/2000 | Chang | H04W 92/02 | 455/560 |
| 6,338,140 B1 * | 1/2002 | Owens | H04L 63/0846 | 713/168 |
| 6,418,129 B1 * | 7/2002 | Fingerhut | H04W 12/03 | 370/328 |
| 6,477,370 B1 * | 11/2002 | Sigler | H04B 7/18567 | 455/512 |
| 6,931,538 B1 * | 8/2005 | Sawaguchi | G06F 21/35 | 705/41 |
| 7,058,180 B2 * | 6/2006 | Ferchichi | H04W 12/06 | 713/172 |
| 7,277,726 B2 * | 10/2007 | Ahya | H04W 24/00 | 455/418 |
| 7,305,090 B1 * | 12/2007 | Hayes | H04L 9/3226 | 380/247 |
| 7,421,155 B2 * | 9/2008 | King | G06F 40/134 | 707/E17.085 |
| 7,493,289 B2 * | 2/2009 | Verosub | G06Q 30/0601 | 713/168 |
| 7,577,847 B2 * | 8/2009 | Nguyen | G07F 17/3223 | 380/231 |
| 7,620,008 B1 * | 11/2009 | Hayes | H04W 12/069 | 370/328 |
| 7,669,232 B2 * | 2/2010 | Jou | H04L 63/08 | 380/247 |
| 7,712,657 B1 * | 5/2010 | Block | G06Q 40/00 | 902/8 |
| 7,812,860 B2 * | 10/2010 | King | H04N 1/00381 | 348/210.99 |
| 7,865,937 B1 * | 1/2011 | White | G06Q 20/3674 | 713/184 |
| 7,882,247 B2 * | 2/2011 | Sturniolo | H04L 63/164 | 709/228 |
| 7,882,538 B1 * | 2/2011 | Palmer | G06F 21/31 | 713/153 |
| 7,992,776 B1 * | 8/2011 | Ramachandran | G06Q 20/385 | 235/492 |
| 8,025,226 B1 * | 9/2011 | Hopkins, III | B60R 25/00 | 235/384 |
| 8,032,115 B1 * | 10/2011 | Breau | H04W 12/06 | 455/418 |
| 8,051,453 B2 * | 11/2011 | Arseneau | H04N 21/8173 | 725/94 |
| 8,081,849 B2 * | 12/2011 | King | G06V 30/142 | 382/307 |
| 8,145,561 B1 * | 3/2012 | Zhu | G06Q 20/326 | 455/410 |
| 8,146,802 B1 * | 4/2012 | Ramachandran | G06Q 20/352 | 705/40 |
| 8,179,563 B2 * | 5/2012 | King | G06F 40/284 | 358/1.6 |
| 8,181,856 B1 * | 5/2012 | Folk | G06Q 40/02 | 235/487 |
| 8,201,232 B2 * | 6/2012 | Zhang | G06F 21/31 | 380/270 |
| 8,255,411 B1 * | 8/2012 | Carpenter | G06F 16/248 | 707/765 |
| 8,261,094 B2 * | 9/2012 | King | G06F 21/606 | 713/168 |
| 8,271,786 B1 * | 9/2012 | Pradhan | G06Q 20/3278 | 713/168 |
| 8,280,351 B1 * | 10/2012 | Ahmed | H04W 12/08 | 455/433 |
| 8,296,228 B1 * | 10/2012 | Kloor | G06Q 20/04 | 705/26.1 |
| 8,313,020 B2 * | 11/2012 | Ramachandran | G07F 19/20 | 705/42 |
| 8,346,620 B2 * | 1/2013 | King | G06Q 30/02 | 707/E17.022 |
| 8,346,672 B1 * | 1/2013 | Weiner | G06Q 20/425 | 705/64 |
| 8,370,254 B1 * | 2/2013 | Hopkins, III | G06Q 40/08 | 705/35 |
| 8,370,917 B1 * | 2/2013 | Hayes | H04L 63/0823 | 713/153 |
| 8,392,712 B1 * | 3/2013 | Wilson | H04L 63/08 | 713/175 |
| 8,418,055 B2 * | 4/2013 | King | G06V 30/224 | 707/711 |
| 8,442,331 B2 * | 5/2013 | King | G06Q 20/102 | 382/229 |
| 8,447,066 B2 * | 5/2013 | King | H04N 1/00875 | 382/100 |
| 8,489,624 B2 * | 7/2013 | King | G06Q 30/00 | 707/758 |
| 8,490,868 B1 * | 7/2013 | Kropf | G07F 19/211 | 235/382 |
| 8,505,090 B2 * | 8/2013 | King | G06Q 30/0601 | 382/229 |
| 8,536,976 B2 * | 9/2013 | Headley | G06F 21/34 | 340/5.82 |
| 8,566,248 B1 * | 10/2013 | Steele | G06Q 10/00 | 705/325 |
| 8,566,404 B2 * | 10/2013 | Wu | H04L 51/04 | 709/206 |
| 8,577,804 B1 * | 11/2013 | Bacastow | G06Q 20/204 | 235/380 |
| 8,584,225 B1 * | 11/2013 | Kennedy | H04L 67/34 | 726/10 |
| 8,611,919 B2 * | 12/2013 | Barnes, Jr. | H04M 1/724 | 455/456.1 |
| 8,613,070 B1 * | 12/2013 | Borzycki | H04L 67/104 | 726/8 |

(56) References Cited

U.S. PATENT DOCUMENTS

| | | | | |
|---|---|---|---|---|
| 8,620,083 B2 * | 12/2013 | King | G06V 30/413 | 345/468 |
| 8,621,583 B2 * | 12/2013 | Yang | H04L 63/083 | 713/182 |
| 8,626,659 B1 * | 1/2014 | Bowman | G06Q 20/10 | 725/23 |
| 8,639,629 B1 * | 1/2014 | Hoffman | G06Q 20/3821 | 705/64 |
| 8,640,946 B1 * | 2/2014 | Block | G06Q 20/308 | 235/379 |
| 8,651,373 B1 * | 2/2014 | Block | G06Q 20/1085 | 235/379 |
| 8,655,773 B1 * | 2/2014 | Fasoli | G06Q 40/00 | 705/40 |
| 8,661,254 B1 * | 2/2014 | Sama | H04L 63/18 | 713/168 |
| 8,684,900 B2 * | 4/2014 | Tran | A61B 8/06 | 600/3 |
| 8,699,379 B2 * | 4/2014 | Kholaif | H04W 48/20 | 370/254 |
| 8,700,729 B2 * | 4/2014 | Dua | G06Q 20/40 | 705/64 |
| 8,712,857 B1 * | 4/2014 | Adornato | G06Q 30/0207 | 705/26.7 |
| 8,713,418 B2 * | 4/2014 | King | G06F 16/334 | 715/255 |
| 8,739,059 B2 * | 5/2014 | Rabenold | G06Q 40/04 | 715/224 |
| 8,752,151 B2 * | 6/2014 | Li | G06F 21/32 | 726/7 |
| 8,768,306 B1 * | 7/2014 | Ben Ayed | H04W 12/069 | 455/411 |
| 8,768,838 B1 * | 7/2014 | Hoffman | G06Q 40/00 | 705/72 |
| 8,781,228 B2 * | 7/2014 | King | G06F 16/435 | 382/177 |
| 8,812,319 B2 * | 8/2014 | Skerpac | G10L 17/14 | 704/246 |
| 8,812,838 B2 * | 8/2014 | Grajek | H04L 9/3268 | 713/175 |
| 8,840,016 B1 * | 9/2014 | Schott | G06Q 20/3278 | 235/379 |
| 8,874,504 B2 * | 10/2014 | King | G06F 16/382 | 707/608 |
| 8,924,310 B2 * | 12/2014 | Bishop | G07F 7/1008 | 705/76 |
| 8,925,040 B2 * | 12/2014 | Ding | H04W 12/06 | 726/4 |
| 8,955,149 B1 * | 2/2015 | Baer | G06F 21/6218 | 726/28 |
| 8,955,743 B1 * | 2/2015 | Block | G07F 19/207 | 235/379 |
| 8,990,235 B2 * | 3/2015 | King | G06F 40/197 | 707/769 |
| 8,990,891 B1 * | 3/2015 | Chickering | H04W 12/068 | 726/8 |
| 9,004,352 B2 * | 4/2015 | Graef | G07F 19/202 | 235/491 |
| 9,004,353 B1 * | 4/2015 | Block | G06Q 20/308 | 382/137 |
| 9,008,447 B2 * | 4/2015 | King | G06V 30/186 | 382/229 |
| 9,047,728 B1 * | 6/2015 | Irudayam | G06Q 20/3221 | |
| 9,065,819 B1 * | 6/2015 | Shanmugam | G06F 21/41 | |
| 9,072,118 B2 * | 6/2015 | Zhong | H04L 63/0853 | |
| 9,087,354 B1 * | 7/2015 | Hambir | G06Q 20/042 | |
| 9,098,687 B2 * | 8/2015 | Hayton | H04L 63/0869 | |
| 9,098,961 B1 * | 8/2015 | Block | G07F 19/201 | |
| 9,119,078 B2 * | 8/2015 | Kokubo | H04L 63/0861 | |
| 9,141,876 B1 * | 9/2015 | Jones | G07D 11/30 | |
| 9,143,638 B2 * | 9/2015 | King | G06F 16/58 | |
| 9,143,937 B2 * | 9/2015 | Cherian | H04W 12/06 | |
| 9,154,949 B1 * | 10/2015 | Bertz | H04L 63/0853 | |
| 9,154,955 B1 * | 10/2015 | Bertz | H04L 67/61 | |
| 9,160,744 B1 * | 10/2015 | Machani | H04L 63/0428 | |
| 9,161,227 B1 * | 10/2015 | Bye | H04W 12/08 | |
| 9,177,314 B2 * | 11/2015 | Uzo | G06Q 40/00 | |
| 9,185,109 B2 * | 11/2015 | Chen | H04L 9/0863 | |
| 9,189,788 B1 * | 11/2015 | Robinson | G06Q 20/40145 | |
| 9,195,834 B1 * | 11/2015 | Jakobsson | H04L 63/1483 | |
| 9,202,035 B1 * | 12/2015 | Manusov | G06F 21/32 | |
| 9,215,075 B1 * | 12/2015 | Poltorak | H04L 63/0428 | |
| 9,224,141 B1 * | 12/2015 | Lamba | G06Q 20/341 | |
| 9,246,884 B1 * | 1/2016 | Pfab | H04L 9/088 | |
| 9,268,852 B2 * | 2/2016 | King | H04N 1/32128 | |
| 9,292,711 B1 * | 3/2016 | Roth | G06F 21/34 | |
| 9,300,645 B1 * | 3/2016 | Rao | H04L 63/08 | |
| 9,301,140 B1 * | 3/2016 | Costigan | H04L 67/306 | |
| 9,306,943 B1 * | 4/2016 | Bailey | H04W 12/088 | |
| 9,311,632 B1 * | 4/2016 | Dent | G06Q 20/4015 | |
| 9,323,784 B2 * | 4/2016 | King | G06F 16/5846 | |
| 9,355,530 B1 * | 5/2016 | Block | G06Q 20/405 | |
| 9,374,368 B1 * | 6/2016 | Roth | H04L 63/123 | |
| 9,401,905 B1 * | 7/2016 | Kowalski | H04L 67/34 | |
| 9,420,397 B1 * | 8/2016 | Sheriff | H04W 4/50 | |
| 9,455,972 B1 * | 9/2016 | Dotan | H04W 12/35 | |
| 9,456,326 B2 * | 9/2016 | McKibben | H04W 4/06 | |
| 9,479,491 B1 * | 10/2016 | Farnsworth | G06F 21/42 | |
| 9,509,676 B1 * | 11/2016 | Johnson | G06F 21/35 | |
| 9,529,502 B2 * | 12/2016 | Prasad | G06Q 20/18 | |
| 9,602,501 B1 * | 3/2017 | Ramalingam | H04L 63/083 | |
| 9,607,139 B1 * | 3/2017 | Machani | H04L 63/0861 | |
| 9,619,792 B1 * | 4/2017 | Aaron | G06Q 20/3224 | |
| 9,645,789 B1 * | 5/2017 | Lee | G06F 21/31 | |
| 9,668,138 B2 * | 5/2017 | Braden | H04L 63/083 | |
| 9,699,174 B2 * | 7/2017 | Zucker | H04W 12/06 | |
| 9,710,640 B1 * | 7/2017 | Ramalingam | H04L 63/18 | |
| 9,721,111 B2 * | 8/2017 | Cavanaugh | G06F 21/6218 | |
| 9,807,819 B1 * | 10/2017 | Zhu | H04W 92/02 | |
| 9,836,739 B1 * | 12/2017 | Borovsky | G06Q 20/3572 | |
| 9,839,061 B2 * | 12/2017 | Faccin | H04W 12/06 | |
| 9,858,569 B2 * | 1/2018 | Phan | G06Q 20/3829 | |
| 9,883,437 B2 * | 1/2018 | Abraham | H04W 36/0061 | |
| 9,888,385 B1 * | 2/2018 | Oh | H04W 4/70 | |
| 9,900,742 B1 * | 2/2018 | Thoresen | H04W 4/021 | |
| 9,928,379 B1 * | 3/2018 | Hoffer | G16H 50/20 | |
| 9,980,134 B2 * | 5/2018 | Zhang | H04L 63/0876 | |
| 10,013,537 B1 * | 7/2018 | Trachtman | G06F 21/31 | |
| 10,021,670 B1 * | 7/2018 | Bhatt | H04W 4/40 | |
| 10,055,716 B2 * | 8/2018 | Cacheria, III | G06Q 30/0601 | |
| 10,055,732 B1 * | 8/2018 | Hecht | G06Q 20/405 | |
| 10,142,340 B2 * | 11/2018 | Castinado | H04L 63/0884 | |
| 10,148,629 B1 * | 12/2018 | Roth | H04L 63/0838 | |
| 10,169,587 B1 * | 1/2019 | Nix | H04W 12/041 | |
| 10,194,309 B2 * | 1/2019 | Bari | H04M 15/43 | |
| 10,296,875 B1 * | 5/2019 | Prasad | G06Q 20/3223 | |
| 10,373,148 B1 * | 8/2019 | Dixon | G06Q 20/22 | |
| 10,452,897 B1 * | 10/2019 | Benkreira | G06V 40/45 | |
| 10,489,132 B1 * | 11/2019 | Bloomcamp | G06F 8/65 | |
| 10,516,668 B2 * | 12/2019 | Stedman | G06F 21/62 | |
| 10,517,126 B2 * | 12/2019 | Manroa | H04W 12/06 | |
| 10,586,229 B2 * | 3/2020 | Hurry | G06Q 20/355 | |
| 10,594,990 B1 * | 3/2020 | Lemberger | H04W 4/80 | |
| 10,657,242 B1 * | 5/2020 | Xia | H04L 9/0825 | |
| 10,685,366 B2 * | 6/2020 | Kusens | H04W 4/80 | |
| 10,692,059 B1 * | 6/2020 | Thome | G06Q 20/3221 | |
| 10,719,804 B1 * | 7/2020 | Lundahl | G07C 9/00896 | |
| 10,789,957 B1 * | 9/2020 | Tiwari | H04L 67/125 | |
| 10,951,606 B1 * | 3/2021 | Shahidzadeh | H04W 4/029 | |
| 11,055,393 B2 * | 7/2021 | Dupart | G07C 9/22 | |
| 11,093,589 B2 * | 8/2021 | Lowe | H04W 12/082 | |
| 11,096,059 B1 * | 8/2021 | Shahidzadeh | G06Q 50/10 | |
| 11,151,562 B2 * | 10/2021 | Briggs | G06Q 20/321 | |
| 11,159,520 B2 * | 10/2021 | Rao | G06F 21/316 | |
| 11,201,863 B2 * | 12/2021 | Kim | G06F 21/35 | |
| 11,206,664 B2 * | 12/2021 | Brown | H04W 12/04 | |
| 11,258,791 B2 * | 2/2022 | Giobbi | H04L 63/0853 | |
| 11,310,228 B1 * | 4/2022 | Rao | G06V 10/22 | |
| 11,354,632 B1 * | 6/2022 | Hill | H04L 67/52 | |
| 11,417,068 B1 * | 8/2022 | Burris | G06Q 20/18 | |
| 11,477,654 B1 * | 10/2022 | Kahn | H04W 12/35 | |

(56) References Cited

U.S. PATENT DOCUMENTS

| | | | | |
|---|---|---|---|---|
| 11,503,454 B2* | 11/2022 | Chughtai | | H04W 8/183 |
| 11,553,481 B2* | 1/2023 | Brown | | H04W 12/04 |
| 11,564,266 B1* | 1/2023 | Kahn | | H04M 15/785 |
| 11,663,319 B1* | 5/2023 | Giraud | | G06F 21/32 |
| | | | | 705/14.27 |
| 11,720,073 B2* | 8/2023 | Akhlaghi | | H02J 7/00045 |
| | | | | 700/295 |
| 11,727,386 B2* | 8/2023 | McGraw, IV | | H04L 67/025 |
| | | | | 705/44 |
| 11,734,960 B2* | 8/2023 | Wang | | G07B 15/02 |
| | | | | 705/13 |
| 11,937,082 B1* | 3/2024 | Srinath Bharadwaj | | |
| | | | | H04L 9/0894 |
| 2001/0052083 A1* | 12/2001 | Willins | | H04L 9/3213 |
| | | | | 726/10 |
| 2002/0029342 A1* | 3/2002 | Keech | | G07F 7/10 |
| | | | | 705/64 |
| 2002/0055852 A1* | 5/2002 | Little | | G06Q 30/06 |
| | | | | 701/1 |
| 2002/0058499 A1* | 5/2002 | Ortiz | | H04L 67/306 |
| | | | | 455/411 |
| 2002/0089412 A1* | 7/2002 | Heger | | G06F 21/32 |
| | | | | 340/5.82 |
| 2002/0169539 A1* | 11/2002 | Menard | | G01C 21/26 |
| | | | | 701/532 |
| 2003/0051041 A1* | 3/2003 | Kalavade | | H04W 12/084 |
| | | | | 709/229 |
| 2003/0063581 A1* | 4/2003 | Shanbhag | | H04W 12/06 |
| | | | | 370/328 |
| 2003/0065805 A1* | 4/2003 | Barnes, Jr. | | G06Q 30/0643 |
| | | | | 709/244 |
| 2003/0115261 A1* | 6/2003 | Mohammed | | H04W 12/35 |
| | | | | 709/203 |
| 2003/0118034 A1* | 6/2003 | Furukawa | | H04L 69/161 |
| | | | | 370/352 |
| 2003/0120957 A1* | 6/2003 | Pathiyal | | G06F 21/6218 |
| | | | | 726/28 |
| 2003/0129965 A1* | 7/2003 | Siegel | | G06Q 10/02 |
| | | | | 455/411 |
| 2003/0172271 A1* | 9/2003 | Silvester | | H04L 63/0876 |
| | | | | 713/170 |
| 2003/0182194 A1* | 9/2003 | Choey | | G06Q 20/326 |
| | | | | 705/16 |
| 2003/0200184 A1* | 10/2003 | Dominguez | | G06Q 20/425 |
| | | | | 705/78 |
| 2003/0220835 A1* | 11/2003 | Barnes, Jr. | | G06Q 10/02 |
| | | | | 379/93.12 |
| 2004/0002902 A1* | 1/2004 | Muehlhaeuser | | H04M 3/493 |
| | | | | 705/26.1 |
| 2004/0014423 A1* | 1/2004 | Croome | | H04L 63/08 |
| | | | | 455/403 |
| 2004/0073792 A1* | 4/2004 | Noble | | G06F 21/35 |
| | | | | 713/168 |
| 2004/0081110 A1* | 4/2004 | Koskimies | | H04L 63/10 |
| | | | | 370/315 |
| 2004/0098586 A1* | 5/2004 | Rebo | | H04L 63/162 |
| | | | | 713/169 |
| 2004/0122774 A1* | 6/2004 | Studd | | H04L 63/0853 |
| | | | | 705/317 |
| 2004/0176134 A1* | 9/2004 | Goldthwaite | | H04L 12/2854 |
| | | | | 455/558 |
| 2004/0192211 A1* | 9/2004 | Gallagher | | H04W 36/14 |
| | | | | 455/67.11 |
| 2004/0203563 A1* | 10/2004 | Menard | | H04W 88/04 |
| | | | | 455/406 |
| 2004/0224662 A1* | 11/2004 | O'Neil | | H04L 12/14 |
| | | | | 455/414.3 |
| 2004/0224693 A1* | 11/2004 | O'Neil | | H04L 67/04 |
| | | | | 455/445 |
| 2004/0225752 A1* | 11/2004 | O'Neil | | H04L 9/40 |
| | | | | 709/246 |
| 2004/0225878 A1* | 11/2004 | Costa-Requena | | H04L 63/08 |
| | | | | 713/150 |
| 2004/0225887 A1* | 11/2004 | O'Neil | | H04L 63/083 |
| | | | | 713/193 |
| 2004/0230489 A1* | 11/2004 | Goldthwaite | | G07F 7/082 |
| | | | | 705/26.1 |
| 2004/0236694 A1* | 11/2004 | Tattan | | G06Q 20/027 |
| | | | | 705/50 |
| 2004/0250130 A1* | 12/2004 | Billharz | | H04L 63/104 |
| | | | | 713/153 |
| 2004/0255137 A1* | 12/2004 | Ying | | H04L 63/0884 |
| | | | | 713/193 |
| 2004/0268142 A1* | 12/2004 | Karjala | | H04L 63/0272 |
| | | | | 726/15 |
| 2004/0268148 A1* | 12/2004 | Karjala | | H04L 63/0442 |
| | | | | 713/150 |
| 2005/0010758 A1* | 1/2005 | Landrock | | H04L 63/126 |
| | | | | 713/156 |
| 2005/0030939 A1* | 2/2005 | Roy | | H04L 12/2856 |
| | | | | 370/352 |
| 2005/0033847 A1* | 2/2005 | Roy | | H04L 51/214 |
| | | | | 709/227 |
| 2005/0036498 A1* | 2/2005 | Clarke | | H04L 67/565 |
| | | | | 370/395.52 |
| 2005/0036513 A1* | 2/2005 | Clarke | | H04L 67/565 |
| | | | | 370/395.5 |
| 2005/0038897 A1* | 2/2005 | Clarke | | H04L 69/08 |
| | | | | 709/206 |
| 2005/0038915 A1* | 2/2005 | Clarke | | H04L 67/56 |
| | | | | 709/250 |
| 2005/0041686 A1* | 2/2005 | Roy | | H04L 67/565 |
| | | | | 370/466 |
| 2005/0065779 A1* | 3/2005 | Odinak | | G10L 15/30 |
| | | | | 704/E15.047 |
| 2005/0066044 A1* | 3/2005 | Chaskar | | H04L 9/40 |
| | | | | 709/230 |
| 2005/0123141 A1* | 6/2005 | Suzuki | | H04L 9/0825 |
| | | | | 380/277 |
| 2005/0130586 A1* | 6/2005 | Gnuschke | | H04N 7/17318 |
| | | | | 455/3.06 |
| 2005/0147249 A1* | 7/2005 | Gustavsson | | H04W 12/106 |
| | | | | 380/247 |
| 2005/0157688 A1* | 7/2005 | Rydnell | | H04L 63/02 |
| | | | | 713/160 |
| 2005/0187774 A1* | 8/2005 | Vuong | | G06F 40/58 |
| | | | | 704/277 |
| 2005/0250473 A1* | 11/2005 | Brown | | H04L 9/3236 |
| | | | | 455/411 |
| 2006/0002556 A1* | 1/2006 | Paul | | H04L 63/18 |
| | | | | 380/270 |
| 2006/0020679 A1* | 1/2006 | Hinton | | H04L 63/0815 |
| | | | | 709/217 |
| 2006/0020960 A1* | 1/2006 | Relan | | H04L 67/52 |
| | | | | 348/E7.071 |
| 2006/0021003 A1* | 1/2006 | Fisher | | H04L 63/0861 |
| | | | | 726/1 |
| 2006/0021017 A1* | 1/2006 | Hinton | | H04L 63/0815 |
| | | | | 726/10 |
| 2006/0021018 A1* | 1/2006 | Hinton | | H04L 63/0815 |
| | | | | 726/10 |
| 2006/0048216 A1* | 3/2006 | Hinton | | H04L 63/0815 |
| | | | | 726/8 |
| 2006/0053296 A1* | 3/2006 | Busboom | | H04L 63/20 |
| | | | | 726/4 |
| 2006/0059110 A1* | 3/2006 | Madhok | | G06Q 20/403 |
| | | | | 705/75 |
| 2006/0074698 A1* | 4/2006 | Bishop | | G07F 7/0886 |
| | | | | 705/50 |
| 2006/0104224 A1* | 5/2006 | Singh | | H04W 12/06 |
| | | | | 370/310 |
| 2006/0136332 A1* | 6/2006 | Ziegler | | G06F 21/6245 |
| | | | | 705/39 |
| 2006/0136739 A1* | 6/2006 | Brock | | H04L 63/0838 |
| | | | | 713/184 |
| 2006/0136990 A1* | 6/2006 | Hinton | | H04L 63/0815 |
| | | | | 726/2 |

(56) References Cited

U.S. PATENT DOCUMENTS

| | | | |
|---|---|---|---|
| 2006/0174004 A1* | 8/2006 | Asthana | H04L 63/08 709/225 |
| 2006/0206709 A1* | 9/2006 | Labrou | G06Q 20/18 713/167 |
| 2006/0215673 A1* | 9/2006 | Olvera-Hernandez | H04W 40/32 370/406 |
| 2006/0218628 A1* | 9/2006 | Hinton | H04L 63/0815 726/8 |
| 2006/0224470 A1* | 10/2006 | Garcia Ruano | G06Q 20/102 705/40 |
| 2006/0235700 A1* | 10/2006 | Wong | G10L 15/26 704/E15.045 |
| 2006/0236382 A1* | 10/2006 | Hinton | G06F 21/41 726/8 |
| 2007/0002830 A1* | 1/2007 | Beckemeyer | H04M 7/1205 370/352 |
| 2007/0011099 A1* | 1/2007 | Sheehan | G06Q 20/322 705/65 |
| 2007/0047719 A1* | 3/2007 | Dhawan | G06F 3/167 379/235 |
| 2007/0054655 A1* | 3/2007 | Fantini | H04L 63/0853 455/411 |
| 2007/0057763 A1* | 3/2007 | Blattner | G06F 3/03543 340/5.52 |
| 2007/0067224 A1* | 3/2007 | Smith | G06Q 30/08 705/26.35 |
| 2007/0078986 A1* | 4/2007 | Ethier | H04L 69/24 709/227 |
| 2007/0079136 A1* | 4/2007 | Vishik | G06F 21/335 713/186 |
| 2007/0088952 A1* | 4/2007 | Hewitt | H04L 9/3271 713/168 |
| 2007/0101358 A1* | 5/2007 | Ambady | H04N 21/4623 725/31 |
| 2007/0101413 A1* | 5/2007 | Vishik | G06Q 30/02 713/186 |
| 2007/0106564 A1* | 5/2007 | Matotek | H04W 4/60 705/26.1 |
| 2007/0175986 A1* | 8/2007 | Petrone | G07C 9/38 235/382 |
| 2007/0186105 A1* | 8/2007 | Bailey | H04L 63/0492 713/168 |
| 2007/0186106 A1* | 8/2007 | Ting | H04L 63/0815 713/168 |
| 2007/0198432 A1* | 8/2007 | Pitroda | G06Q 20/327 705/64 |
| 2007/0204160 A1* | 8/2007 | Chan | H04L 9/0838 713/171 |
| 2007/0208816 A1* | 9/2007 | Baldwin | H04L 12/1831 709/206 |
| 2007/0230393 A1* | 10/2007 | Sinha | H04W 12/50 370/328 |
| 2007/0245414 A1* | 10/2007 | Chan | H04L 9/3234 726/12 |
| 2007/0254648 A1* | 11/2007 | Zhang | H04W 8/06 455/433 |
| 2007/0278291 A1* | 12/2007 | Rans | G06F 21/31 235/492 |
| 2007/0293216 A1* | 12/2007 | Jiang | H04W 12/062 455/433 |
| 2007/0295805 A1* | 12/2007 | Ramachandran | G06Q 40/00 235/379 |
| 2007/0297610 A1* | 12/2007 | Chen | H04L 9/083 380/270 |
| 2008/0010665 A1* | 1/2008 | Hinton | H04L 63/20 726/1 |
| 2008/0016313 A1* | 1/2008 | Murotake | G06F 12/1416 711/E12.098 |
| 2008/0021997 A1* | 1/2008 | Hinton | H04L 63/0815 709/225 |
| 2008/0022043 A1* | 1/2008 | Adams | G07F 7/0893 711/115 |
| 2008/0035724 A1* | 2/2008 | Vawter | G06Q 20/20 705/16 |
| 2008/0043687 A1* | 2/2008 | Lee | H04W 12/069 370/310.2 |
| 2008/0059804 A1* | 3/2008 | Shah | H04L 63/083 726/8 |
| 2008/0085725 A1* | 4/2008 | Grayson | H04W 48/04 455/456.1 |
| 2008/0086764 A1* | 4/2008 | Kulkarni | H04L 9/3215 726/7 |
| 2008/0086767 A1* | 4/2008 | Kulkarni | H04L 9/3234 726/9 |
| 2008/0086770 A1* | 4/2008 | Kulkarni | H04L 9/3271 726/20 |
| 2008/0096553 A1* | 4/2008 | Saksena | H04W 28/06 455/426.2 |
| 2008/0098225 A1* | 4/2008 | Baysinger | H04L 9/3215 713/168 |
| 2008/0098464 A1* | 4/2008 | Mizrah | G06F 21/36 726/5 |
| 2008/0101291 A1* | 5/2008 | Jiang | H04L 63/102 370/331 |
| 2008/0120698 A1* | 5/2008 | Ramia | H04L 63/08 726/4 |
| 2008/0120707 A1* | 5/2008 | Ramia | H04L 63/0861 726/5 |
| 2008/0147410 A1* | 6/2008 | Odinak | G10L 15/26 704/270.1 |
| 2008/0154770 A1* | 6/2008 | Rutherford | G07F 7/1008 705/44 |
| 2008/0172306 A1* | 7/2008 | Schorr | G06Q 30/02 705/26.8 |
| 2008/0178004 A1* | 7/2008 | Wei | H04L 63/205 713/171 |
| 2008/0189420 A1* | 8/2008 | Herrod | H04L 41/34 709/227 |
| 2008/0189774 A1* | 8/2008 | Ansari | H04L 67/53 726/7 |
| 2008/0208758 A1* | 8/2008 | Spiker | G07F 7/1016 705/73 |
| 2008/0209545 A1* | 8/2008 | Asano | H04L 9/3273 726/19 |
| 2008/0227471 A1* | 9/2008 | Dankar | G06Q 20/3224 455/456.6 |
| 2008/0232588 A1* | 9/2008 | Christison | H04W 12/033 380/270 |
| 2008/0270534 A1* | 10/2008 | Xia | H04L 63/08 709/203 |
| 2008/0271126 A1* | 10/2008 | Saraf | H04L 63/08 726/5 |
| 2008/0300055 A1* | 12/2008 | Lutnick | G07F 17/3209 463/39 |
| 2008/0317439 A1* | 12/2008 | Wong | H04N 21/2747 386/241 |
| 2008/0319794 A1* | 12/2008 | Carlson | G06Q 20/3221 455/411 |
| 2008/0319952 A1* | 12/2008 | Carpenter | G06F 16/9038 |
| 2009/0024506 A1* | 1/2009 | Houri | G06Q 40/00 705/35 |
| 2009/0036126 A1* | 2/2009 | Morikuni | H04W 12/08 455/435.2 |
| 2009/0055642 A1* | 2/2009 | Myers | H04L 9/3263 713/155 |
| 2009/0061828 A1* | 3/2009 | Sigmund | G06F 40/58 455/413 |
| 2009/0067846 A1* | 3/2009 | Yu | H04B 10/1143 398/128 |
| 2009/0070691 A1* | 3/2009 | Jain | H04L 41/32 715/762 |
| 2009/0070861 A1* | 3/2009 | Jain | G06Q 20/3278 726/5 |
| 2009/0108063 A1* | 4/2009 | Jain | G06K 7/10237 235/492 |

(56) References Cited

U.S. PATENT DOCUMENTS

| | | | | |
|---|---|---|---|---|
| 2009/0117883 A1* | 5/2009 | Coffing | H04L 51/58 | 455/414.1 |
| 2009/0154671 A1* | 6/2009 | Weiss | H04L 63/08 | 379/93.01 |
| 2009/0158136 A1* | 6/2009 | Rossano | H04L 61/4594 | 715/810 |
| 2009/0204815 A1* | 8/2009 | Dennis | H04W 12/126 | 713/168 |
| 2009/0239510 A1* | 9/2009 | Sennett | G06Q 30/0267 | 455/414.1 |
| 2009/0240774 A1* | 9/2009 | Sachtjen | H04L 51/212 | 709/206 |
| 2009/0248883 A1* | 10/2009 | Suryanarayana | G06F 9/451 | 709/229 |
| 2009/0270174 A1* | 10/2009 | Kelly | G07F 17/3267 | 463/42 |
| 2009/0270175 A1* | 10/2009 | Kelly | G07F 17/3225 | 463/26 |
| 2009/0271847 A1* | 10/2009 | Karjala | H04L 63/0807 | 726/6 |
| 2009/0276347 A1* | 11/2009 | Kargman | G06Q 20/3274 | 705/35 |
| 2009/0287921 A1* | 11/2009 | Zhu | G06Q 10/02 | 713/155 |
| 2009/0288148 A1* | 11/2009 | Headley | H04L 9/3215 | 726/5 |
| 2009/0296930 A1* | 12/2009 | Krantz | H04L 63/0823 | 380/247 |
| 2009/0300357 A1* | 12/2009 | Kumar | H04L 63/102 | 709/229 |
| 2009/0305671 A1* | 12/2009 | Luft | H04W 36/04 | 455/411 |
| 2009/0319616 A1* | 12/2009 | Lewis, II | H04W 4/023 | 709/206 |
| 2010/0009657 A1* | 1/2010 | Dingler | H04W 12/02 | 455/411 |
| 2010/0012721 A1* | 1/2010 | Jain | G06Q 20/382 | 235/375 |
| 2010/0017619 A1* | 1/2010 | Errico | G06F 21/32 | 713/186 |
| 2010/0024022 A1* | 1/2010 | Wells | H04W 12/069 | 726/7 |
| 2010/0027469 A1* | 2/2010 | Gurajala | H04M 15/8038 | 370/328 |
| 2010/0030651 A1* | 2/2010 | Matotek | G06Q 20/202 | 705/26.1 |
| 2010/0042517 A1* | 2/2010 | Paintin | G06Q 30/02 | 705/30 |
| 2010/0044444 A1* | 2/2010 | Jain | G06Q 20/3576 | 235/492 |
| 2010/0063931 A1* | 3/2010 | Cole | H04H 60/06 | 715/810 |
| 2010/0064135 A1* | 3/2010 | Thakare | H04W 12/122 | 713/171 |
| 2010/0069035 A1* | 3/2010 | Johnson | H04W 92/18 | 455/566 |
| 2010/0091733 A1* | 4/2010 | Hahn | H04W 12/062 | 370/331 |
| 2010/0100725 A1* | 4/2010 | Ozzie | G06F 21/43 | 713/155 |
| 2010/0107230 A1* | 4/2010 | Tyagi | H04L 65/1076 | 726/6 |
| 2010/0115114 A1* | 5/2010 | Headley | H04L 51/52 | 709/229 |
| 2010/0125732 A1* | 5/2010 | Cha | H04W 12/0431 | 713/168 |
| 2010/0125903 A1* | 5/2010 | Devarajan | H04L 63/102 | 709/224 |
| 2010/0146263 A1* | 6/2010 | Das | G06Q 20/40 | 713/155 |
| 2010/0151831 A1* | 6/2010 | Hao | H04M 3/53325 | 455/412.2 |
| 2010/0161664 A1* | 6/2010 | Puhl | H04L 9/3231 | 707/E17.135 |
| 2010/0189011 A1* | 7/2010 | Jing | H04W 40/244 | 370/254 |
| 2010/0191968 A1* | 7/2010 | Patil | H04W 12/0431 | 713/170 |
| 2010/0192212 A1* | 7/2010 | Raleigh | H04W 24/08 | 726/7 |
| 2010/0198728 A1* | 8/2010 | Aabye | G06Q 20/40 | 726/19 |
| 2010/0203903 A1* | 8/2010 | Dingler | H04W 4/029 | 370/352 |
| 2010/0229224 A1* | 9/2010 | Etchegoyen | G06F 21/31 | 726/5 |
| 2010/0262282 A1* | 10/2010 | Segal | G07F 9/002 | 700/241 |
| 2010/0264211 A1* | 10/2010 | Jain | H04W 12/062 | 235/380 |
| 2010/0273445 A1* | 10/2010 | Dunn | H04W 76/50 | 455/404.1 |
| 2010/0273457 A1* | 10/2010 | Freeman | H04M 3/537 | 715/752 |
| 2010/0275010 A1* | 10/2010 | Ghirardi | H04L 63/0838 | 726/5 |
| 2010/0275249 A1* | 10/2010 | McCann | H04W 12/068 | 726/5 |
| 2010/0306228 A1* | 12/2010 | Carpenter | G06Q 30/02 | 707/765 |
| 2010/0313245 A1* | 12/2010 | Brandt | G06Q 20/108 | 726/4 |
| 2010/0319062 A1* | 12/2010 | Danieli | H04L 12/1818 | 717/176 |
| 2010/0325040 A1* | 12/2010 | Etchegoyen | G06F 21/73 | 705/39 |
| 2011/0004758 A1* | 1/2011 | Walker | H04L 63/062 | 713/168 |
| 2011/0010543 A1* | 1/2011 | Schmidt | H04W 12/06 | 713/168 |
| 2011/0016050 A1* | 1/2011 | Evans | G06Q 20/386 | 705/44 |
| 2011/0026716 A1* | 2/2011 | Tang | H04W 12/0471 | 380/46 |
| 2011/0035592 A1* | 2/2011 | Cha | H04L 63/205 | 713/169 |
| 2011/0047605 A1* | 2/2011 | Sontag | G06F 21/32 | 726/7 |
| 2011/0069661 A1* | 3/2011 | Waytena, Jr. | H04L 65/102 | 455/414.3 |
| 2011/0075675 A1* | 3/2011 | Koodli | H04M 15/41 | 370/401 |
| 2011/0078243 A1* | 3/2011 | Carpenter | G06F 40/18 | 709/204 |
| 2011/0083167 A1* | 4/2011 | Carpenter | G06F 16/2228 | 709/217 |
| 2011/0087610 A1* | 4/2011 | Batada | H04W 12/086 | 707/769 |
| 2011/0092185 A1* | 4/2011 | Garskof | H04L 63/083 | 455/411 |
| 2011/0106659 A1* | 5/2011 | Faith | G06Q 20/10 | 705/44 |
| 2011/0113245 A1* | 5/2011 | Varadarajan | G06F 21/34 | 713/168 |
| 2011/0119720 A1* | 5/2011 | Fan | H04N 21/42684 | 725/120 |
| 2011/0122864 A1* | 5/2011 | Cherifi | H04M 3/58 | 370/352 |
| 2011/0130117 A1* | 6/2011 | Fan | H04W 12/06 | 455/411 |
| 2011/0130118 A1* | 6/2011 | Fan | H04W 15/46 | 455/411 |
| 2011/0145074 A1* | 6/2011 | Polizzotto | G06Q 50/00 | 705/14.66 |
| 2011/0153437 A1* | 6/2011 | Archer | G06Q 20/351 | 705/17 |
| 2011/0153461 A1* | 6/2011 | Royyuru | G06Q 20/04 | 379/88.04 |

(56) References Cited

U.S. PATENT DOCUMENTS

| | | | |
|---|---|---|---|
| 2011/0154444 A1* | 6/2011 | Sriraghavan | G06F 21/36 345/157 |
| 2011/0154447 A1* | 6/2011 | Dennis | H04L 63/08 726/4 |
| 2011/0184865 A1* | 7/2011 | Mon | G07F 19/20 235/379 |
| 2011/0191237 A1* | 8/2011 | Faith | G06Q 20/40 705/1.1 |
| 2011/0199963 A1* | 8/2011 | Shaw | H04W 76/36 370/328 |
| 2011/0202466 A1* | 8/2011 | Carter | H04W 4/023 705/67 |
| 2011/0202760 A1* | 8/2011 | Hahn | H04W 12/062 713/162 |
| 2011/0213977 A1* | 9/2011 | Little | H04L 9/0844 380/279 |
| 2011/0219427 A1* | 9/2011 | Hito | H04L 63/0853 726/3 |
| 2011/0225090 A1* | 9/2011 | Hammad | G06Q 20/405 705/44 |
| 2011/0231478 A1* | 9/2011 | Wheeler | G06F 16/958 709/224 |
| 2011/0235085 A1* | 9/2011 | Jazayeri | G06F 3/1238 358/1.14 |
| 2011/0237224 A1* | 9/2011 | Coppinger | G06Q 20/3278 455/411 |
| 2011/0238573 A1* | 9/2011 | Varadarajan | G06Q 20/3263 705/43 |
| 2011/0244798 A1* | 10/2011 | Daigle | H04L 63/0853 455/41.2 |
| 2011/0246196 A1* | 10/2011 | Bhaskaran | G10L 17/24 704/E15.044 |
| 2011/0249618 A1* | 10/2011 | Shaw | H04W 8/26 370/328 |
| 2011/0251892 A1* | 10/2011 | Laracey | G06Q 20/20 705/16 |
| 2011/0258122 A1* | 10/2011 | Shader | G06Q 20/14 705/67 |
| 2011/0270932 A1* | 11/2011 | Chaturvedi | H04L 51/48 709/227 |
| 2011/0282734 A1* | 11/2011 | Zurada | G06Q 30/02 705/14.49 |
| 2011/0282789 A1* | 11/2011 | Carroll | G06Q 20/20 705/44 |
| 2011/0289317 A1* | 11/2011 | Darapu | H04N 21/43072 713/168 |
| 2011/0302083 A1* | 12/2011 | Bhinder | G06Q 20/40 705/44 |
| 2011/0302645 A1* | 12/2011 | Headley | H04L 9/3215 726/7 |
| 2011/0307403 A1* | 12/2011 | Rostampour | G06Q 50/265 705/325 |
| 2011/0314153 A1* | 12/2011 | Bathiche | H04W 12/06 709/225 |
| 2011/0314168 A1* | 12/2011 | Bathiche | H04W 12/06 709/228 |
| 2011/0314287 A1* | 12/2011 | Escott | H04L 9/0844 713/171 |
| 2011/0320345 A1* | 12/2011 | Taveau | G06Q 20/40145 705/39 |
| 2012/0005039 A1* | 1/2012 | Dorsey | G06Q 40/02 705/26.41 |
| 2012/0005096 A1* | 1/2012 | Dorsey | G06Q 20/40 705/44 |
| 2012/0011007 A1* | 1/2012 | Blewett | G06Q 20/3272 705/16 |
| 2012/0011066 A1* | 1/2012 | Telle | G06Q 20/4014 235/380 |
| 2012/0023022 A1* | 1/2012 | Carroll | G06Q 20/40 705/44 |
| 2012/0023163 A1* | 1/2012 | Mangold | A63B 69/00 709/203 |
| 2012/0023558 A1* | 1/2012 | Rafiq | H04L 63/08 709/202 |
| 2012/0028609 A1* | 2/2012 | Hruska | H04W 12/02 455/411 |
| 2012/0042367 A1* | 2/2012 | Papakostas | H04L 67/563 726/7 |
| 2012/0054024 A1* | 3/2012 | Polizzotto | G06Q 30/0247 705/14.69 |
| 2012/0054046 A1* | 3/2012 | Albisu | G06Q 20/3274 705/16 |
| 2012/0054785 A1* | 3/2012 | Yang | H04N 21/6582 725/16 |
| 2012/0072979 A1* | 3/2012 | Cha | H04W 12/069 726/8 |
| 2012/0075062 A1* | 3/2012 | Osman | H04L 63/0853 340/5.61 |
| 2012/0076117 A1* | 3/2012 | Montemurro | H04W 48/18 370/338 |
| 2012/0076118 A1* | 3/2012 | Montemurro | H04W 48/16 370/338 |
| 2012/0078639 A1* | 3/2012 | Kumar | G10L 15/32 704/E17.004 |
| 2012/0078751 A1* | 3/2012 | MacPhail | G06Q 20/12 705/26.41 |
| 2012/0088473 A1* | 4/2012 | Jussila | H04W 12/069 455/411 |
| 2012/0089847 A1* | 4/2012 | Tu | H04W 12/084 726/4 |
| 2012/0092157 A1* | 4/2012 | Tran | A61B 5/6803 340/539.12 |
| 2012/0096277 A1* | 4/2012 | Perez Soria | H04L 9/3226 713/176 |
| 2012/0101952 A1* | 4/2012 | Raleigh | H04L 12/1417 709/223 |
| 2012/0123841 A1* | 5/2012 | Taveau | H04M 1/72457 705/14.23 |
| 2012/0131121 A1* | 5/2012 | Snyder | G06Q 20/425 709/206 |
| 2012/0131138 A1* | 5/2012 | Swenson | H04W 12/06 709/217 |
| 2012/0136796 A1* | 5/2012 | Hammad | H04W 12/069 705/67 |
| 2012/0144198 A1* | 6/2012 | Har | H04L 9/14 713/170 |
| 2012/0144461 A1* | 6/2012 | Rathbun | G06Q 20/4014 726/5 |
| 2012/0149343 A1* | 6/2012 | Sanka | H04W 12/062 455/413 |
| 2012/0151570 A1* | 6/2012 | Cooppan | H04N 21/8355 726/10 |
| 2012/0157062 A1* | 6/2012 | Kim | H04M 15/41 705/26.1 |
| 2012/0160912 A1* | 6/2012 | Laracey | H04W 12/069 235/379 |
| 2012/0173356 A1* | 7/2012 | Fan | G06Q 20/306 705/26.1 |
| 2012/0173434 A1* | 7/2012 | Mardikar | G06Q 20/3821 705/17 |
| 2012/0179558 A1* | 7/2012 | Fischer | G06Q 20/20 705/16 |
| 2012/0179908 A1* | 7/2012 | Duma | H04L 63/083 713/165 |
| 2012/0197740 A1* | 8/2012 | Grigg | G06Q 20/3278 705/16 |
| 2012/0197743 A1* | 8/2012 | Grigg | G06Q 20/3223 705/16 |
| 2012/0197797 A1* | 8/2012 | Grigg | G06Q 20/1085 705/43 |
| 2012/0197798 A1* | 8/2012 | Grigg | G06Q 20/1085 705/43 |
| 2012/0203557 A1* | 8/2012 | Odinak | G01C 21/3608 704/270.1 |
| 2012/0214442 A1* | 8/2012 | Crawford | G06F 21/316 455/411 |
| 2012/0222102 A1* | 8/2012 | Hirose | G06F 21/36 726/7 |

(56) References Cited

U.S. PATENT DOCUMENTS

| | | | |
|---|---|---|---|
| 2012/0230189 A1* | 9/2012 | Fang | H04W 28/0861 370/230 |
| 2012/0230555 A1* | 9/2012 | Miura | G06V 30/242 382/124 |
| 2012/0231844 A1* | 9/2012 | Coppinger | G06Q 20/3278 455/558 |
| 2012/0242501 A1* | 9/2012 | Tran | A61B 5/0024 340/870.02 |
| 2012/0246079 A1* | 9/2012 | Wilson | G06Q 20/3226 705/67 |
| 2012/0254959 A1* | 10/2012 | Schmidt | H04L 63/0815 726/6 |
| 2012/0259782 A1* | 10/2012 | Hammad | G06Q 20/3674 705/44 |
| 2012/0265684 A1* | 10/2012 | Singh | G06Q 20/326 705/44 |
| 2012/0266258 A1* | 10/2012 | Tuchman | H04L 63/083 726/28 |
| 2012/0268241 A1* | 10/2012 | Hanna | G06F 21/32 340/5.52 |
| 2012/0284516 A1* | 11/2012 | Errico | G16H 80/00 713/168 |
| 2012/0289191 A1* | 11/2012 | Puura | H04L 51/58 455/406 |
| 2012/0290609 A1* | 11/2012 | Britt | G06Q 20/326 707/769 |
| 2012/0291124 A1* | 11/2012 | Maria | H04L 63/062 726/22 |
| 2012/0292388 A1* | 11/2012 | Hernandez | G06Q 20/3223 235/379 |
| 2012/0297187 A1* | 11/2012 | Paya | H04L 63/0492 726/4 |
| 2012/0303425 A1* | 11/2012 | Katzin | G06Q 20/4016 705/16 |
| 2012/0309351 A1* | 12/2012 | Dutta | H04W 76/10 455/414.1 |
| 2012/0310743 A1* | 12/2012 | Johri | G06Q 20/352 705/14.58 |
| 2012/0319815 A1* | 12/2012 | Feldman | G06Q 30/0185 340/5.8 |
| 2012/0324242 A1* | 12/2012 | Kirsch | G06F 21/6245 713/189 |
| 2012/0330769 A1* | 12/2012 | Arceo | G06Q 20/4014 455/411 |
| 2013/0007858 A1* | 1/2013 | Shah | H04W 12/0431 726/6 |
| 2013/0024360 A1* | 1/2013 | Ballout | G06Q 20/40 705/39 |
| 2013/0024947 A1* | 1/2013 | Holland | G06F 21/88 726/28 |
| 2013/0031604 A1* | 1/2013 | Esselink | H04W 12/069 726/3 |
| 2013/0044609 A1* | 2/2013 | Chen | H04W 4/60 370/252 |
| 2013/0044920 A1* | 2/2013 | Langley | G06V 40/168 382/115 |
| 2013/0046645 A1* | 2/2013 | Grigg | G06Q 30/06 705/26.1 |
| 2013/0054454 A1* | 2/2013 | Purves | H04L 67/306 705/41 |
| 2013/0055362 A1* | 2/2013 | Rathbun | H04L 63/18 726/5 |
| 2013/0069772 A1* | 3/2013 | Najafi | G09B 21/003 340/407.1 |
| 2013/0073432 A1* | 3/2013 | Mulholland | G06Q 20/12 705/26.61 |
| 2013/0081119 A1* | 3/2013 | Sampas | G06Q 20/40145 726/7 |
| 2013/0091058 A1* | 4/2013 | Huster | G06Q 20/327 705/44 |
| 2013/0091559 A1* | 4/2013 | Thun | G06F 21/43 726/5 |
| 2013/0095459 A1* | 4/2013 | Tran | G09B 19/00 434/247 |
| 2013/0095791 A1* | 4/2013 | Bennett | H04M 3/2281 455/411 |
| 2013/0096916 A1* | 4/2013 | Pemmaraju | H04L 63/08 704/235 |
| 2013/0097682 A1* | 4/2013 | Zeljkovic | H04L 9/3234 726/7 |
| 2013/0099891 A1* | 4/2013 | Nandakumar | G06F 21/31 340/5.2 |
| 2013/0103544 A1* | 4/2013 | Nandakumar | G06Q 30/0609 705/26.41 |
| 2013/0104197 A1* | 4/2013 | Nandakumar | G06Q 20/4014 726/4 |
| 2013/0104198 A1* | 4/2013 | Grim | H04W 4/023 726/4 |
| 2013/0104212 A1* | 4/2013 | Nandakumar | H04L 9/3271 726/7 |
| 2013/0104213 A1* | 4/2013 | Nandakumar | G06Q 20/425 726/7 |
| 2013/0104245 A1* | 4/2013 | Nandakumar | G06F 21/31 726/28 |
| 2013/0109348 A1* | 5/2013 | Sharma | H04W 12/084 455/411 |
| 2013/0111211 A1* | 5/2013 | Winslow | H04L 9/3234 713/150 |
| 2013/0124410 A1* | 5/2013 | Kay | G07F 19/211 705/43 |
| 2013/0124855 A1* | 5/2013 | Varadarajan | G07F 19/20 726/4 |
| 2013/0125168 A1* | 5/2013 | Agnihotri | H04N 21/41265 725/38 |
| 2013/0132277 A1* | 5/2013 | Naqvi | H04W 48/04 705/44 |
| 2013/0132568 A1* | 5/2013 | Dankar | H04W 12/06 709/224 |
| 2013/0133055 A1* | 5/2013 | Ali | H04L 63/0861 726/7 |
| 2013/0140358 A1* | 6/2013 | Graef | G07F 19/201 235/379 |
| 2013/0145148 A1* | 6/2013 | Shablygin | H04L 9/40 713/155 |
| 2013/0145172 A1* | 6/2013 | Shablygin | G06F 21/33 713/185 |
| 2013/0145173 A1* | 6/2013 | Shablygin | G06F 21/34 713/185 |
| 2013/0145420 A1* | 6/2013 | Ting | H04L 63/08 726/1 |
| 2013/0146657 A1* | 6/2013 | Graef | G07D 11/14 235/379 |
| 2013/0149996 A1* | 6/2013 | King | H04W 12/0431 455/411 |
| 2013/0151417 A1* | 6/2013 | Gupta | G06Q 20/382 705/65 |
| 2013/0152174 A1* | 6/2013 | Raley | H04L 63/10 726/4 |
| 2013/0159154 A1* | 6/2013 | Purves | G06Q 20/363 705/35 |
| 2013/0166448 A1* | 6/2013 | Narayanan | H04W 12/06 705/44 |
| 2013/0169526 A1* | 7/2013 | Gai | G06F 3/03547 345/156 |
| 2013/0169571 A1* | 7/2013 | Gai | G06F 3/04883 345/173 |
| 2013/0173284 A1* | 7/2013 | Hyde | G16H 20/10 705/2 |
| 2013/0173285 A1* | 7/2013 | Hyde | G16H 10/60 705/2 |
| 2013/0173299 A1* | 7/2013 | Hyde | G16Z 99/00 705/3 |
| 2013/0173300 A1* | 7/2013 | Hyde | G16H 30/20 705/3 |
| 2013/0173301 A1* | 7/2013 | Hyde | G16Z 99/00 705/3 |
| 2013/0173302 A1* | 7/2013 | Hyde | G16H 40/67 705/3 |

(56) References Cited

U.S. PATENT DOCUMENTS

| | | | |
|---|---|---|---|
| 2013/0173303 A1* | 7/2013 | Hyde | G16H 40/67 705/3 |
| 2013/0173304 A1* | 7/2013 | Hyde | G16H 10/20 705/3 |
| 2013/0173305 A1* | 7/2013 | Hyde | G16H 20/30 705/3 |
| 2013/0174050 A1* | 7/2013 | Heinonen | H04L 67/75 709/217 |
| 2013/0174241 A1* | 7/2013 | Cha | H04L 63/0815 726/7 |
| 2013/0179188 A1* | 7/2013 | Hyde | G06Q 10/10 705/3 |
| 2013/0179346 A1* | 7/2013 | Kumnick | G06Q 20/123 705/44 |
| 2013/0179681 A1* | 7/2013 | Benson | G06Q 20/38215 713/155 |
| 2013/0185618 A1* | 7/2013 | Macciola | H04N 1/00251 715/201 |
| 2013/0189953 A1* | 7/2013 | Mathews | G01S 5/02521 455/411 |
| 2013/0191899 A1* | 7/2013 | Eldefrawy | H04L 9/3228 726/6 |
| 2013/0203350 A1* | 8/2013 | Etchegoyen | G06Q 20/40145 455/41.1 |
| 2013/0208893 A1* | 8/2013 | Shablygin | H04L 9/0894 380/277 |
| 2013/0211940 A1* | 8/2013 | Vu | G06Q 30/06 705/26.1 |
| 2013/0212674 A1* | 8/2013 | Boger | G09B 21/008 726/17 |
| 2013/0212704 A1* | 8/2013 | Shablygin | G06F 21/6218 726/28 |
| 2013/0217361 A1* | 8/2013 | Mohammed | H04W 4/50 455/411 |
| 2013/0219456 A1* | 8/2013 | Sharma | H04L 9/0894 726/1 |
| 2013/0225128 A1* | 8/2013 | Gomar | H04L 63/0861 455/411 |
| 2013/0227651 A1* | 8/2013 | Schultz | G06F 21/32 726/4 |
| 2013/0227658 A1* | 8/2013 | Leicher | H04L 63/0876 726/5 |
| 2013/0227675 A1* | 8/2013 | Fujioka | G06F 9/451 726/16 |
| 2013/0232064 A1* | 9/2013 | Bosch | G06Q 20/1085 235/379 |
| 2013/0232541 A1* | 9/2013 | Kapadia | G06F 21/40 726/1 |
| 2013/0238455 A1* | 9/2013 | Laracey | G06Q 20/102 705/21 |
| 2013/0246261 A1* | 9/2013 | Purves | G06Q 20/36 705/41 |
| 2013/0254660 A1* | 9/2013 | Fujioka | A63F 13/12 715/741 |
| 2013/0262311 A1* | 10/2013 | Buhrmann | H04L 63/102 705/44 |
| 2013/0263211 A1* | 10/2013 | Neuman | G06Q 20/322 726/1 |
| 2013/0263238 A1* | 10/2013 | Bidare | H04L 9/3231 726/7 |
| 2013/0263280 A1* | 10/2013 | Cote | G06F 3/04886 726/26 |
| 2013/0264384 A1* | 10/2013 | Wadia | G06Q 20/40145 235/379 |
| 2013/0265136 A1* | 10/2013 | Wadia | G07F 19/201 340/5.53 |
| 2013/0267204 A1* | 10/2013 | Schultz | G06F 21/32 455/411 |
| 2013/0268687 A1* | 10/2013 | Schrecker | H04W 12/06 709/229 |
| 2013/0268758 A1* | 10/2013 | Schrecker | H04W 12/069 713/168 |
| 2013/0268766 A1* | 10/2013 | Schrecker | G06F 21/34 713/185 |
| 2013/0268767 A1* | 10/2013 | Schrecker | G06F 21/31 713/185 |
| 2013/0282438 A1* | 10/2013 | Hunter | G06Q 30/0201 705/7.32 |
| 2013/0283349 A1* | 10/2013 | Liu | G06F 21/44 726/3 |
| 2013/0288647 A1* | 10/2013 | Turgeman | H04W 12/30 455/411 |
| 2013/0290203 A1* | 10/2013 | Purves | G06Q 20/12 705/319 |
| 2013/0290707 A1* | 10/2013 | Sinclair | H04L 9/3226 713/161 |
| 2013/0291079 A1* | 10/2013 | Lowe | G06F 21/00 726/7 |
| 2013/0297933 A1* | 11/2013 | Fiducia | H04L 63/0823 713/156 |
| 2013/0298200 A1* | 11/2013 | Cai | G06F 21/305 726/4 |
| 2013/0301607 A1* | 11/2013 | McCann | H04W 36/1446 370/328 |
| 2013/0305035 A1* | 11/2013 | Lyne | G06Q 20/3278 713/150 |
| 2013/0305392 A1* | 11/2013 | Bar-El | H04L 9/3226 726/29 |
| 2013/0311771 A1* | 11/2013 | Hoggan | H04L 9/3268 713/156 |
| 2013/0314208 A1* | 11/2013 | Risheq | G06F 21/34 340/5.53 |
| 2013/0325728 A1* | 12/2013 | Bialostok | G06Q 10/06 705/311 |
| 2013/0326009 A1* | 12/2013 | Morgan | G06Q 30/02 709/217 |
| 2013/0331027 A1* | 12/2013 | Rose | H04W 12/069 455/41.1 |
| 2013/0332353 A1* | 12/2013 | Aidasani | G06K 19/07749 705/41 |
| 2013/0333011 A1* | 12/2013 | Quigley | G06Q 20/322 726/7 |
| 2013/0333013 A1* | 12/2013 | Quach | H04L 63/08 726/7 |
| 2013/0339498 A1* | 12/2013 | Johnson | H04L 67/104 709/221 |
| 2013/0342311 A1* | 12/2013 | Barbaric | H04W 12/069 340/10.52 |
| 2013/0343538 A1* | 12/2013 | Mizikovsky | H04L 9/3271 380/255 |
| 2013/0346302 A1* | 12/2013 | Purves | G06Q 20/102 705/40 |
| 2013/0347053 A1* | 12/2013 | Motoyama | H04L 63/08 726/1 |
| 2013/0347054 A1* | 12/2013 | Motoyama | H04B 5/77 726/1 |
| 2013/0347055 A1* | 12/2013 | Motoyama | G06F 21/6218 726/1 |
| 2014/0011478 A1* | 1/2014 | Collins | H04W 48/06 455/411 |
| 2014/0016628 A1* | 1/2014 | McCann | H04L 63/162 370/338 |
| 2014/0019352 A1* | 1/2014 | Shrivastava | G06Q 20/326 705/41 |
| 2014/0020070 A1* | 1/2014 | Angal | H04L 63/10 726/5 |
| 2014/0024361 A1* | 1/2014 | Poon | H04W 8/22 455/419 |
| 2014/0026160 A1* | 1/2014 | Shrum, Jr. | H04N 21/2541 725/93 |
| 2014/0026187 A1* | 1/2014 | Johnson | H04L 63/08 726/3 |
| 2014/0038650 A1* | 2/2014 | Wang | H04W 4/12 455/466 |
| 2014/0040051 A1* | 2/2014 | Ovick | G07G 3/003 705/16 |
| 2014/0040135 A1* | 2/2014 | Ovick | G06Q 30/0207 705/44 |

(56) References Cited

U.S. PATENT DOCUMENTS

| | | | |
|---|---|---|---|
| 2014/0046842 A1* | 2/2014 | Irudayam | G06Q 20/32 235/379 |
| 2014/0050320 A1* | 2/2014 | Choyi | H04W 12/06 380/270 |
| 2014/0052617 A1* | 2/2014 | Chawla | G06Q 20/102 705/39 |
| 2014/0058938 A1* | 2/2014 | McClung, III | G06Q 20/36 705/41 |
| 2014/0058944 A1* | 2/2014 | Ballout | G06Q 40/02 705/43 |
| 2014/0066013 A1* | 3/2014 | Mascarenhas | H04W 72/0446 455/411 |
| 2014/0068722 A1* | 3/2014 | Hayat | H04W 12/084 726/4 |
| 2014/0068723 A1* | 3/2014 | Grim | H04L 63/08 726/4 |
| 2014/0071967 A1* | 3/2014 | Velasco | H04L 12/1403 370/338 |
| 2014/0073288 A1* | 3/2014 | Velasco | H04W 4/02 455/411 |
| 2014/0073289 A1* | 3/2014 | Velasco | H04W 12/04 455/411 |
| 2014/0073375 A1* | 3/2014 | Li | H04W 12/069 455/558 |
| 2014/0081858 A1* | 3/2014 | Block | G06Q 20/1085 705/43 |
| 2014/0082707 A1* | 3/2014 | Egan | H04L 63/0853 726/5 |
| 2014/0090018 A1* | 3/2014 | Svigals | H04W 12/068 726/3 |
| 2014/0090039 A1* | 3/2014 | Bhow | H04W 12/06 726/7 |
| 2014/0096201 A1* | 4/2014 | Gupta | G06F 21/83 726/4 |
| 2014/0096215 A1* | 4/2014 | Hessler | H04W 12/06 726/7 |
| 2014/0098671 A1* | 4/2014 | Raleigh | H04M 15/58 370/235 |
| 2014/0101426 A1* | 4/2014 | Senthurpandi | G06F 21/575 713/1 |
| 2014/0101434 A1* | 4/2014 | Senthurpandi | G06F 12/1408 713/150 |
| 2014/0101453 A1* | 4/2014 | Senthurpandi | G06F 21/32 713/172 |
| 2014/0106710 A1* | 4/2014 | Rodriguez | H04W 4/12 455/411 |
| 2014/0109178 A1* | 4/2014 | Barton | G06F 21/604 726/1 |
| 2014/0113556 A1* | 4/2014 | Kotecha | H04W 12/0471 455/41.2 |
| 2014/0115333 A1* | 4/2014 | King | H04W 12/06 713/168 |
| 2014/0123224 A1* | 5/2014 | Nosrati | H04W 12/50 726/3 |
| 2014/0137199 A1* | 5/2014 | Hefetz | H04M 15/8033 726/3 |
| 2014/0143064 A1* | 5/2014 | Tran | A61B 5/01 705/14.66 |
| 2014/0143839 A1* | 5/2014 | Ricci | H04N 21/814 726/4 |
| 2014/0148123 A1* | 5/2014 | Raleigh | H04W 12/08 455/406 |
| 2014/0150059 A1* | 5/2014 | Uchida | H04L 63/08 707/661 |
| 2014/0157298 A1* | 6/2014 | Murphy | H04N 21/2347 725/110 |
| 2014/0162598 A1* | 6/2014 | Villa-Real | G07F 7/0886 455/411 |
| 2014/0164254 A1* | 6/2014 | Dimmick | G06Q 20/4014 705/44 |
| 2014/0164774 A1* | 6/2014 | Nord | H04L 9/0861 713/171 |
| 2014/0165134 A1* | 6/2014 | Goldschlag | G06F 21/62 726/1 |
| 2014/0165170 A1* | 6/2014 | Dmitriev | H04W 12/069 726/7 |
| 2014/0165178 A1* | 6/2014 | Perrone, II | H04L 63/0892 726/5 |
| 2014/0166745 A1* | 6/2014 | Graef | G07F 19/00 235/379 |
| 2014/0173692 A1* | 6/2014 | Srinivasan | H04W 12/02 726/4 |
| 2014/0173700 A1* | 6/2014 | Awan | H04W 12/02 726/4 |
| 2014/0173704 A1* | 6/2014 | Adams | H04L 63/06 726/5 |
| 2014/0180826 A1* | 6/2014 | Boal | G06Q 30/0269 705/14.66 |
| 2014/0180850 A1* | 6/2014 | Ackley | G06Q 20/3274 705/16 |
| 2014/0183269 A1* | 7/2014 | Glaser | G06K 19/07701 235/492 |
| 2014/0187205 A1* | 7/2014 | Dankar | H04W 4/023 455/410 |
| 2014/0188738 A1* | 7/2014 | Huxham | H04W 12/033 705/73 |
| 2014/0189808 A1* | 7/2014 | Mahaffey | G06F 21/6245 726/4 |
| 2014/0198687 A1* | 7/2014 | Raleigh | G06Q 10/06375 370/328 |
| 2014/0199961 A1* | 7/2014 | Mohammed | H04M 15/61 455/406 |
| 2014/0199962 A1* | 7/2014 | Mohammed | H04M 15/8033 455/406 |
| 2014/0201517 A1* | 7/2014 | Corrion | H04L 63/0884 713/155 |
| 2014/0201537 A1* | 7/2014 | Sampas | H04L 63/10 713/186 |
| 2014/0214688 A1* | 7/2014 | Weiner | G06Q 20/3227 705/71 |
| 2014/0233831 A1* | 8/2014 | Palmer | G06F 16/50 382/137 |
| 2014/0236728 A1* | 8/2014 | Wright | G06Q 30/0261 705/14.66 |
| 2014/0237591 A1* | 8/2014 | Niemela | G06F 21/57 726/22 |
| 2014/0241635 A1* | 8/2014 | Ruppaner | G06V 30/1463 382/197 |
| 2014/0244617 A1* | 8/2014 | Rose | G06F 16/58 707/722 |
| 2014/0244783 A1* | 8/2014 | Ortiz | H04L 63/10 709/217 |
| 2014/0245391 A1* | 8/2014 | Adenuga | G06Q 20/40 726/3 |
| 2014/0245459 A1* | 8/2014 | Ortiz | G06F 21/6218 726/28 |
| 2014/0250105 A1* | 9/2014 | Shankar | G06F 16/9535 707/722 |
| 2014/0256251 A1* | 9/2014 | Caceres | H04W 12/03 455/41.1 |
| 2014/0258120 A1* | 9/2014 | Specogna | G06Q 20/409 705/44 |
| 2014/0259115 A1* | 9/2014 | Bakshi | H04L 63/08 726/4 |
| 2014/0259147 A1* | 9/2014 | L'Heureux | H04L 63/02 726/14 |
| 2014/0263618 A1* | 9/2014 | McCarthy | G06Q 40/02 235/379 |
| 2014/0270126 A1* | 9/2014 | Torgersrud | H04M 3/38 379/189 |
| 2014/0273824 A1* | 9/2014 | Fenner | H04B 5/79 455/41.1 |
| 2014/0279477 A1* | 9/2014 | Sheets | G06Q 20/3278 705/41 |
| 2014/0279513 A1* | 9/2014 | Dodds-Brown | G06Q 20/4016 705/44 |
| 2014/0281946 A1* | 9/2014 | Avni | G06F 21/32 726/4 |

(56) References Cited

U.S. PATENT DOCUMENTS

| | | | |
|---|---|---|---|
| 2014/0282961 A1* | 9/2014 | Dorfman | G06Q 20/3276 726/7 |
| 2014/0282985 A1* | 9/2014 | Joseph | G06F 21/42 726/9 |
| 2014/0283136 A1* | 9/2014 | Dougherty | H04W 64/00 726/29 |
| 2014/0289116 A1* | 9/2014 | Polivanyi | G07F 19/20 705/44 |
| 2014/0289833 A1* | 9/2014 | Briceno | H04W 12/06 726/5 |
| 2014/0289834 A1* | 9/2014 | Lindemann | G06Q 20/425 726/7 |
| 2014/0298430 A1* | 10/2014 | Tomasik | G06F 21/316 726/5 |
| 2014/0310764 A1* | 10/2014 | Tippett | G06F 21/31 726/1 |
| 2014/0324638 A1* | 10/2014 | Khalid | G06Q 30/0238 705/27.1 |
| 2014/0331060 A1* | 11/2014 | Hayton | G06F 21/32 713/185 |
| 2014/0333415 A1* | 11/2014 | Kursun | G06Q 30/00 340/5.83 |
| 2014/0337221 A1* | 11/2014 | Hoyos | G06Q 20/3276 705/44 |
| 2014/0337227 A1* | 11/2014 | Dua | G06Q 20/3821 705/44 |
| 2014/0337243 A1* | 11/2014 | Dutt | G06Q 20/322 705/325 |
| 2014/0337949 A1* | 11/2014 | Hoyos | H04L 63/0853 726/7 |
| 2014/0337954 A1* | 11/2014 | Ahmed | H04L 63/0815 726/8 |
| 2014/0341185 A1* | 11/2014 | Yoon | H04W 12/069 370/331 |
| 2014/0344909 A1* | 11/2014 | Raji | G06F 21/00 726/7 |
| 2014/0351899 A1* | 11/2014 | Dennis | H04W 12/06 726/4 |
| 2014/0359722 A1* | 12/2014 | Schultz | H04L 63/0861 726/5 |
| 2014/0372319 A1* | 12/2014 | Wolovitz | G06Q 20/3829 705/44 |
| 2014/0376703 A1* | 12/2014 | Timem | H04M 3/527 379/88.02 |
| 2014/0379339 A1* | 12/2014 | Timem | G06F 21/32 704/246 |
| 2014/0379340 A1* | 12/2014 | Timem | G06F 21/32 704/246 |
| 2014/0379525 A1* | 12/2014 | Timem | G06Q 20/3227 705/26.41 |
| 2014/0380425 A1* | 12/2014 | Lockett | G06F 21/00 726/4 |
| 2015/0004934 A1* | 1/2015 | Qian | H04W 12/06 455/411 |
| 2015/0012425 A1* | 1/2015 | Mathew | G06Q 20/36 705/41 |
| 2015/0015365 A1* | 1/2015 | Ortiz | G07C 9/25 340/5.52 |
| 2015/0019424 A1* | 1/2015 | Pourfallah | G06Q 40/02 705/42 |
| 2015/0019944 A1* | 1/2015 | Kalgi | G06Q 20/3552 715/205 |
| 2015/0025971 A1* | 1/2015 | Shipley | G06Q 50/01 705/14.55 |
| 2015/0026049 A1* | 1/2015 | Theurer | G06Q 20/36 705/41 |
| 2015/0026055 A1* | 1/2015 | Calman | G06Q 20/3223 705/42 |
| 2015/0026056 A1* | 1/2015 | Calman | G06Q 20/3223 705/42 |
| 2015/0026057 A1* | 1/2015 | Calman | G06Q 20/3223 705/42 |
| 2015/0033289 A1* | 1/2015 | Caceres | H04W 4/02 726/3 |
| 2015/0035643 A1* | 2/2015 | Kursun | G07C 9/32 340/5.82 |
| 2015/0058941 A1* | 2/2015 | Lyman | H04L 63/102 726/6 |
| 2015/0063661 A1* | 3/2015 | Lee | G06V 40/107 382/124 |
| 2015/0067785 A1* | 3/2015 | Donnellan | H04W 12/12 726/4 |
| 2015/0067823 A1* | 3/2015 | Chatterton | G06F 21/32 726/19 |
| 2015/0072726 A1* | 3/2015 | Stern | H04W 88/06 455/552.1 |
| 2015/0073987 A1* | 3/2015 | Dutt | H04L 63/08 705/44 |
| 2015/0074259 A1* | 3/2015 | Ansari | H04M 15/31 709/224 |
| 2015/0074745 A1* | 3/2015 | Stern | H04L 63/20 726/1 |
| 2015/0074764 A1* | 3/2015 | Stern | H04L 9/088 726/4 |
| 2015/0077326 A1* | 3/2015 | Kramer | G06F 3/0346 345/156 |
| 2015/0089585 A1* | 3/2015 | Novack | H04L 63/08 726/3 |
| 2015/0089607 A1* | 3/2015 | Hubner | H04L 63/0838 726/6 |
| 2015/0089613 A1* | 3/2015 | Tippett | H04L 63/18 726/7 |
| 2015/0089621 A1* | 3/2015 | Khalid | H04L 63/0807 726/9 |
| 2015/0095773 A1* | 4/2015 | Gonsalves | H04M 1/72469 715/709 |
| 2015/0096001 A1* | 4/2015 | Morikuni | H04L 63/123 726/7 |
| 2015/0106265 A1* | 4/2015 | Stubblefield | G06Q 20/4016 705/325 |
| 2015/0106869 A1* | 4/2015 | Cabrera | H04L 9/3226 726/1 |
| 2015/0109428 A1* | 4/2015 | Mechaley, Jr. | G06V 10/95 348/77 |
| 2015/0120549 A1* | 4/2015 | Khalid | G06Q 20/3224 705/44 |
| 2015/0120878 A1* | 4/2015 | Horgan | G06Q 10/20 709/219 |
| 2015/0121506 A1* | 4/2015 | Cavanaugh | G06F 21/6218 726/16 |
| 2015/0125832 A1* | 5/2015 | Tran | G09B 5/00 434/127 |
| 2015/0134340 A1* | 5/2015 | Blaisch | G06F 16/958 704/275 |
| 2015/0142647 A1* | 5/2015 | Johnson | G06Q 20/102 705/40 |
| 2015/0143116 A1* | 5/2015 | Tang | G06Q 20/204 713/168 |
| 2015/0156601 A1* | 6/2015 | Donnellan | H04W 12/35 455/41.1 |
| 2015/0163121 A1* | 6/2015 | Mahaffey | H04L 41/142 707/687 |
| 2015/0177978 A1* | 6/2015 | Kuo | H04B 5/0012 345/173 |
| 2015/0181364 A1* | 6/2015 | Chen | H04W 4/50 455/418 |
| 2015/0181424 A1* | 6/2015 | Hardy | H04W 12/069 726/7 |
| 2015/0186636 A1* | 7/2015 | Tharappel | G06F 21/32 726/8 |
| 2015/0186872 A1* | 7/2015 | Sobol | G06Q 20/351 705/41 |
| 2015/0195278 A1* | 7/2015 | Plotkin | H04L 63/0861 713/186 |
| 2015/0215299 A1* | 7/2015 | Burch | H04W 12/069 726/5 |
| 2015/0215315 A1* | 7/2015 | Gordon | G06F 21/31 726/5 |

(56) References Cited

U.S. PATENT DOCUMENTS

| | | | |
|---|---|---|---|
| 2015/0220912 A1* | 8/2015 | Holdsworth | G06Q 20/3278 705/72 |
| 2015/0221151 A1* | 8/2015 | Bacco | H04L 9/3231 340/5.83 |
| 2015/0222604 A1* | 8/2015 | Ylonen | H04L 9/3263 713/171 |
| 2015/0222615 A1* | 8/2015 | Allain | H04L 67/55 726/4 |
| 2015/0223056 A1* | 8/2015 | Ludwig | G16H 10/60 455/411 |
| 2015/0227725 A1* | 8/2015 | Grigg | G06F 21/31 726/7 |
| 2015/0227731 A1* | 8/2015 | Grigg | H04L 63/10 726/7 |
| 2015/0227734 A1* | 8/2015 | Mucci | H04W 12/065 726/19 |
| 2015/0242605 A1* | 8/2015 | Du | G06F 21/32 726/7 |
| 2015/0242609 A1* | 8/2015 | Zheng | G06F 21/34 713/159 |
| 2015/0244796 A1* | 8/2015 | Joy | H04W 12/065 709/203 |
| 2015/0244876 A1* | 8/2015 | Jabara | H04M 15/8044 455/406 |
| 2015/0249540 A1* | 9/2015 | Khalil | H04L 63/18 713/158 |
| 2015/0257004 A1* | 9/2015 | Shanmugam | H04W 12/065 455/411 |
| 2015/0278495 A1* | 10/2015 | Yu | H04L 9/3239 713/186 |
| 2015/0278556 A1* | 10/2015 | Avni | G06F 21/31 726/35 |
| 2015/0281888 A1* | 10/2015 | Muttik | H04L 9/0891 455/456.1 |
| 2015/0287018 A1* | 10/2015 | Iqbal | G06Q 20/3221 705/44 |
| 2015/0288687 A1* | 10/2015 | Heshmati | H04L 67/10 726/7 |
| 2015/0304322 A1* | 10/2015 | Zaidi | G06V 40/70 382/115 |
| 2015/0319610 A1* | 11/2015 | Hartog | H04W 12/0431 455/419 |
| 2015/0326570 A1* | 11/2015 | Publicover | G06V 40/197 382/117 |
| 2015/0334554 A1* | 11/2015 | Song | H04W 8/183 455/558 |
| 2015/0350902 A1* | 12/2015 | Baxley | H04W 4/90 726/7 |
| 2015/0358400 A1* | 12/2015 | Bartlett, II | H04W 12/10 709/201 |
| 2015/0373020 A1* | 12/2015 | Hale | G06Q 10/06375 713/170 |
| 2015/0381602 A1* | 12/2015 | Grim | H04W 12/30 726/4 |
| 2015/0381633 A1* | 12/2015 | Grim | H04L 63/0861 726/4 |
| 2015/0382195 A1* | 12/2015 | Grim | H04W 12/06 726/4 |
| 2016/0006718 A1* | 1/2016 | Huxham | G06F 21/35 726/6 |
| 2016/0012390 A1* | 1/2016 | Skaaksrud | G06Q 20/321 705/332 |
| 2016/0014102 A1* | 1/2016 | Gamer | H04L 9/083 370/331 |
| 2016/0014605 A1* | 1/2016 | Robinton | G06F 21/32 726/6 |
| 2016/0021537 A1* | 1/2016 | Dennis | H04W 12/08 726/4 |
| 2016/0027016 A1* | 1/2016 | McGraw | G06Q 20/382 705/72 |
| 2016/0028770 A1* | 1/2016 | Raleigh | H04L 63/20 726/1 |
| 2016/0036810 A1* | 2/2016 | Kim | H04L 67/60 726/7 |
| 2016/0036825 A1* | 2/2016 | Manroa | H04W 12/069 726/1 |
| 2016/0037438 A1* | 2/2016 | Manroa | H04W 12/06 370/338 |
| 2016/0048846 A1* | 2/2016 | Douglas | G06F 16/23 705/318 |
| 2016/0050203 A1* | 2/2016 | Hefetz | H04L 51/18 726/7 |
| 2016/0063235 A1* | 3/2016 | Tussy | G06V 40/166 726/6 |
| 2016/0080937 A1* | 3/2016 | Pieczul | H04L 9/3226 455/556.1 |
| 2016/0094701 A1* | 3/2016 | Hund | H04W 12/06 455/420 |
| 2016/0109954 A1* | 4/2016 | Harris | G06V 20/20 345/156 |
| 2016/0119870 A1* | 4/2016 | Chang | H04W 12/03 455/552.1 |
| 2016/0127989 A1* | 5/2016 | Zhang | H04W 52/0235 726/7 |
| 2016/0165645 A1* | 6/2016 | Commons | H04W 8/22 455/420 |
| 2016/0174069 A1* | 6/2016 | Bruner | H04L 63/065 455/411 |
| 2016/0183085 A1* | 6/2016 | Yerrabommanahalli | H04L 63/107 713/153 |
| 2016/0198341 A1* | 7/2016 | Fransen | H04W 12/02 455/410 |
| 2016/0212103 A1* | 7/2016 | Rhoads | H04L 63/0869 |
| 2016/0234690 A1* | 8/2016 | Michalski | H04W 4/06 |
| 2016/0248762 A1* | 8/2016 | Higashibata | H04L 63/0838 |
| 2016/0249396 A1* | 8/2016 | Kolekar | H04W 12/50 |
| 2016/0352713 A1* | 12/2016 | Grissen | H04L 63/08 |
| 2016/0360406 A1* | 12/2016 | Shen | H04M 1/72412 |
| 2016/0366586 A1* | 12/2016 | Gross | H04L 63/0876 |
| 2016/0366587 A1* | 12/2016 | Gross | H04L 63/0846 |
| 2016/0379211 A1* | 12/2016 | Hoyos | H04L 63/0861 705/75 |
| 2017/0011210 A1* | 1/2017 | Cheong | A61B 5/681 |
| 2017/0041791 A1* | 2/2017 | Zhang | H04W 12/068 |
| 2017/0041986 A1* | 2/2017 | Sela | H04M 1/7246 |
| 2017/0064551 A1* | 3/2017 | Block | G06Q 20/341 |
| 2017/0078260 A1* | 3/2017 | Shen | H04W 12/08 |
| 2017/0093846 A1* | 3/2017 | Lopez Lecube | H04W 12/068 |
| 2017/0103440 A1* | 4/2017 | Xing | H04W 12/06 |
| 2017/0111487 A1* | 4/2017 | Musial | H04W 12/068 |
| 2017/0127230 A1* | 5/2017 | Enriquez | H04L 67/12 |
| 2017/0150358 A1* | 5/2017 | Zhang | H04L 63/08 |
| 2017/0156090 A1* | 6/2017 | Bhumkar | H04W 36/0038 |
| 2017/0169424 A1* | 6/2017 | Maddocks | G06Q 20/3821 |
| 2017/0171754 A1* | 6/2017 | South | H04W 12/06 |
| 2017/0251366 A1* | 8/2017 | Perna | G06F 21/32 |
| 2017/0264645 A1* | 9/2017 | Tipton | H04W 12/06 |
| 2017/0277487 A1* | 9/2017 | Chang | G06F 3/1288 |
| 2017/0280310 A1* | 9/2017 | Jain | H04W 4/90 |
| 2017/0303160 A1* | 10/2017 | Poltorak | H04M 15/8011 |
| 2017/0346851 A1* | 11/2017 | Drake | H04L 9/0838 |
| 2017/0364899 A1* | 12/2017 | Watson | G06Q 20/3263 |
| 2018/0014193 A1* | 1/2018 | Dennis | H04L 63/107 |
| 2018/0026949 A1* | 1/2018 | Kimn | H04W 12/069 713/156 |
| 2018/0026973 A1* | 1/2018 | Le Saint | H04L 63/062 713/168 |
| 2018/0032997 A1* | 2/2018 | Gordon | G06Q 30/0269 |
| 2018/0039990 A1* | 2/2018 | Lindemann | G06V 40/19 |
| 2018/0049028 A1* | 2/2018 | Tali | H04W 4/80 |
| 2018/0063125 A1* | 3/2018 | Bryant | H04L 63/08 |
| 2018/0063764 A1* | 3/2018 | Bollapalli | H04L 65/1069 |
| 2018/0102008 A1* | 4/2018 | Dupart | G06K 17/0022 |
| 2018/0103341 A1* | 4/2018 | Moiyallah, Jr. | G06F 3/04842 |
| 2018/0114387 A1* | 4/2018 | Klink | H04L 63/108 |
| 2018/0115897 A1* | 4/2018 | Einberg | H04L 63/0428 |
| 2018/0160304 A1* | 6/2018 | Liu | H04W 12/06 |
| 2018/0181735 A1* | 6/2018 | Yang | G06F 21/36 |

(56) References Cited

U.S. PATENT DOCUMENTS

| | | | |
|---|---|---|---|
| 2018/0204204 A1* | 7/2018 | Giraudo | G06Q 30/0633 |
| 2018/0241577 A1* | 8/2018 | D'Souza | H04L 63/0492 |
| 2018/0248892 A1* | 8/2018 | Hefetz | H04W 12/06 |
| 2018/0270608 A1* | 9/2018 | Thoresen | H04W 12/06 |
| 2018/0270612 A1* | 9/2018 | Thoresen | G01S 1/02 |
| 2018/0300678 A1* | 10/2018 | Drako | G07C 9/00571 |
| 2018/0302414 A1* | 10/2018 | Wagner | H04L 63/107 |
| 2018/0351375 A1* | 12/2018 | Baldasare | H04W 12/065 |
| 2018/0357406 A1* | 12/2018 | Bolotin | H04L 9/002 |
| 2018/0368058 A1* | 12/2018 | Huang | H04W 48/16 |
| 2019/0080538 A1* | 3/2019 | Shahidi | H04W 4/33 |
| 2019/0092280 A1* | 3/2019 | Oesterling | G06F 21/86 |
| 2019/0158469 A1* | 5/2019 | Gonzalez | H04L 63/0428 |
| 2019/0174011 A1* | 6/2019 | Jabara | H04M 15/8214 |
| 2019/0180742 A1* | 6/2019 | Kothari | G06F 3/167 |
| 2019/0182627 A1* | 6/2019 | Thoresen | H04L 63/045 |
| 2019/0213311 A1* | 7/2019 | Tussy | G06V 10/17 |
| 2019/0213312 A1* | 7/2019 | Tussy | G06Q 20/3276 |
| 2019/0228178 A1* | 7/2019 | Sharma | H04L 63/0853 |
| 2019/0263424 A1* | 8/2019 | Penilla | H04L 63/107 |
| 2019/0268334 A1* | 8/2019 | Kurian | H04L 41/0893 |
| 2019/0274046 A1* | 9/2019 | Lierman | H04L 63/107 |
| 2019/0288837 A1* | 9/2019 | St Amant | H04L 9/0894 |
| 2019/0311102 A1* | 10/2019 | Tussy | G06V 40/67 |
| 2019/0357049 A1* | 11/2019 | Tali | H04W 12/64 |
| 2019/0370699 A1* | 12/2019 | Chaplow | H04L 63/0823 |
| 2020/0029213 A1* | 1/2020 | Nölscher | B60R 25/24 |
| 2020/0042685 A1* | 2/2020 | Tussy | H04L 63/0861 |
| 2020/0068643 A1* | 2/2020 | Dowlatkhah | H04W 12/08 |
| 2020/0092272 A1* | 3/2020 | Eisen | H04L 63/0869 |
| 2020/0186352 A1* | 6/2020 | Arora | H04L 9/008 |
| 2020/0193749 A1* | 6/2020 | Link, II | G06F 21/34 |
| 2020/0210988 A1* | 7/2020 | Woodward | G06Q 20/409 |
| 2020/0228969 A1* | 7/2020 | Shin | H04W 12/06 |
| 2020/0236116 A1* | 7/2020 | Bower | G06K 19/0723 |
| 2020/0259896 A1* | 8/2020 | Sachs | H04J 3/0667 |
| 2020/0267144 A1* | 8/2020 | Wagner | G06Q 20/1085 |
| 2020/0267553 A1* | 8/2020 | Wagner | G06F 21/32 |
| 2020/0275267 A1* | 8/2020 | Wang | G06Q 20/3224 |
| 2020/0275546 A1* | 8/2020 | Marshal | H04L 9/3013 |
| 2020/0279255 A1* | 9/2020 | Douglas | H04L 63/0876 |
| 2020/0279269 A1* | 9/2020 | Wagner | G06F 21/606 |
| 2020/0293753 A1* | 9/2020 | Sehgal | H04L 63/0861 |
| 2020/0294042 A1* | 9/2020 | Day | H04W 12/04 |
| 2020/0336906 A1* | 10/2020 | Belhareth | H04L 65/1069 |
| 2020/0383034 A1* | 12/2020 | Oetting | H04W 12/61 |
| 2020/0402052 A1* | 12/2020 | Sloane | H04L 63/105 |
| 2020/0402334 A1* | 12/2020 | Conrad | H04W 12/04 |
| 2020/0403990 A1* | 12/2020 | Storm | G06F 21/32 |
| 2020/0412133 A1* | 12/2020 | Baldasare | G06V 40/172 |
| 2021/0029540 A1* | 1/2021 | Sodano | H04L 67/306 |
| 2021/0067935 A1* | 3/2021 | Amaral Costa | H04W 4/021 |
| 2021/0086726 A1* | 3/2021 | Hassani | B60Q 1/549 |
| 2021/0096559 A1* | 4/2021 | Diamond | H04W 4/021 |
| 2021/0097156 A1* | 4/2021 | Kröselberg | G05B 19/042 |
| 2021/0105169 A1* | 4/2021 | Choi | H04L 67/04 |
| 2021/0112488 A1* | 4/2021 | Meredith | H04W 12/06 |
| 2021/0158325 A1* | 5/2021 | Mimassi | G06Q 20/3827 |
| 2021/0158384 A1* | 5/2021 | Mimassi | G06Q 10/02 |
| 2021/0168116 A1* | 6/2021 | Shulman | H04W 56/0015 |
| 2021/0174321 A1* | 6/2021 | Rose | H04L 41/22 |
| 2021/0176242 A1* | 6/2021 | McDougall | G06F 21/32 |
| 2021/0206350 A1* | 7/2021 | Henderson | H04W 4/023 |
| 2021/0211279 A1* | 7/2021 | Nix | H04L 67/34 |
| 2021/0226921 A1* | 7/2021 | Rose | H04L 63/0272 |
| 2021/0240293 A1* | 8/2021 | Van Ostrand | G06F 3/016 |
| 2021/0249882 A1* | 8/2021 | Baldasare | H04M 1/72409 |
| 2021/0256833 A1* | 8/2021 | Daoura | H04W 4/021 |
| 2021/0258774 A1* | 8/2021 | Ramsay, III | H04W 12/63 |
| 2021/0265843 A1* | 8/2021 | Baldasare | H04W 4/021 |
| 2021/0288951 A1* | 9/2021 | Rose | H04L 63/0861 |
| 2021/0295304 A1* | 9/2021 | Iqbal | G06Q 20/3221 |
| 2021/0357489 A1* | 11/2021 | Tali | G06F 16/2379 |
| 2021/0358247 A1* | 11/2021 | Novozhenets | H04B 17/318 |
| 2021/0360742 A1* | 11/2021 | Liao | H04W 60/00 |
| 2021/0377350 A1* | 12/2021 | Nelluri | H04L 63/08 |
| 2022/0014527 A1* | 1/2022 | Ratnakaram | H04L 63/12 |
| 2022/0030427 A1* | 1/2022 | Megerdichian | H04L 63/126 |
| 2022/0092162 A1* | 3/2022 | Keith, Jr. | G06F 21/35 |
| 2022/0092163 A1* | 3/2022 | Keith, Jr. | H04L 9/3231 |
| 2022/0092164 A1* | 3/2022 | Keith, Jr. | G06F 21/606 |
| 2022/0092165 A1* | 3/2022 | Keith, Jr. | G06F 21/316 |
| 2022/0103640 A1* | 3/2022 | Root | G06F 9/452 |
| 2022/0138746 A1* | 5/2022 | Rodriguez | G06Q 20/401 |
| | | | 705/43 |
| 2022/0166768 A1* | 5/2022 | Barkan | H04M 3/42 |
| 2022/0181887 A1* | 6/2022 | Baldasare | G08B 21/182 |
| 2022/0270144 A1* | 8/2022 | Mimassi | H04W 12/06 |
| 2022/0272536 A1* | 8/2022 | Anderson | H04W 12/61 |
| 2022/0294894 A1* | 9/2022 | Hefetz | G06Q 20/3224 |
| 2022/0303802 A1* | 9/2022 | Otaka | H04W 24/08 |
| 2022/0312195 A1* | 9/2022 | Schnabel | H04W 12/03 |
| 2022/0394468 A1* | 12/2022 | Avetisov | H04L 63/083 |
| 2022/0408263 A1* | 12/2022 | Hoggat | H04W 4/026 |
| 2023/0106024 A1* | 4/2023 | Keith, Jr. | G16H 40/63 |
| | | | 726/5 |
| 2023/0111629 A1* | 4/2023 | Van Wageningen | H04B 10/1129 |
| | | | 398/118 |
| 2023/0262460 A1* | 8/2023 | Kunz | H04W 60/00 |
| | | | 455/410 |
| 2023/0306548 A1* | 9/2023 | Potts | G06Q 20/18 |
| 2023/0359714 A1* | 11/2023 | Cristache | G06F 3/04842 |
| 2023/0394127 A1* | 12/2023 | Tussy | G06V 40/67 |
| 2024/0095698 A1* | 3/2024 | Thimmareddy | G06Q 20/386 |
| 2024/0104533 A1* | 3/2024 | Thimmareddy | G07F 19/203 |
| 2024/0127206 A1* | 4/2024 | Thimmareddy | G07F 19/211 |
| 2024/0129725 A1* | 4/2024 | Woo | H04W 4/20 |
| 2024/0143706 A1* | 5/2024 | Bacastow | G06F 21/78 |
| 2024/0196181 A1* | 6/2024 | Grayson | H04W 12/06 |
| 2024/0202297 A1* | 6/2024 | Bolotin | H04W 12/068 |
| 2024/0217528 A1* | 7/2024 | Oh | B60K 35/10 |
| 2025/0055560 A1* | 2/2025 | Edge | H04W 28/0215 |

OTHER PUBLICATIONS

Shrestha et al "Context-Enhanced Mobile Device Authorization and Authentication," A Dissertation, pp. 1-186 (Year: 2016).*

Lee et al "Fast Authentication in Multi-Hop Infrastructure-based Mobile Communication," IEEE ICC 2014—Communication and Information Systems Security Symposium, pp. 665-670 (Year: 2014).*

Dellutri et al "Local Authentication with Bluetooth enabled Mobile Devices," IEEE Computer Society, pp. 1-6 (Year: 2005).*

Das et al "Designing a Biometric Strategy (Fingerprint) Measure for Enhacing ATM Security in Indian E-Banking System," International Journal of Information and Communication Technology Research, vol. 1, No. 5, Sep. 2011, pp. 197-203 (Year: 2011).*

Clodfelter et al "Biometric Technology in Retailing: Will Consumers Accept Fingerprint Authentication?", Journal of Retailing and Consumer Services, pp. 181-188 (Year: 2010).*

Chen et al "Secondary User Authentication based on Mobile Devices Location," 2010 Fifth IEEE International Conference on Networking, Architecture and Storage, IEEE Computer Society, pp. 277-281 (Year: 2010).*

Biometric-Kerberos Authentication Scheme for Secure Mobile Computing Services, 2013 6th International Congress on Image and Signal Processing (CISP 2013), IEEE, pp. 1-5 (Year: 2013).*

Ghazia et al "Comparative Analysis of Access Control Systems on Cloud," IEEE Computer Society, pp. 41-46 (Year: 2012).*

Gusmeroli et al "IoT Access Control Issues: a Capability Based Approach," IEEE, pp. 787-792.*

Shacham et al "The Virtual Device: Expanding Wireless Communication Services through Service Discovery and Session Mobility," IEEE, pp. 73-81 (Year: 2005).*

Akyol et al "Signaling Alternatives in a Wireless ATM Network," IEEE, pp. 35-49 (Year: 1997).*

* cited by examiner

SYSTEMS AND METHODS FOR DETECTED-CAPABILITY-BASED AUTHENTICATION OF A MOBILE DEVICE FOR PERFORMING AN ACCESS OPERATION WITH A LOCAL DEVICE

CROSS REFERENCE TO RELATED APPLICATIONS

This application is a continuation of U.S. patent application Ser. No. 17/343,241, filed Jun. 9, 2021, which is a continuation of U.S. patent application Ser. No. 16/569,658, filed Sep. 12, 2019, which is a continuation of U.S. patent application Ser. No. 14/680,857, filed Apr. 7, 2015, which claims the benefit of priority of U.S. Provisional Patent Application No. 61/976,703, filed Apr. 8, 2014, and U.S. Provisional Patent Application No. 62/102,857, filed Jan. 13, 2015. The content of the foregoing applications is incorporated herein in its entirety by reference.

SUMMARY

In some embodiments, based on a wireless signal of a mobile device (e.g., obtained by a local device) the mobile device and a first authentication capability of the mobile device may be detected. Based on the detection of the mobile device, presentation instructions may be transmitted to the mobile device to present access initiation options on a user interface of the mobile device. Based on a selection of a first option of the access initiation options via the user interface to initiate an access request for an access operation with the local device, an authentication request may be generated, where the authentication request is associated with the first authentication capability and with a first authentication tier. As an example, the authentication request may be generated based on (i) the first authentication capability being detected as an authentication capability of the mobile device and (ii) the first authentication tier corresponding to an access amount of the access request. In some embodiments, based on a detection of a fingerprint scanner being on the mobile device, a fingerprint authentication capability of the mobile device may be detected. Based on detecting the fingerprint authentication capability of the mobile device, the authentication request may be generated to include a prompt related to fingerprint scanning.

In some embodiments, in connection with the authentication request, authentication data (e.g., for completing the access operation with the local device) may be obtained from the mobile device. Based on the authentication data, access to the local device (e.g., for completing the access operation with the local device) may be granted. In some embodiments, based on the authentication data, dispensing instructions may be transmitted to the local device to dispense one or more items from within the local device to complete the access operation with the local device.

In some embodiments, the mobile device may be initially detected as being within a first predetermined distance of the local device (e.g., while the mobile device is not within a second predetermined distance of the local device), where the access initiation options are presented on the user interface of the mobile device based on the initial detection of the mobile device as being within the first predetermined distance. In some embodiments, the mobile device may be subsequently detected as being within the first and second predetermined distances of the local device. Based on the authentication data and the mobile device being detected as being within the first and second predetermined distances of the local device, the dispensing instructions may be transmitted to the local device to dispense one or more items from within the local device to complete the access operation with the local device.

It is to be understood that both the foregoing general description and the following detailed description are exemplary and explanatory only, and are not restrictive of the disclosed embodiments, as claimed. It should be understood that the disclosure, in its broadest sense, could be practiced without having one or more features of these aspects and embodiments.

BRIEF DESCRIPTION OF THE DRAWINGS

The accompanying drawings, which are incorporated in and constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
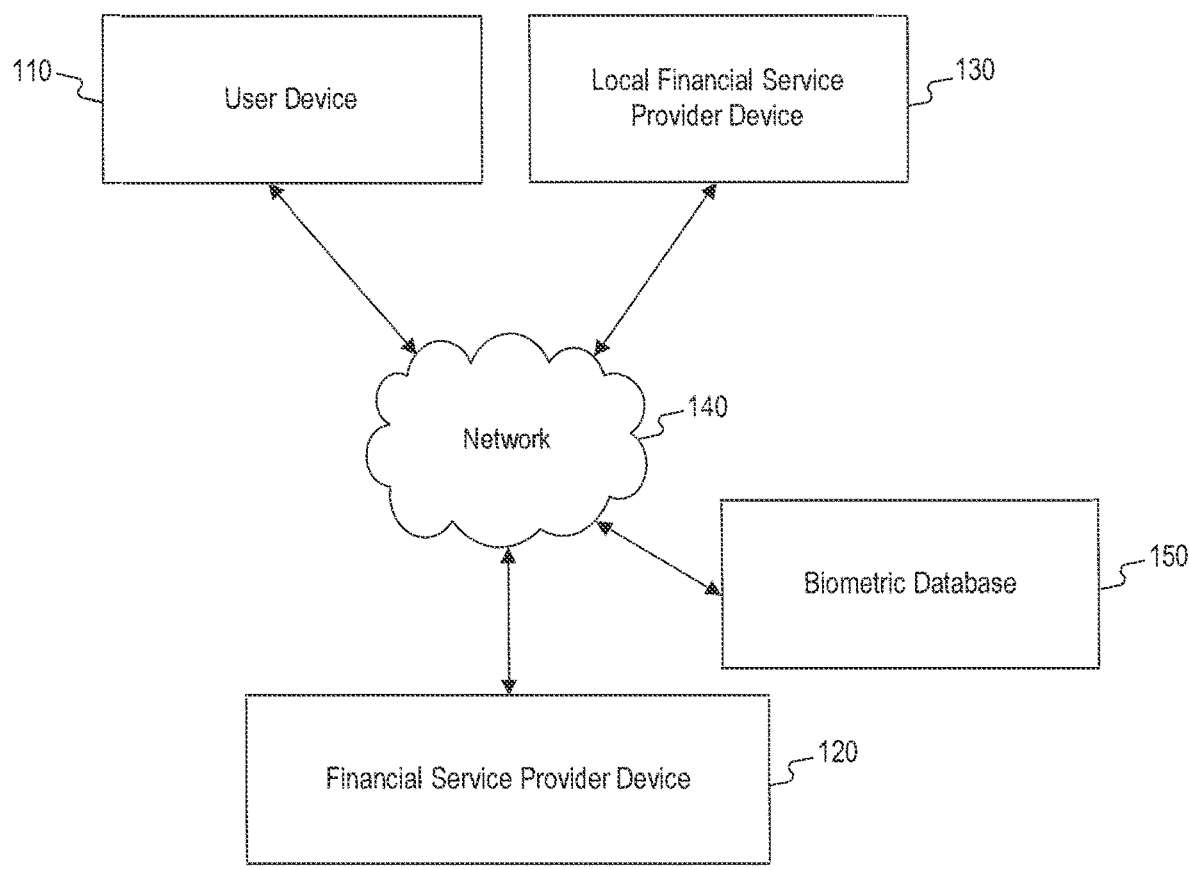
FIG. 1 is a block diagram of an exemplary system, consistent with disclosed embodiments.

FIG. 1 shows a diagram of an exemplary system 100, consistent with disclosed embodiments. As shown in FIG. 1, system 100 may include a user device 110, a financial service provider device 120 (or device 120), a local financial service provider device 130 (or device 130), and a network 140 to facilitate communication among the components of system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In accordance with disclosed embodiments, a detection and identification system 100 may include device 120. Device 120 may be a system associated with a financial service provider (not shown), such as a bank, a credit card company, a lender, brokerage firm, or any other type of financial service entity that generates, provides, manages, and maintains financial service accounts, etc., for one or more users. Device 120 may be one or more computing systems that are configured to execute software instructions stored on one or more memory devices to perform one or more operations consistent with the disclosed embodiments. For example, device 120 may include one or more memory device(s) storing data and software instructions, and one or more processor(s) configured to use the data and execute the software instructions to perform server-based functions and operations known to those skilled in the art. Device 120 may include one or more general purpose computers, mainframe computers, or any combination of these types of components.

In certain embodiments, device 120 may be configured as a particular apparatus, system, and the like based on the storage, execution, and/or implementation of the software instructions that cause a processor to perform one or more operations consistent with the disclosed embodiments. Device 120 may be standalone, or it may be part of a subsystem, which may be part of a larger system. For example, device 120 may represent distributed servers that are remotely located and communicate over a public network (e.g., network 140) or a dedicated network, such as a LAN, for a financial service provider. An exemplary computing system consistent with device 120 is discussed in additional detail with respect to FIG. 2, below.

Device 120 may include or may access one or more storage devices configured to store data and/or software instructions used by one or more processors of device 120 to perform operations consistent with disclosed embodiments. For example, device 120 may include memory 230 configured to store one or more software programs that performs several functions when executed by a processor. The disclosed embodiments are not limited to separate programs or computers configured to perform dedicated tasks. For example, device 120 may include memory that stores a single program or multiple programs. Additionally, device 120 may execute one or more programs located remotely from device 120. For example, device 120 may access one or more remote programs stored in memory included with a remote component that, when executed, perform operations consistent with the disclosed embodiments. In certain aspects, device 120 may include server software that generates, maintains, and provides services associated with financial account management. In other aspects, device 120 may connect separate server(s) or similar computing devices that generate, maintain, and provide services associated with financial data for a financial service provider associated with device 120.

System 100 may also include one or more local devices 130. Local devices may include, for example, ATMs or detection devices in local FSP branches. Local device 130 may include one or more memory device(s) that store data that may be used for performing one or more processes consistent with the disclosed embodiments. For example, local device 130 may include one or more memory device(s) storing data and software instructions, and one or more processor(s) configured to use the data and execute the software instructions to perform computing functions and operations known to those skilled in the art. In certain aspects, local device 130 may additionally, or alternatively, include one or more servers or other types of computer devices, which may be configured to execute software instructions stored in memory to perform one or more processes consistent with the disclosed embodiments.

Local device 130 may further include server(s) that are configured to execute stored software instructions to perform operations associated with collecting, storing, and accessing biometric data, including one or more processes associated with gathering biometric data from a variety of sources, compiling the data, and organizing the data into easily accessible profiles. Local device 130 may include one or more servers that may be a general-purpose computer, a mainframe computer, or any combination of these components. In certain embodiments, local device 130 (or a system including local device 130) may be configured as a particular apparatus, system, and the like based on the storage, execution, and/or implementation of the software instructions that cause a processor to perform one or more operations consistent with the disclosed embodiments. A local device 130 may be standalone, or it may be part of a subsystem, which may be part of a larger system. For example, local device 130 may represent distributed servers that are remotely located and communicate over a public network (e.g., network 140) or a dedicated network, such as a LAN. An exemplary computer system consistent with local device 130 is discussed in additional detail with respect to FIG. 2. In certain embodiments, a third party may operate the components associated with local device 130. Additionally or alternatively, local device 130 may be a part or subpart of device 120.

System 100 may further include one or more user devices 110. A user may operate a user device 110, which may be a desktop computer, laptop, tablet, smartphone, multifunctional watch, pair of multifunctional glasses, tracking device, or any suitable device with computing capability. User device 110 may include one or more processor(s) and memory device(s) known to those skilled in the art. For example, user device 110 may include memory device(s) that store data and software instructions that, when executed by one or more processor(s), perform operations consistent with the disclosed embodiments. In one aspect, user device 110 may have a financial application installed thereon, which may enable user device 110 to communicate with device 120 via network 140. For instance, user device 110 may be a smartphone or tablet or the like that executes a stored mobile application that performs online banking operations. In other embodiments, user device 110 may connect to device 120 through use of browser software stored and executed by user device 110. User device 110 may be configured to execute software instructions to allow a user to access information stored in device 120, such as, for example, financial information related to recent purchase transactions, financial discounts, financial statements, account information, rewards program information and the like. Additionally, user device 110 may be configured to execute software instructions that initiate and conduct transactions with device 120, such as, for example, ATM withdrawals, wire transfers, debit card PIN resets, and call center transactions. An exemplary computer system consistent with user device 110 is discussed in additional detail with respect to FIG. 2.

A user may operate user device 110 to perform one or more operations consistent with the disclosed embodiments. In one aspect, a user may be a customer of a financial service provider. For instance, a financial service provider may maintain a financial service account (e.g., checking account, savings account, debit card account, or credit card account) for the user that the user may use to purchase goods and/or services. Additionally or alternatively, the user may use user device 110 and the financial service account (for example, through a mobile application installed on user device 110) to withdraw cash from an ATM, contact a customer call center, transfer or wire money, or reset their debit account PIN.

A user may further operate user device 110 in order to be detected and recognized by local device 130. For example, user device 110 may detect, through the use of network 140, a local device 130 in its immediate proximity. Additionally or alternatively, local device 130 may detect user device 110 in its immediate proximity. User device 110 may then connect to local device 130 in order to initiate, conduct, or complete a financial transaction without the need for the user to interface directly with Device 130.

System 100 may also include one or more biometric databases 150. Biometric database 150 may include one or more memory device(s) that store data that may be used for performing one or more processes consistent with the disclosed embodiment. In certain aspects, biometric database 150 may additionally, or alternatively, include one or more servers or other types of computer devices. The biometric database 150 may include one or more server(s), which may be one or more computing devices configured to execute software instructions stored in memory to perform one or more processes consistent with the disclosed embodiments. For example, biometric database 150 may include one or more memory device(s) storing data and software instructions, and one or more processor(s) configured to use the data and execute the software instructions to perform server-based functions and operations known to those skilled in the art.

Biometric database 150 may further include server(s) that are configured to execute stored software instructions to perform operations associated with collecting, storing, and accessing biometric data, including one or more processes associated with gathering biometric data from a variety of sources, compiling the data, and organizing the data into easily accessible profiles. Biometric database 150 may include one or more servers that may be a general-purpose computer, a mainframe computer, or any combination of these components. In certain embodiments, biometric database 150 (or a system including biometric database 150) may be configured as a particular apparatus, system, and the like based on the storage, execution, and/or implementation of the software instructions that perform one or more operations consistent with the disclosed embodiments. A biometric database 150 may be standalone, or it may be part of a subsystem, which may be part of a larger system. For example, biometric database 150 may represent distributed servers that are remotely located and communicate over a public network (e.g., network 140) or a dedicated network, such as a LAN. An exemplary computer system consistent with biometric database 150 is discussed in additional detail with respect to FIG. 2.

In certain embodiments, biometric database 150 may be associated with an entity, such as a company, organization, agency, etc. In some embodiments, the biometric database entity may be a different entity than a financial service provider associated with device 120. In certain aspects, a user or user(s) affiliated with a biometric database entity may operate one or more components associated with biometric database 150 to collect and maintain biometric data. In other embodiments, biometric database 150 may be associated with a financial service provider or other entity associated with device 120. For example, biometric database 150 may be a part or subpart of device 120.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of the system 100. Network 140 may also include a public switched telephone network ("PSTN") and/or a wireless cellular network. Network 140 may be a secured network or unsecured network. In other embodiments, one or more components of system 100 may communicate directly through a dedicated communication link(s), such as links between user device 110, device 120, and local device 130.

Additionally or alternatively, network 140 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, user device 110 and local device 130 may connect and communicate through a direct communications network.

Other components known to one of ordinary skill in the art may be included in system 100 to process, transmit, provide, and receive information consistent with the disclosed embodiments.

In the context of ATMs, although mobile applications exist, certain transactions still require human intervention or human interface with a machine, such as an ATM. For example, typical cash withdrawal systems require human interface with the ATM or teller. Requiring that certain transactions be conducted in person with a representative of a financial account provider at the physical location of the transaction creates an inconvenience for the customer, who would prefer to initiate and authorize these transactions remotely and without having to take time to provide additional information on a machine or to a teller or to carry additional cards or account information.

Current mechanisms for identifying a customer vary by channel (mobile, online, in person), requiring the customer to remember his or her credentials for each distinct channel. For example, a customer may be required to remember a username and password, social security number, account number, and ATM Pin number, depending on the channel they use to conduct financial transactions. Additionally, customers may be required to carry with them debit or ATM cards.

Further, some typical identification systems are unappealing to customers who would like to conduct private transactions in a private location. For example, allowing a customer to initiate an ATM withdrawal using a smartphone, tablet or computer from a private location (such as their own home, office, car, etc.), rather than requiring him or her to enter their information at a public ATM, may allow the customer to feel more secure with their financial information. Further, allowing a customer to conduct a transaction without swiping a debit or ATM card allows the customer to avoid the risk of exposing his or her financial information to ATM skimmers or other fraudulent devices. Further, giving the customer the option of using the smaller screen of a smart phone or tablet allows the customer to feel secure that the smaller form factor of the smartphone or tablet allows them to keep their personal information (account number, pin, balances, types of accounts) private from other people "looking over their shoulder" when it is displayed on the ATM screen.

The above elements may allow customers to feel safer, as they are required to spend less time at an ATM while conducting financial transactions. For example, because customers are required to conduct less physical interaction at the ATM (e.g., no card swipe, no pin entry, no selection of account and amount, etc.), the time the customer is at the ATM is greatly reduced. This may give the customer a greater sense of physical security. It may also reduce the customer's chance of being robbed after getting cash, which for some customers is a severe and legitimate concern.

As described herein, some embodiments provide systems and methods for enabling a customer to send cash from his or her account to another customer or even to someone who is not a customer. For example, certain embodiments may allow a customer to enter the phone number or email of a recipient, and initiate a message to the owner of the phone or email account informing them that they have cash and that they can go to an ATM to withdraw that cash. When arriving at the ATM, and once identified by the ATM, the recipient may receive another message with a one-time pin that will be deactivated in a specified time frame. The recipient can use that one time pin to retrieve the cash from the ATM. Additionally or alternatively, BLE beacons, NFC, or a unique high pitch frequency that the microphone on the smartphone would detect, or some other type of sensor that can associate the ATM device with the mobile device, may be used in lieu of a one-time pin to authenticate the mobile device at the ATM. Certain aspects of the disclosed embodiments may attract new customers and encourage current customers to use the financial service provider's accounts and services more often.

Some embodiments provide improved systems and methods for detecting and identifying a customer with a mobile device conducting a financial transaction. For example, some embodiments may enable customers to conduct a broader range of financial transactions through mobile channels, such as a mobile application on a mobile device, without having to physically enter information on a machine or provide the information to an individual such as a teller.

Certain disclosed embodiments may provide services that are valuable to both consumers and financial service providers. For example, aspects of the disclosed embodiments may provide a user with a process for conducting financial transactions from a mobile channel without the need to physically enter the financial information to a machine or teller, which may save time and effort for the user and limit the exposure of customer data and personal information. Moreover, certain aspects of the disclosed embodiments may attract new customers and encourage current customers to use the financial service provider's accounts and services more often.

Figure 2:
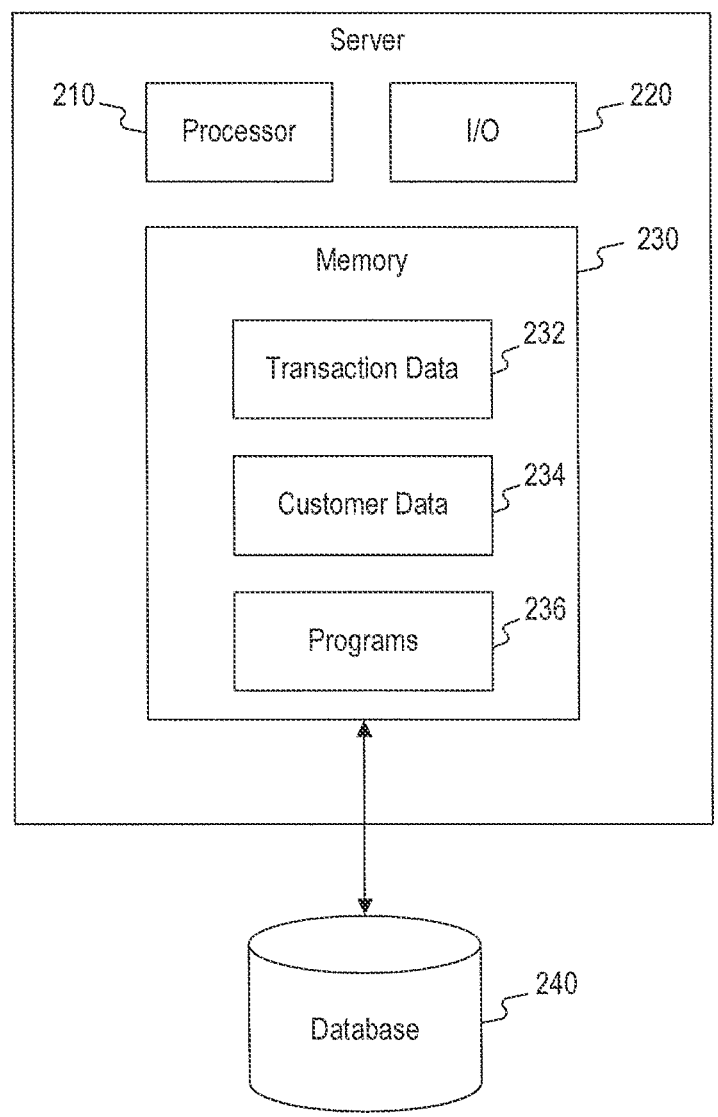
FIG. 2 is a block diagram of an exemplary computer system, consistent with disclosed embodiments.

FIG. 2 shows a diagram of an exemplary computing system 200 illustrating a computing system configuration that may be associated with device 120, local device 130, biometric database 150, and/or user device 110, consistent with disclosed embodiments. In some embodiments, computing system 200 may include one or more processors 210, one or more memories 230, and one or more input/output (I/O) devices 220. In some embodiments, computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that cause a processor to perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMO™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 236 that may perform one or more operations when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, device 120, biometric database 150, or user device 110, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, processing orders for certified funds, processing orders for new or reissue debit cards, and processing ATM cash withdrawals.

Memory 230 may also store data that may reflect any type of information in any format that the system may use to perform operations consistent with the disclosed embodiments. Memory 230 may store instructions to enable processor 210 to execute one or more applications, such as server applications, an authentication application, network communication processes, and any other type of application or software. Alternatively, the instructions, application programs, etc., may be stored in an external storage (not shown) in communication with computing system 200 via network 140 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to financial transactions initiated by a user. For example, transaction data may include a user identifier and a transaction type. The user identifier may be a credit or debit card number, an account number, or another means for identifying the user initiating the financial transaction. The transaction type may include an indicator of the type of transaction the user is initiating, such as, ATM cash withdrawal, debit PIN reset, money wire or transfer, call to the customer service center, ordering a new or reissue debit card, ordering certified funds, or other transactions requiring user authentication. Transaction data 232 may also include authentication data obtained from the user for the purposes of authorizing the transaction, for example, by verifying the authenticity of provided biometric data as compared to stored biometric data. Additionally or alternatively, transaction data 232 may be stored in database 240 or in an external storage (not shown) in communication with computing system 200 via network 140 or any other suitable network.

Memory 230 may further include customer data 234. Customer data 234 may include information about particular customers of the financial service provider. For example, client data 234 may include clients' account information, debit or credit card information, history of purchase transactions, financial statements, credit score, risk profile, username and password, debit card PIN, home and work locations, and/or biometric information. Additionally, customer data 234 may include user device identification information, such as, for example, a phone number, email address, IP address, BLUETOOTH™ signature, or other device identifier. Alternatively customer data 234 may be stored in database 240 or in an external storage (not shown) in communication with computing system 200 via network 140 or any other suitable network.

Processor 210 may analyze transaction data 232 in reference to customer data 234. For example, processor 210 may analyze transaction data to determine which client with information stored in client information 234 is initiating the financial transaction. Processor 210 may access the particular user's customer information to determine their account information, debit or credit card information, history of purchase transactions, financial statements, credit score, risk profile, username and password, debit card PIN, home and work locations, and/or authentication data.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, and the like, which may enable computing system 200 to receive input from an operator of device 120 (not shown).

Computing system 200 may also contain one or more database(s) 240. Alternatively, computing system 200 may be communicatively connected to one or more database(s) 240. Computing system 200 may be communicatively connected to database(s) 240 through network 140. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request and the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As discussed above, device 120 may include at least one computing system 200. Further, although sometimes discussed here in relation to device 120, it should be understood that variations of computing system 200 may be used by other components of system 100, including local device 130 and user device 110. Computing system 200 may be a single server or may be configured as a distributed computer system including multiple servers or computers that interoperate to perform one or more of the processes and functionalities associated with the disclosed embodiments.

In some aspects, local device 130 and/or user device 110 may include the same or similar configuration and/or components of computing system 200. For example, computing system 200, when implemented in local device 130, may include hardware and/or software installed therein for performing one or more processes disclosed herein.

Figure 3:
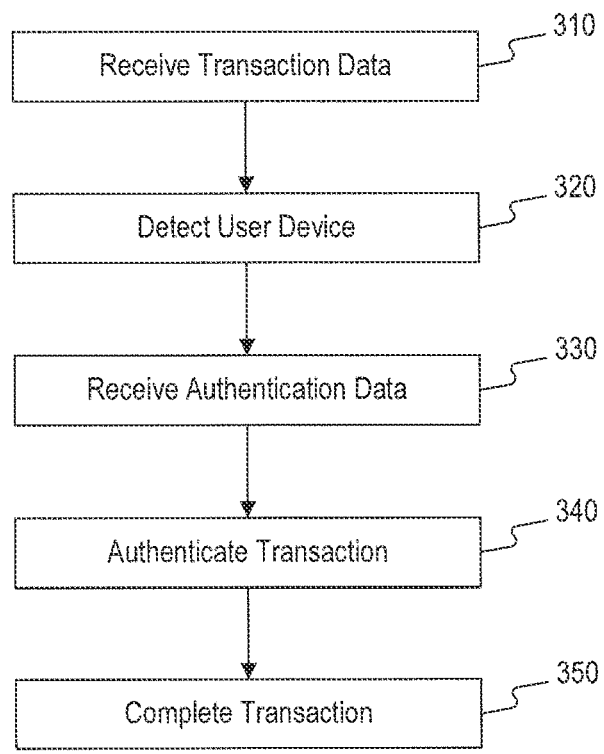
FIG. 3 is a flowchart of an exemplary process for detecting and identifying a customer with a user device, consistent with disclosed embodiments.

FIG. 3 shows an exemplary detection and identification process, consistent with disclosed embodiments. Process 300 may be performed by processor 210 of, for example, device 120 and/or local device 130 executing instructions encoded on a computer-readable medium storage device. It is to be understood, however, that one or more steps of process 300 may be implemented by other components of system 100 (shown or not shown), including user device 110.

At step 310, device 120 may receive transaction data. In one aspect, device 120 may receive transaction data from user device 110. As an example, user device 110 may execute a mobile application associated with the financial service provider associated with device 120. The user device 110 may transmit transaction data via network 140 to device 120. Transaction data may be entered manually into user device 110 by a user, for example by typing it on a keyboard or other input device (not shown), using voice recognition software, etc. Transaction data may also be entered and transmitted automatically, for example, by a mobile application on user device 110. Alternatively, local device 130 may receive the transaction data from user device 110. For example, a user operating user device 110 may enter information requesting a monetary withdrawal of funds from a financial service account provided by a financial service provider (e.g., an entity associated with device 120), or additionally or alternatively may enter information requesting an alternative financial transaction, such as ordering certified funds, depositing money, and/or transferring funds. User device 110 may be configured to generate an interface to request transaction data from the user regarding the withdrawal. User device 110 may receive the user input of transaction data and store the received transaction data for processing in accordance with one or more operations consistent with the disclosed embodiments.

Transaction data may include a type of transaction and a customer identifier. A type of transaction may include, for example, an ATM withdrawal, a money transfer or wire, a debit card PIN reset, a deposit, a check cashing, ordering certified funds, ordering a new or reissued debit card, etc. If the type of transaction is, for example, an ATM withdrawal, money transfer or wire, deposit, ordering of certified funds or cashier's checks, a change order, or check cashing, transaction data may further include an amount. In certain embodiments, transaction data may include other data relating to transactions that is known to those skilled in the art, such as transaction amount, timestamp information, entity identifier, account identifier(s), etc.

In certain aspects, device 120 and/or local device 130 may be configured to execute software that performs processes to determine whether a user (e.g., a customer) operating a mobile device is within a predetermined distance or range of distance(s) of local device 130 (e.g., step 320). For example, in certain aspects, local device 130 may determine whether a user (e.g., a customer) operating a mobile device is within one foot, two feet, six inches, etc., of local device 130. For instance, local device 130 may detect the customer by detecting, through network 140 (Wi-Fi, BLE, NFC, etc.), user device 110. User device 110 may need to be detected at a certain threshold distance before local device 130 will connect and communicate with user device 110. For example, user device 110 may need to be within 6 inches of local device 130 before the devices connect to conduct the transaction. Exemplary and non-limiting operations associated with detecting whether a user (or user device 110) is within a predetermined proximity of local device 130 is described below in connection with FIG. 5.

Device 120 and/or local device 130 may detect user device 110 within the necessary threshold proximity. In certain embodiments, local device 130 may receive authentication data from user device 110 (step 330). For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., Sure-Swipe8 or the like). Biometric data may include, for example, a fingerprint scan, voice recognition, facial recognition, retina or iris scan, heartbeat or pulse pattern, or palm vein scan.

At step 340, device 120 may authenticate and authorize the transaction. In some embodiments, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130, via network 140, that the transaction has been authenticated and authorized. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data. Additional embodiments relating to authenticating and authorizing transactions are disclosed below.

At step 350, local device 130 may complete the transaction. Local device 130 may, for example, dispense cash from an ATM, indicate that a deposit has been successfully processed, notify a teller that the user has been authorized for a cash withdrawal, provide certified funds or cashier's checks, notify the customer that the new or replacement debit card has been ordered, complete the user's initiated transaction, and/or other operations. In certain aspects, device 120 may be configured to generate and provide a message to user device 110 (or some other device) reflecting the results of the authentication operation (e.g., authentication denied and/or transaction denied; authentication accepted and/or transaction authorized).

As a non-limiting example of such embodiments, a user operating user device 110 may provide transaction data via user device 110. In some aspects, user device 110 may execute software that requests and receives transaction data (e.g., account withdrawal request including account number, amount, etc.) and provides the transaction data to local device 130 when communication between devices 110 and 130 has been established based on the proximity threshold determination processes disclosed herein.

Local device 130 may be configured to authenticate the transaction. In some embodiments, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

Local device 130 may complete an authenticated transaction by, for example, automatically dispensing cash in the amount of the withdrawal request, without the user ever having to physically manipulate components of local device 130 (e.g., use a keypad on local device 130, swipe a card, etc.).

Figure 4:
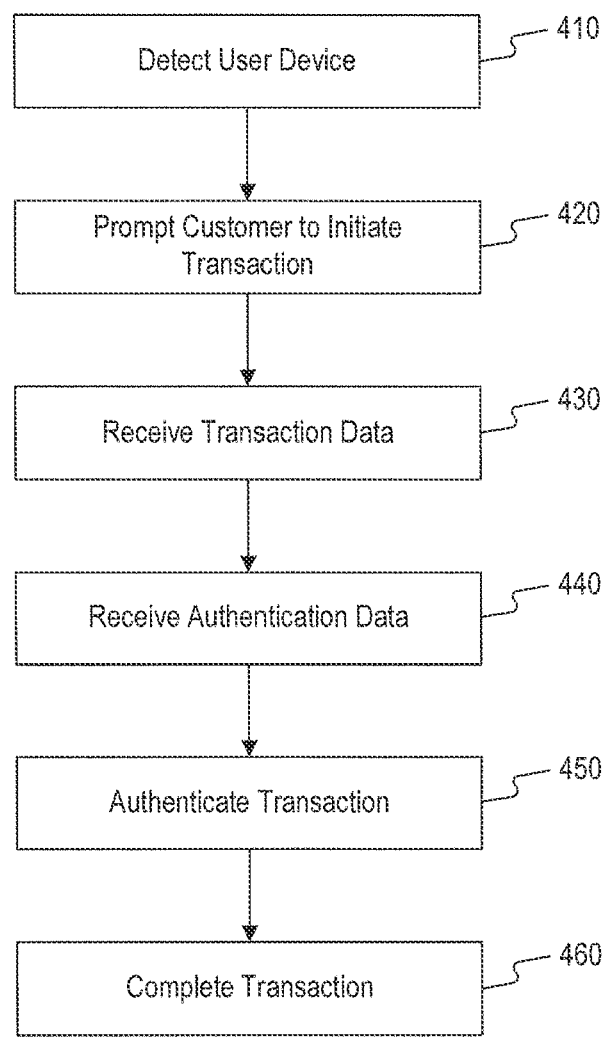
FIG. 4 is a flowchart of an exemplary process for an alternative embodiment for detecting and identifying a customer with a user device, consistent with disclosed embodiments.

FIG. 4 shows an alternative exemplary detection and identification process 400, consistent with disclosed embodiments. Process 400 may be performed by processor 210 of, for example, device 120 and/or local device 130 executing instructions encoded on a tangible computer-readable medium storage device, such as a memory device. It is to be understood, however, that one or more steps of process 400 may be implemented by other components of system 100 (shown or now shown), including user device 110.

At step 410, as also discussed with reference to FIG. 3, device 120 and/or local device 130 may detect a user carrying a user device 110. In certain aspects, local device 130 may be configured to execute software that performs processes to determine whether a user (e.g., customer) with a user device 110 is within a predetermined distance or range of distance(s) of local device 130. For example, in certain aspects, local device 130 may determine whether a user (e.g., customer) with a user device 110 is within one foot, two feet, six inches, etc., of local device 130. For instance, local device 130 may detect the customer by detecting, through network 140 (Wi-Fi, BLE, NFC, etc.), user device 110. User device 110 may need to be detected at a certain threshold distance before local device 130 will connect and communicate with user device 110. For example, user device 110 may need to be within 6 inches of local device 130 before the devices connect to conduct the transaction. Exemplary and non-limiting operations associated with detecting whether a user (or user device 110) is within a predetermined proximity of local device 130 is described below in connection with FIG. 5.

Alternatively, device 120 may detect a customer with user device 110. For example, device 120 may be configured to execute software that performs processes to determine whether a user (e.g., customer) with a user device 110 is within a predetermined distance or range of distance(s) of local device 130. For example, device 120 may be configured to receive a signal from local device 130 indicating that it has detected a signal from user device 110. Device 120 may then determine the physical location of user device 110 with respect to local device 130.

At step 420, user device 110 may prompt the user to initiate a financial transaction. For example, user device 110 may be configured to execute software that generates a prompt to (or causes a prompt to be generated to) the user to initiate a financial transaction. For example, device 120 may generate and provide information that may be used in an interface that is displayed by user device 110 via a display device. Additionally or alternatively, local device 130 may transmit a signal to user device 110, for example, via BLE or NFC networks, indicating that user device 110 is within a threshold distance from local device 130. In some embodiments, user device 110 may display a prompt to the user. For example, the prompt may be a message displayed on user device 110. For example, the prompt may be an email, text message, message within a mobile application, or pop-up, among other things.

Alternatively, local device 130 may transmit a signal to device 120, which may then transmit a signal to user device 110 indicating that it is within a threshold distance of a local device 130. For example, user device 110 may be configured to detect local device 130. In certain embodiments, user device 110 operating a mobile application may locate and detect local device 130 via signals transmitted over for example, BLE or NFC networks. Device 120 may transmit a signal to user device 110 that may cause user device 110 to display a prompt to the user. For example, user device 110 may be configured to execute software that generates a prompt to (or causes a prompt to be generated to) the user to initiate a financial transaction. The prompt may be displayed within a mobile application running on user device 110. The prompt may contain, for example, a selection of possible transactions a user may initiate on user device 110.

At step 430, as also discussed with reference to FIG. 3, device 120 may receive transaction data from user device 110. User device 110 may be operating a mobile application associated with the financial service provider that transmits transaction data via network 140 to device 120. A user may enter and transmit transaction data into user device 110 manually per transaction, for example, by typing it on a keyboard or other input device (not shown). In certain embodiments, user device 110 may enter and transmit transaction data automatically, for example, by a mobile application on user device 110. Alternatively, local device 130 may receive the transaction data from user device 110. For example, a user device 110 may enter information requesting a monetary withdrawal of funds from a financial service account provided by a financial service provider (e.g., an entity associated with device 120), a deposit of funds into a financial service account provided by a financial service provider, or ordering certified funds from a financial service provider associated with a financial service account. User device 110 may be configured to generate an interface to request transaction data from the user regarding the withdrawal, deposit, or order. User device 110 may receive the user input of transaction data, and store the received transaction data for processing in accordance with one or more operations consistent with the disclosed embodiments.

At step 440, device 120 and/or local device 130 may receive authentication data from user device 110. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., Sure-Swipe8 or the like). Biometric data may include, for example, a fingerprint scan, voice recognition, facial recognition, retina or iris scan, heartbeat or pulse pattern, or palm vein scan.

At step 450, device 120 may authenticate and authorize the transaction. In some embodiments, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 may be determined by the amount of the transaction. For example, a higher transaction amount (e.g., withdrawal, deposit, ordering of certified funds) may require additional or more secure authentication data.

At step 460, device 120 and/or local device 130 may complete the transaction. For example device 120 may be configured to transmit a signal to local device 130 indicating that the transaction has been authenticated. Local device 130 may complete an authenticated transaction by, for example, automatically dispensing cash in the amount of the withdrawal request, automatically authorizing certified funds, and/or automatically ordering a new or reissued debit card, without the user ever having to physically manipulate components of local device 130 (e.g., use a keypad on local device 130, swipe a card, etc.) or without requiring the user to enter a branch location. For example, in some embodiments, device 120 may generate and provide data to local device 130 that causes local device 130 to dispense cash in the amount of the withdrawal request. Local device 130 may, for example, dispense cash from an ATM, indicate that a deposit has been successfully processed, notify a teller that the user has been authorized for a cash withdrawal, authorize order for certified funds, notify the user that their order for a new or reissue debit card has been processed, or otherwise complete the user's initiated transaction.

Figure 5:
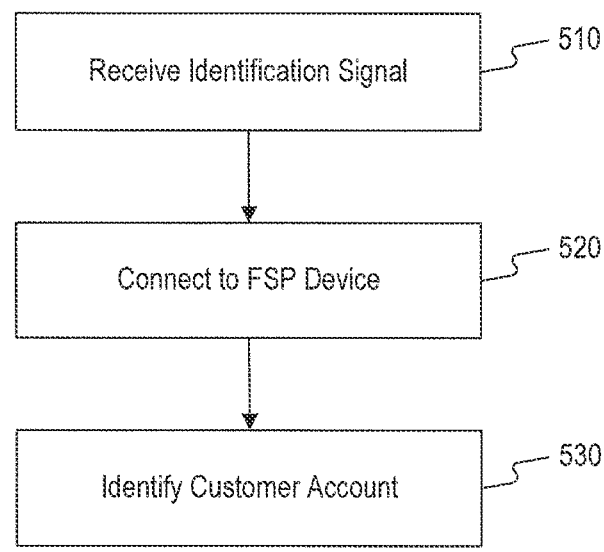
FIG. 5 is a flowchart of an exemplary process for detecting and identifying a customer with a user device, consistent with disclosed embodiments.

FIG. 5 shows an exemplary detection and identification process 500, consistent with disclosed embodiments. Process 500 may be performed by processor 210 of, for example, device 120 executing instructions encoded on a computer-readable medium storage device. It is to be understood, however, that one or more steps of process 500 may be implemented by other components of system 100 (shown or not shown), including local device 130 and/or user device 110.

At step 510, device 120 and/or local device 130 may receive an identification signal transmitted by user device 110 that may, for example, identify a particular user device. For example, user device 110 may be configured to transmit an identification signal. In certain embodiments, user device 110 may be configured to transmit an identification signal when user device 110 is operating a mobile application associated with the financial service provider. For example, user device 110 may be configured to transmit an identification signal via BLE, NFC, Wi-Fi, or other appropriate networks. In some embodiments, local device 130 may be configured to detect an identification signal transmitted by user device 110 via, for example, BLE or NFC. Additionally or alternatively, local device 130 may detect an identification signal transmitted by user device 110 via Wi-Fi or any other suitable network, such as network 140. The identification signal may contain identification information such as device information pertaining to particular user device 110. In certain embodiments, the information signal may contain location information. For example, Device 130 may be configured to detect a location of user device 110 based on the information signal. In some embodiments, Device 130 may detect the distance between user device 110 and Device 130. Additionally or alternatively, the identification signal may contain customer identification data such as an account number, username, or other personal identifier.

In certain aspects device 120 may receive the identification signal. For example, user device 110 may transmit the identification signal to device 120. Additionally or alternatively, local device 130 may communicate with device 120, for example, via network 140 (step 520). For example, Device 130 may transmit the identification information received from user device 110 to device 120. Additionally or alternatively, user device 110 may connect directly to device 120 to transmit identification data.

Device 120 may be configured to identify one or more customer accounts based on the identification data (step 530). For example, the identification data may contain a customer identifier. A customer identifier may indicate a customer account stored on, for example, device 120, consistent with the disclosed embodiments, that corresponds to a particular customer. In one aspect, a customer account may relate to the particular user initiating a financial transaction. For example, a customer account may relate to a customer (user) operating user device 110 that provided the identification signal to local device 130. Device 120 may be configured to authenticate the transaction. For example, in some embodiments, device 120 may execute software that determines, receives, and processes information associated with the identified customer account to authenticate the transaction initiated by user device 110.

Figure 6:
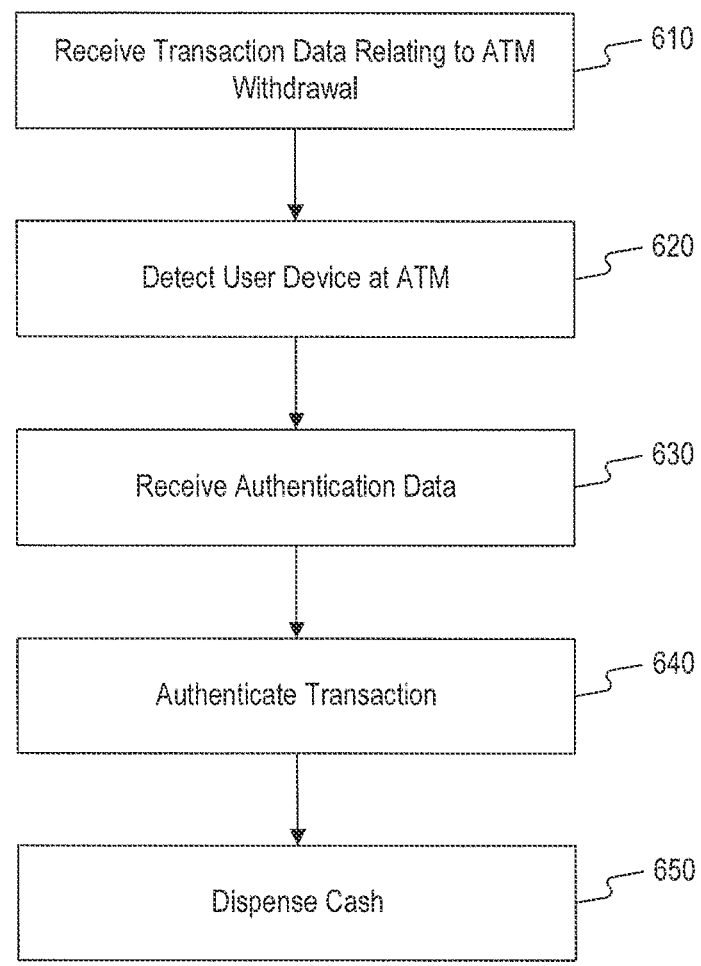
FIG. 6 is a flowchart of an exemplary process for detecting and identifying a customer with a user device, consistent with disclosed embodiments.

FIG. 6 shows an exemplary authentication process for detecting and identifying a customer with a user device conducting an ATM withdrawal, consistent with disclosed embodiments. Process 600 may be performed by processor 210 of, for example, device 120 and/or local device 130 executing instructions encoded on a computer-readable medium storage device. It is to be understood, however, that one or more steps of process 600 may be implemented by other components of system 100 (shown or not shown), including user device 110.

At step 610, device 120 may receive transaction data related to an ATM withdrawal, as previously discussed with reference to FIGS. 3 and 4. As an example, user device 110 may execute a mobile application associated with the financial service provider associated with device 120. The user device 110 may transmit transaction data via network 140 to device 120. Transaction data may be entered manually into user device 110 by a user, for example by typing it on a keyboard or other input device (not shown), using voice recognition software, etc. Transaction data may also be entered and transmitted automatically, for example, by a mobile application on user device 110. Alternatively, local device 130 may receive the transaction data from user device 110. For example, user device 110 may enter information requesting a monetary withdrawal of funds from a financial service account, such as, in this case, an ATM provided by a financial service provider (e.g., an entity associated with device 120). User device 110 may be configured to generate an interface to request transaction data from the user regarding the withdrawal. User device 110 may receive the user input of transaction data and store the received transaction data for processing in accordance with one or more operations consistent with the disclosed embodiments Local device 130 may detect the customer with a user device 110 at an ATM (step 620). In certain aspects, local device 130 may be configured to execute software that performs processes to determine whether a user (e.g., customer) with a user device 110 is within a predetermined distance or range of distance(s) of local device 130. For example, in certain aspects, local device 130 may determine whether a user (e.g., customer) with a user device 110 is within one foot, two feet, six inches, etc., of local device 130. For instance, local device 130 may detect the customer by detecting, through network 140 (Wi-Fi, BLE, NFC, etc.), user device 110. User device 110 may need to be detected at a certain threshold distance before local device 130 will connect and communicate with user device 110. For example, user device 110 may need to be within 6 inches of local device 130 before the devices connect to conduct the transaction. Additionally or alternatively, local device 130 may first detect the customer (step 620) and then receive the transaction data (step 610), as described with reference to FIG. 4. For example, user device 110 may be configured to execute software that generates a prompt to (or causes a prompt to be generated to) the user to initiate a financial transaction. Initiating a financial transaction, for example, may cause user device 110 to transmit transaction data to local device 130.

In certain embodiments, device 120 may determine whether user device 110 is at the local device 130 (e.g., ATM) (step 620). For example, device 120 may be configured to execute software that performs processes to determine whether a user (e.g., customer) with a user device 110 is within a predetermined distance or range of distance(s) of local device 130. In one aspect, device 120 may be configured to execute software that relates the distance of user device 110 to local device 130 to a distance of the customer associated with user device 110. For example, device 120 may be configured to receive a signal from local device 130 indicating that it has detected a signal from user device 110. Device 120 may then determine the physical location of user device 110 (and, for instance, the customer) with respect to local device 130.

At step 630, local device 130 and/or device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., SureSwipe8 or the like). Biometric data may include, for example, a fingerprint scan, voice recognition, facial recognition, retina or iris scan, or palm vein scan.

At step 640, device 120 and/or local device 130 may authenticate and authorize the transaction, as described in detail with respect to FIGS. 3 and 4. For example, in some embodiments, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

In certain aspects, device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local device 130, or the ATM. For example, local device 130 may contain a screen or other display. In certain embodiments, messages, such as those reflecting the results of authentication operations, may be displayed to the user via the screen or display of local device 130.

At step 650, local device 130, an ATM, for example, may dispense cash to the user consistent with the amount indicated in the transaction data. Local device 130 may, for example, automatically dispense cash in the amount of the withdrawal request, without the user ever having to physically manipulate components of local device 130 (e.g., use a keypad on local device 130, swipe a card, etc.). In certain embodiments, device 120 may be configured to transmit information to local device 130 indicating that the transaction has been authenticated. Additionally, device 120 may transmit information to local device 130 indicating that local device 130 should dispense cash in the transaction amount.

In certain embodiments, cash dispensing may complete the transaction. Prior to dispensing the cash, local device 130, embodied as an ATM, may display to the user a message indicating that the transaction is processing and that the cash is dispensing. For example, device 120 and/or local device 130 may be configured to generate and provide a message to the user. For example, local device 130 may contain a screen or other display. In certain embodiments, messages, such as those reflecting the results of authentication operations, may be displayed to the user via the screen or display of local device 130. Similarly, following dispensing the cash, local device 130 may display to the user a message indicating that the transaction is complete.

Figure 7:
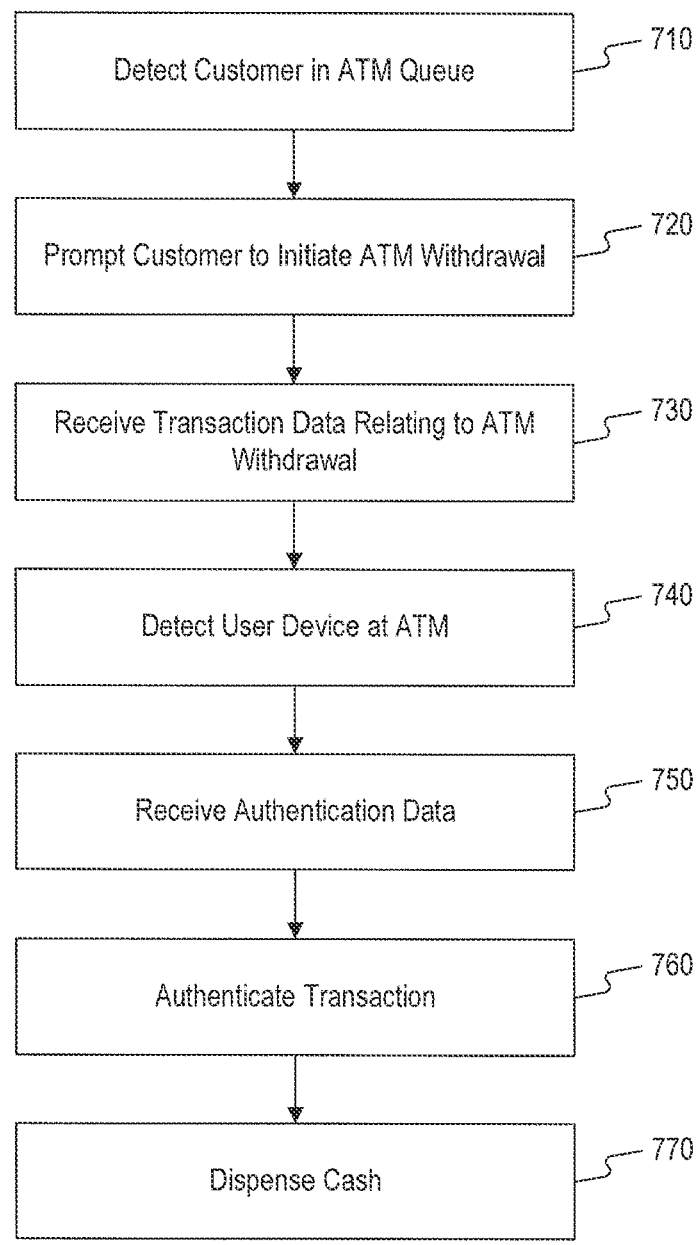
FIG. 7 is a flowchart of an exemplary process for an alternative embodiment for detecting and identifying a customer with a user device, consistent with disclosed embodiments.

FIG. 7 shows an alternative exemplary process 700 for detecting and identifying a customer conducting an ATM withdrawal, consistent with disclosed embodiments. Process 700 may be performed by processor 210 of, for example, device 120 and/or local device 130 (in this case, an ATM) executing instructions encoded on a computer-readable medium storage device. It is to be understood, however, that one or more steps of process 700 may be implemented by other components of system 100 (shown or not shown), including user device 110.

At step 710, local device 130 may detect a customer with user device 110 in a local device 130 queue (e.g., an ATM queue). For example, there may be a walk-up line for the ATM, or the customer may be in line for a drive-up ATM. Local device 130 may detect the customer with user device 110 as described in detail with reference to FIGS. 3 and 5. For example, local device 130 may receive an identification signal from user device 110, as described with reference to FIG. 5. Further, local device 130 may detect user device 110 within the necessary threshold proximity, as described, for example with reference to FIG. 3. Additionally, local device 130 may detect that the customer with user device 110 is currently in a queue, rather than in position to use the ATM. Local device 130 may determine that the customer (user) is currently in a queue by detecting that the customer is more than, for example, three feet, five feet, etc., away from local device 130.

Alternatively, device 120 may detect a customer with user device 110 in a local device 130 queue (e.g., an ATM queue). For example, device 120 may be configured to execute software that performs processes to determine whether a user (e.g., customer) with a user device 110 is within a predetermined distance or range of distance(s) of local device 130. For example, device 120 may be configured to receive a signal from local device 130 indicating that it has detected a signal from user device 110. Device 120 may then determine the physical location of user device 110 with respect to local device 130.

At step 720, user device 110 may prompt the user to initiate a financial transaction while in the ATM queue. Device 120 may generate and provide data to user device 110 that may cause user device 110 to display a prompt to the user. For example, user device 110 may be configured to execute software that generates a prompt to (or causes a prompt to be generated to) the user to initiate a financial transaction, as described in detail with reference to FIG. 4. For example, device 120 may cause user device 110 to display a prompt to the user when it detects that the physical location of user device 110 with respect to local device 130 is less than a threshold distance. Alternatively, local device 130 may transmit a signal to user device 110 indicating that it is within range, which may then cause user device 110 to display a prompt to the user. The prompt may contain, for example, a selection of possible transactions a user may initiate on user device 110.

At step 730, device 120 and/or local device 130 may receive the transaction data as described with reference to FIG. 4. For example, a user device 110 may enter information requesting a monetary withdrawal of funds from a financial service account provided by a financial service provider (e.g., an entity associated with device 120). User device 110 may be configured to generate an interface to request transaction data from the user regarding the withdrawal. User device 110 may receive the user input of transaction data and store the received transaction data for processing in accordance with one or more operations consistent with the disclosed embodiments.

At step 740, local device 130 may then detect the customer with user device 110 at the ATM. Local device 130 may detect the customer with a within a certain threshold distance, as described in detail with reference to FIG. 6. For example, in certain aspects, local device 130 may determine whether a user (customer) with a user device 110 is within one foot, two feet, six inches, etc., of local device 130. For instance, local device 130 may detect the customer by detecting, through network 140 (Wi-Fi, BLE, NFC, etc.), user device 110. User device 110 may need to be detected at a certain threshold distance before local device 130 will connect and communicate with user device 110. For example, user device 110 may need to be within 6 inches of local device 130 before the devices connect to conduct the transaction. Additionally or alternatively, local device 130, such as an ATM, may have a particular location that the user may hold his or her user device 110 next to in order to indicate that they are first in the queue.

Alternatively, device 120 may detect a customer with user device 110 at the local device 130 (e.g., ATM). For example, device 120 may be configured to execute software that performs processes to determine whether a user (e.g., customer) with a user device 110 is within a predetermined distance or range of distance(s) of local device 130. For example, device 120 may be configured to receive a signal from local device 130 indicating that it has detected a signal from user device 110. Device 120 may then determine the physical location of user device 110 with respect to local device 130. For example, if the location of user device 110 is within, for example, six inches of the ATM, device 120 may determine that user device 110 is at the ATM.

At step 750, local device 130 and/or device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., SureSwipe8 or the like). Biometric data may include, for example, a fingerprint scan, voice recognition, facial recognition, retina or iris scan, or palm vein scan.

At step 760, device 120 and/or local device 130 may authenticate and authorize the transaction, as described in detail with respect to FIGS. 3 and 4. In some embodiments, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal, via network 140, to local device 130 that the transaction has been authenticated and authorized. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data. At step 770, local device 130, e.g. an ATM, may dispense cash to the user consistent with the amount indicated in the transaction data, as described in detail with reference to FIG. 6.

Figure 8:
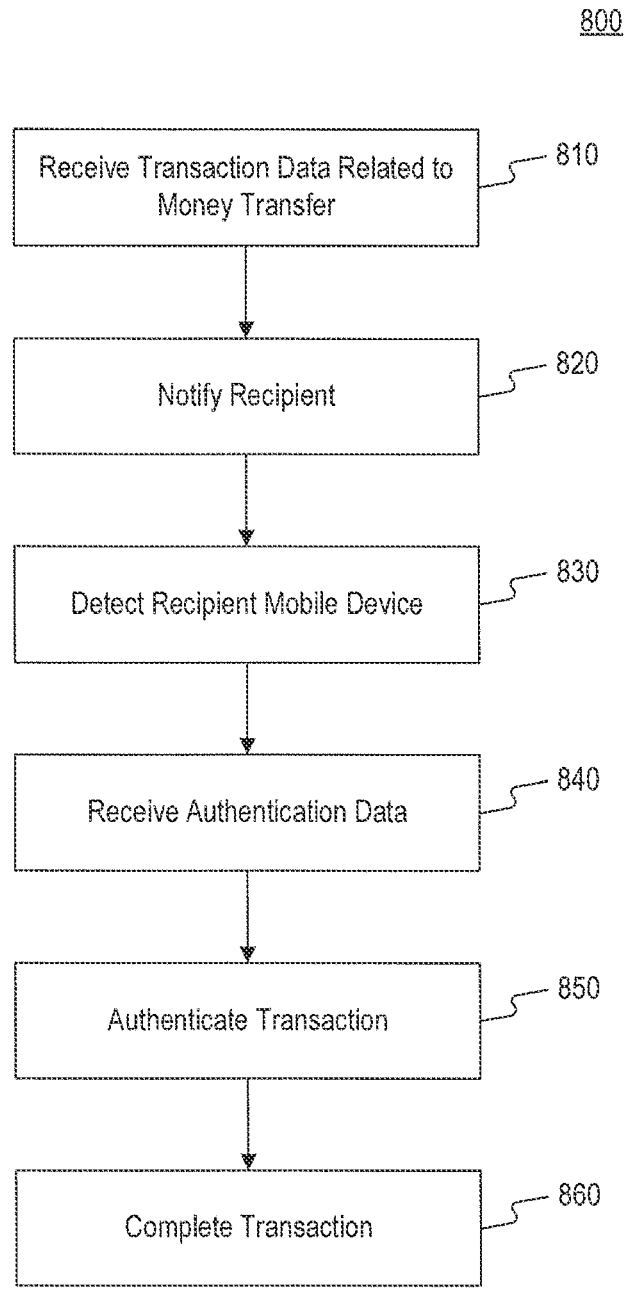
FIG. 8 is a flowchart of an exemplary process for detecting and identifying a recipient of a money transfer with a user device, consistent with disclosed embodiments.

FIG. 8 shows an exemplary process 800 process for detecting and identifying a recipient of a money transfer, consistent with disclosed embodiments. Process 800 may be performed by processor 210 of, for example, device 120 and/or local device 130 executing instructions encoded on a computer-readable medium storage device. It is to be understood, however, that one or more steps of process 800 may be implemented by other components of system 100 (shown or not shown), including user device 110.

At step 810, device 120 may receive transaction data related to a money transfer. Device 120 may receive transaction data as discussed in detail with reference to FIG. 4. For example, a user device 110 may enter information requesting a monetary withdrawal of funds from a financial service account provided by a financial service provider (e.g., an entity associated with device 120). User device 110 may be configured to generate an interface to request transaction data from the user regarding the withdrawal. User device 110 may receive the user input of transaction data and store the received transaction data for processing in accordance with one or more operations consistent with the disclosed embodiments. Transaction data may include, for example, the sender's account information, an amount, and recipient information. Recipient information may include, for example, an identifier such as a phone number, email address, social security number, or financial service account number.

At step 820, user device 110 may notify the recipient that they have a pending money transfer. User device 110 may notify the recipient, for example, by email, text message, or an alert in a mobile application. Device 120 may be configured to generate a notification message to a recipient based on the recipient information entered by the sender. For example, device 120 may generate a message to a particular recipient and transmit the message to user device 110 of a recipient for display to the recipient in accordance with the disclosed embodiments. A recipient with a pending transfer may go to an ATM, branch location, or other local device 130 in order to withdraw or collect their cash. Local device 130 may detect the recipient with a user device 110 (step 830) the same way it would detect a regular customer with a user device 110, as described in detail with respect to FIGS. 3 and 5. Alternatively, device 120 may detect the recipient with a user device 110. For example, device 120 may be configured to execute software that performs processes to determine whether the recipient with a user device 110 is within a predetermined distance or range of distance(s) of local device 130. For example, device 120 may be configured to receive a signal from local device 130 indicating that it has detected a signal from user device 110. Device 120 may then determine the physical location of user device 110 with respect to local device 130.

At step 840, local device 130 and/or device 120 may receive authentication data for the recipient. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, or biometric data, or other data associated with user identification methods (e.g., SureSwipesM or the like). Biometric data may include, for example, a fingerprint scan, voice recognition, facial recognition, retina or iris scan, heartbeat or pulse pattern, or palm vein scan. Device 120 and/or local device 130 may receive authentication data as described in detail with respect to FIGS. 3 and 4.

At step 850, device 120 and/or local device 130 may authenticate and authorize the transaction, as described in detail with respect to FIGS. 3 and 4. For example, in some embodiments, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130, via network 140, that the transaction has been authenticated and authorized. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

At step 860, device 120 and/or local device 130 may complete the transaction, as described in detail with reference to FIGS. 3 and 4. In certain embodiments, device 120 may be configured to transmit information to local device 130 indicating that the transaction has been authenticated. Additionally, device 120 may transmit information to local device 130 indicating that local device 130 should dispense cash in the transaction amount. For example, local device 130 may, for example, dispense cash from an ATM, indicate that a deposit has been successfully processed, notify a teller that the user has been authorized for a cash withdrawal, complete the user's initiated transaction, and/or other operations. In certain aspects, device 120 may be configured to generate and provide a message to user device 110 (or some other device) reflecting the results of the authentication operation (e.g., authentication denied and/or transaction denied; authentication accepted and/or transaction authorized).

The disclosed embodiments include methods and systems to provide customer recognition and identification techniques. In certain aspects, certain additional elements may be implemented to provide processes to authenticate a transaction conducted by a customer based on authentication levels. For example, FIGS. 9 through 13 relate to exemplary embodiments for authentication processes.

Figure 9:
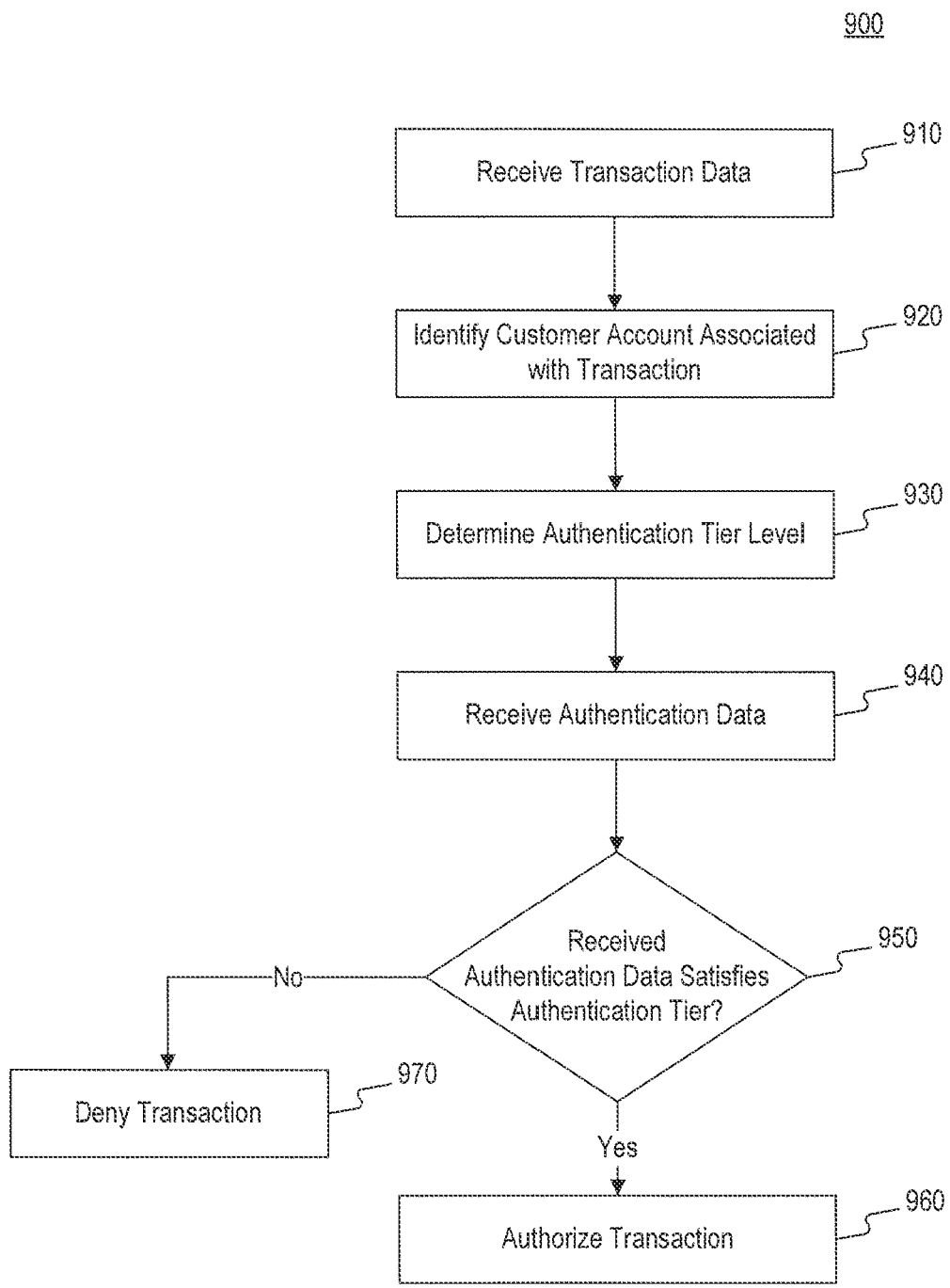
FIG. 9 is a flowchart of an exemplary process for authenticating a financial transaction, consistent with disclosed embodiments.

FIG. 9 shows an exemplary financial authorization process, consistent with disclosed embodiments. Process 900 may be performed by processor 210 of, for example, device 120 executing instructions encoded on a computer-readable medium storage device. It is to be understood, however, that one or more steps of process 900 may be implemented by other components of system 100 (shown or not shown}, including biometric database 150 and/or user device 110. At step 910, device 120 may receive transaction data. In one aspect, device 120 may receive transaction data from user device 110. As an example, user device 110 may execute a mobile application associated with the financial service provider associated with device 120. User device 100 may transmit transaction data via network 140 to device 120. Transaction data may be entered and transmitted manually per transaction into user device 110 by a user, for example by typing it on a keyboard or other input device (not shown). Transaction data may also be entered and transmitted automatically, for example, by a mobile application on user device 110.

Transaction data may include a type of transaction and a customer identifier. A type of transaction may include, for example, an ATM withdrawal, a money transfer or wire, a change order, a debit card PIN reset, or a call center transaction. If the type of transaction is, for example, an ATM withdrawal, a money transfer or wire, or a change order, transaction data may further include an amount. In certain embodiments, transaction data may include other data relating to transactions that is known to those skilled in the art, such as transaction amount, timestamp information, entity identifier, account identifier(s), etc.

At step 920, device 120 may identify a customer account associated with the transaction data. Device 120 may identify the customer account, for example, based upon the customer identifier that may be included in the received transaction data. The associated customer account may be any type of financial account, such as, for example, a debit account, checking account, savings account, or credit card account.

At step 930, device 120 may determine an authentication tier level associated with the transaction. Each transaction may be associated with a tier level. Additionally, each user may have a different tier level associated with each transaction. The tier level may indicate how many data security points must be verified before device 120 may authorize the requested transaction. Security data points may include, for example, a username and password, a GPS location, a phone number or device identifier, or other data associated with user identification methods (e.g., SureSwipe8 or the like). Security data points may additionally include biometric data, such as, for example, fingerprint, retina or iris scan, heartbeat or pulse pattern, facial recognition, voice recognition, or palm vein scan. Each data security point may correspond to a different tier. For example, biometric data may relate to a higher tier (more secure) than a username and password (less secure).

At step 940, device 120 may receive authentication data. In some embodiments, device 120 may prompt the user to enter authentication data through user device 110. The authentication data requested by device 120 may correspond to the authentication tier level. For example, if the requested transaction required an authentication tier level two, the user may be prompted first to enter, for example, a username and password to satisfy tier one. Then, the user may be prompted to enter, for example, biometric data such as a fingerprint scan, vocal recording, retina or iris scan, heartbeat or pulse pattern, facial scan or palm scan.

The user may provide authentication data via user device 110, and device 120 may receive the authentication data (step 940). The form of authentication data provided by the user may be dependent on the type of user device 110 the user is operating. For example, certain user devices may have a fingerprint scanner, but not a retina scanner. Device 120 may detect the capabilities of user device 110 when prompting the user to enter authentication data. Alternatively, device 120 may prompt the user with a plurality of choices of authentication data the user may choose to enter, and the user may then select the option that corresponds with the capabilities of his or her particular user device 110.

At step 950, device 120 may determine if the received authentication data satisfies the determined authentication tier. For example, if the authentication tier level for a particular transaction is 2, a user may first be prompted for a username and password; however, this data will not satisfy the required authentication tier. Device 120 may be configured to execute software that generates a prompt to (or causes a prompt to be generated to) the user for additional authentication data. In certain aspects, the disclosed embodiments may iteratively prompt the user for additional authentication data until the required authentication tier is satisfied or a threshold is met to deny the transaction. For example, once the received authentication data is satisfied (step 950—yes), device 120 may authorize the requested transaction (step 960). If however, the received transaction does not satisfy the required authentication tier, for example, because the biometric data does not match, the username and password are incorrect, the user is attempting to access his account through an unknown mobile device, etc. (step 950—no), device 120 may deny the transaction (step 970). In certain aspects, device 120 may be configured to generate and provide a message to user device 110 (or some other device) reflecting the results of the authentication operation (e.g., authentication denied and/or transaction denied; authentication accepted and/or transaction authorized).

Figure 10:
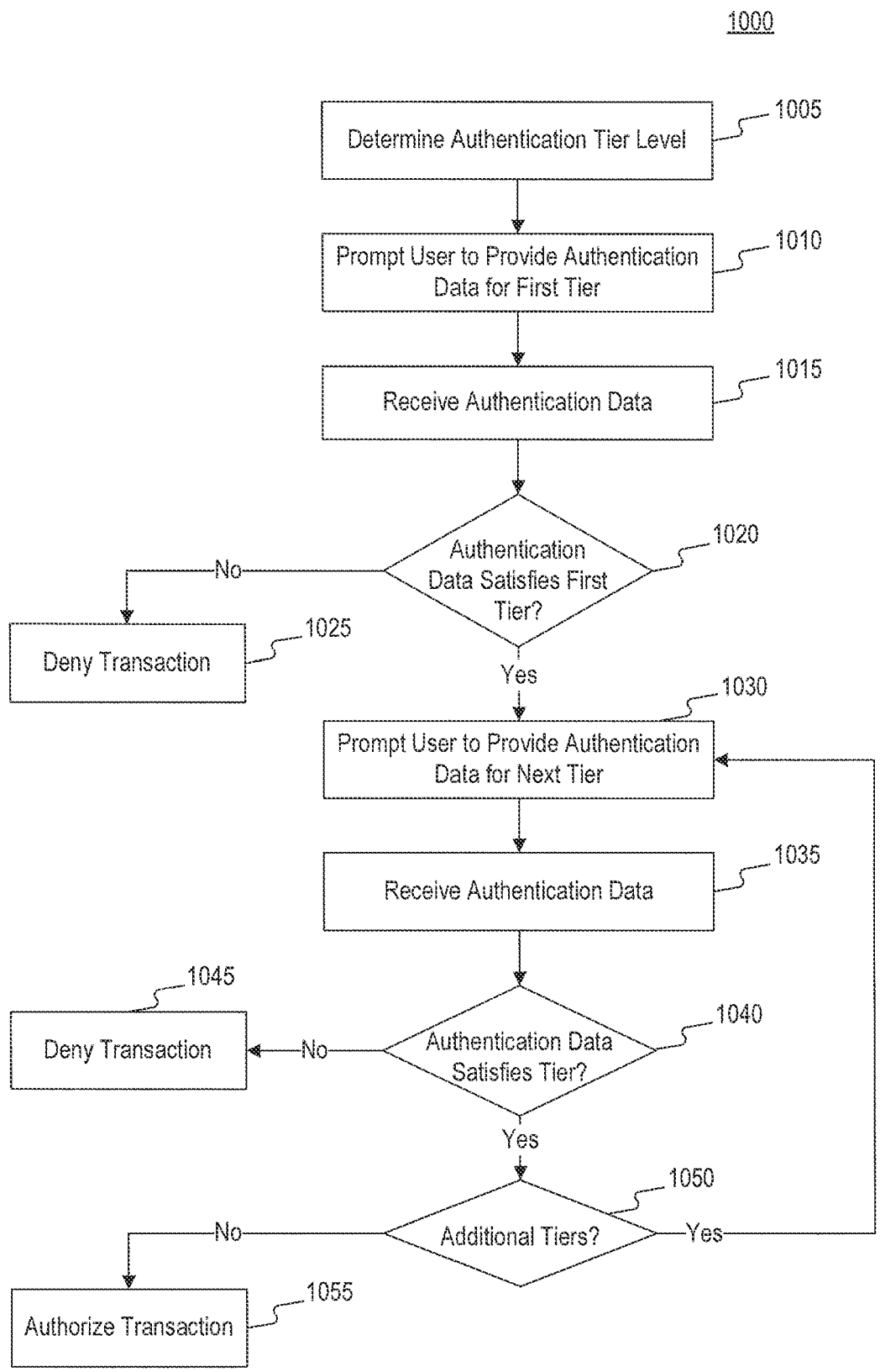
FIG. 10 is a flowchart of an exemplary process for authenticating a financial transaction in a multi-tiered authentication system, consistent with disclosed embodiments.

FIG. 10 shows an exemplary multi-tiered authentication process 1000, consistent with disclosed embodiments. Process 1000 may be performed by processor 210 of, for example, device 120 executing instructions encoded on a computer-readable medium storage device. It is to be understood, however, that one or more steps of process 1000 may be implemented by other components of system 100 (shown or now shown), including biometric database 150 and/or user device 110.

At step 1005, as also discussed with reference to FIG. 9, device 120 may determine an authentication tier level for a particular transaction. Each transaction may be associated with a tier level. Additionally, different users associated with different user device(s) 110 may have a different tier level associated with each transaction. In certain aspects, different users may be customer(s) or potential customers of the financial service provider associated with device 120. The tier level may indicate how many data security points must be verified before device 120 may authorize the requested transaction. Security data points may include, for example, a username and password, a GPS location, a phone number or device identifier, or other data associated with user identification (e.g., SureSwipesM or the like). Security data points may additionally include biometric data, such as, for example, fingerprint, retina or iris scan, heartbeat or pulse pattern, facial recognition, voice recognition, or palm vein scan. Each data security point may correspond to a different tier. For example, biometric data may relate to a higher tier (more secure) than a username and password (less secure).

Assuming the authentication tier level determined in step 1005 is greater than one, device 120 may prompt the user to provide authentication data sufficient to satisfy the first authentication tier (step 1010). Device 120 may then receive authentication data (step 1015). Device 120 may receive authentication data from, for example, user device 110. Authentication data may be entered manually by the user (e.g., username and password) or may be automatically transmitted to device 120 by user device 110 (e.g., GPS data, phone or device identifier, etc.).

Device 120 may then determine if the authentication data received satisfies the first authentication tier (step 1020). Device 120 may determine if the authentication data satisfies the first tier by comparing the received authentication data with the stored customer information. Customer information may be stored, for example, in memory 230 or database 240. Customer information may additionally or alternatively be stored in biometric database 150. Biometric database 150 may be operated by the financial service provider. Alternatively, biometric database 150 may be operated and maintained by an independent third party or government entity. If the authentication data does not satisfy tier one (step 1020—no}, for example, because the incorrect information was entered and there is not a match between the authentication data and the stored customer data, device 120 may deny the transaction. If the authentication data satisfies tier one (step 1020—yes), device 120 may indicate that the first tier of authentication has been satisfied and then move on to the next tier.

At step 1030, device 120 again may prompt the user to provide authentication data. This time, the prompted authentication data may respond to the second tier. For example, second tier authentication data may indicate a higher level of security. For example, second tier authentication data may include GPS location, phone or device identification information, or user biometric data. If the requested second tier authentication data is related to user device 110 (e.g., GPS location or device identification information), the request for authentication data, as well as the responsive transmission of the requested data, may occur automatically and transparent to the user.

Similar to that discussed above in connection with a tier one operation, at step 1035, device 120 may receive the authentication data, and then at step 1040, device 120 may determine if the received authentication data satisfies the second tier. If the authentication data does not satisfy the tier (step 1040—no), for example, because incorrect information was received, device 120 may deny the transaction (step 1045). Alternatively, if the received authentication data satisfies the tier (step 1040—yes), device 120 may then determine if there are additional authentication tiers that need to be satisfied before the particular transaction can be authorized (step 1050). If there are no additional tiers (step 1050—no), then device 120 may authorize the transaction. If, however, there are additional authentication tiers for the particular transaction (step 1050—yes), device 120 repeats the process beginning with step 1030 again, and continues to do so until all authorization tiers are satisfied. In certain aspects, device 120 may be configured to generate and provide a message to user device 110 (or some other device) reflecting the results of the authentication operation(s) (e.g., authentication denied and/or transaction denied; authentication accepted and/or transaction authorized).

Figure 11:
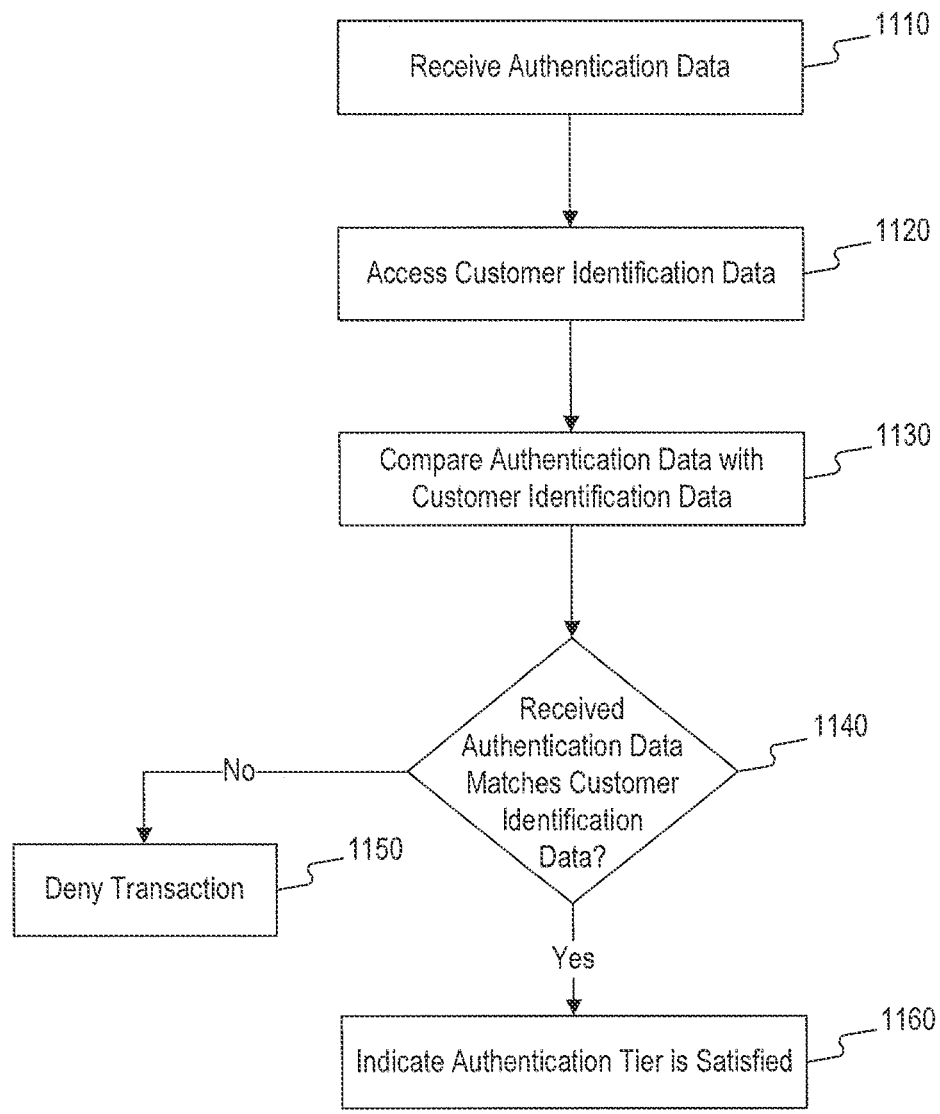
FIG. 11 is a flowchart of an exemplary process for authenticating a particular tier in a multi-tiered authentication system, consistent with disclosed embodiments.

FIG. 11 shows an exemplary authentication process 1100, consistent with disclosed embodiments. Process 1100 may be performed by processor 210 of, for example, device 120 executing instructions encoded on a computer-readable medium storage device. It is to be understood, however, that one or more steps of process 1100 may be implemented by other components of system 100 (shown or not shown), including biometric database 150 and/or user device 110.

At step 1110, device 120 may receive authentication data, as discussed previously with respect to FIGS. 9 and 10. At step 1120, device 120 may access customer identification data. Customer identification data may be stored, for example, in memory 230 or database 240 of device 120. Additionally or alternatively, customer identification data may be stored in biometric database 150. Customer identification data may include any stored data related to a customer that may correspond to the authentication data requested of a customer in order to validate the customer's identity for authentication purposes. For example, customer data may include a username and password, a known GPS location (e.g., the customer's home or work location), a device identifier (e.g., phone number, device serial number, IP address, etc.). Customer data may further include biometric data, such as, for example, fingerprints, retina and/or iris scans, heartbeat or pulse pattern, palm vein scan, facial image, or voice recording.

At step 1130, device 120 may compare the received authentication data to determine if it matches the stored customer identification data. If the received authentication data does not match the customer identification data (step 1140—no), device 120 may deny the transaction (step 1150). In certain aspects, device 120 may be configured to generate and provide a message to user device 110 (or some other device) that the transaction was denied. If the received authentication data matches the corresponding customer data (step 1140—yes), device 120 may indicate that the authentication tier is satisfied (step 1160). For example, device 120 may be configured to execute software that generates information used to provide an indication reflecting the status of the authentication analysis, whether a transaction is authorized, etc. For example, in some embodiments, device 120 may be configured to provide information to user device 110 that device 110 may use to generate and provide a message in an interface presented in a display device of user device 110. For instance, user device 110 may be configured, based on information provided by device 120 to display a message on a display device that the authentication tier is satisfied or that a transaction has been authorized. Additionally or alternatively, device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, device 120 may authorize the transaction.

Figure 12:
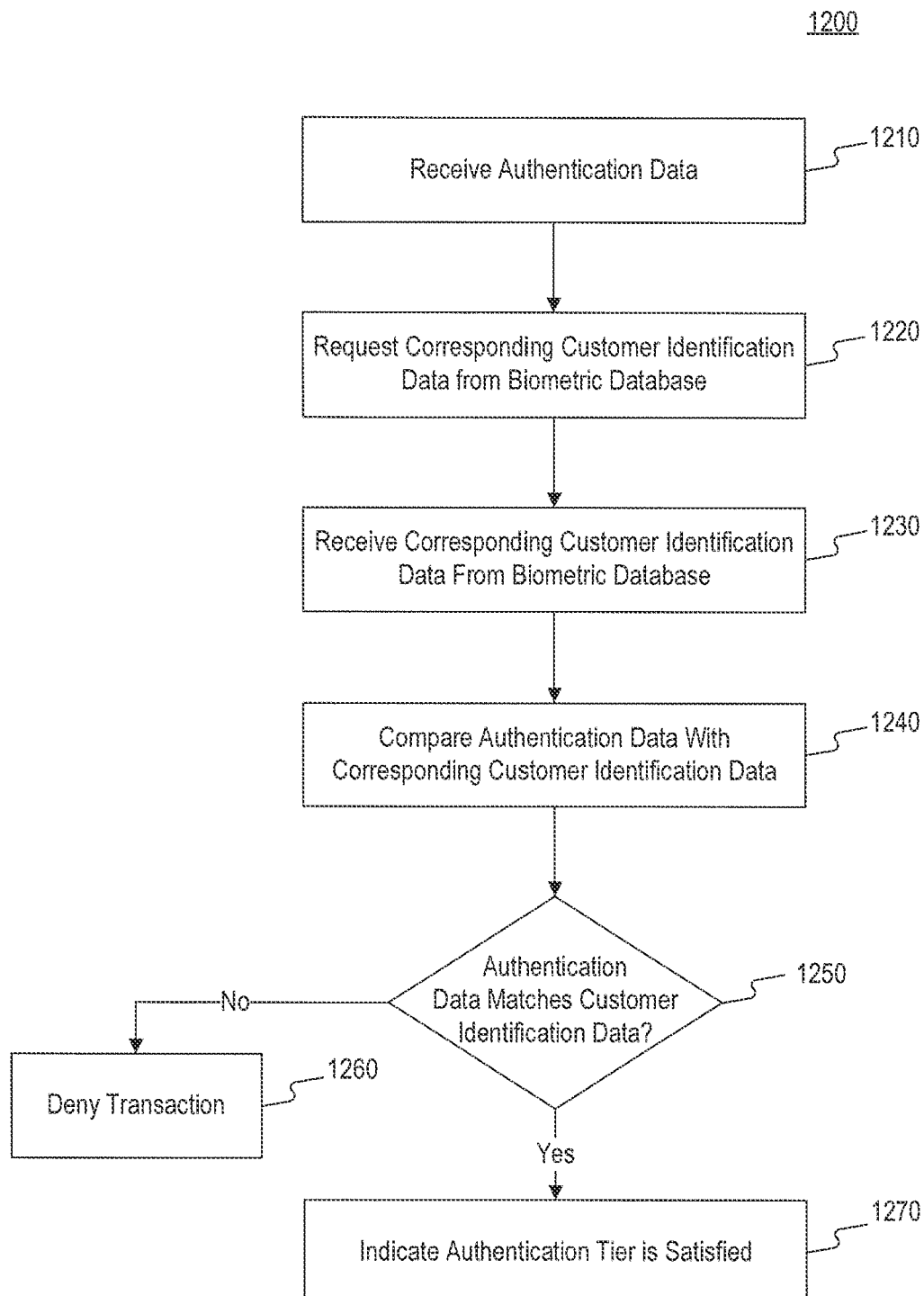
FIG. 12 is a flowchart of an exemplary process for authenticating a financial transaction when customer data is held by a third party, consistent with disclosed embodiments.

FIG. 12 shows an exemplary authentication process when the customer identification data is stored on a remote biometric database 150, consistent with disclosed embodiments. Process 1200 may be performed by processor 210 of, for example, device 120 executing instructions encoded on a computer-readable medium storage device. It is to be understood, however, that one or more steps of process 1200 may be implemented by other components of system 100 (shown or not shown), including biometric database 150 and/or user device 110.

At step 1210, device 120 may receive authentication data, as discussed in detail with respect to FIGS. 9 and 10. At step 1220, device 120 may request corresponding customer identification data from biometric database 150. Requesting customer identification data may include, for example, requesting access to biometric database 150. Additionally or alternatively, requesting customer identification data may include, for example, requesting biometric database 150 to transmit the necessary information to device 120, for example, via network 140. Additionally or alternatively, requesting customer identification data may include device 120 transmitting the received authentication data to biometric database 150, and allowing biometric database 150 to conduct the validation and authentication. At step 1230, device 120 may receive corresponding customer identification data from biometric database 150.

At step 1240, device 120 may compare the received authentication data with the corresponding customer identification data received or accessed in step 1230. Additionally or alternatively, step 1240 may be performed by biometric database 150. Based on the comparison, device 120 (or alternatively biometric database 150) may determine if the received authentication data matches the customer identification data (step 1250). If the received authentication data does not match the stored customer identification data (step 1250—no), device 120 may deny the transaction (step 1260). In certain aspects, device 120 may be configured to generate and provide a message to user device 110 (or some other device) that the transaction was denied. If the received authentication data matches the customer identification data (step 1250—yes), device 120 may then then indicate that the authentication tier is satisfied (step 1270). For example, device 120 may be configured to execute software that generates information used to provide an indication reflecting the status of the authentication analysis, whether a transaction is authorized, etc. For example, in some embodiments, device 120 may be configured to provide information to user device 110 that user device 110 may use to generate and provide a message in an interface presented in a display device of user device 110. For instance, user device 110 may be configured, based on information provided by device 120 to display a message to the user that the authentication tier is satisfied or notifying the user that the transaction has been authorized. Additionally or alternatively, device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, device 120 may authorize the transaction.

Figure 13:
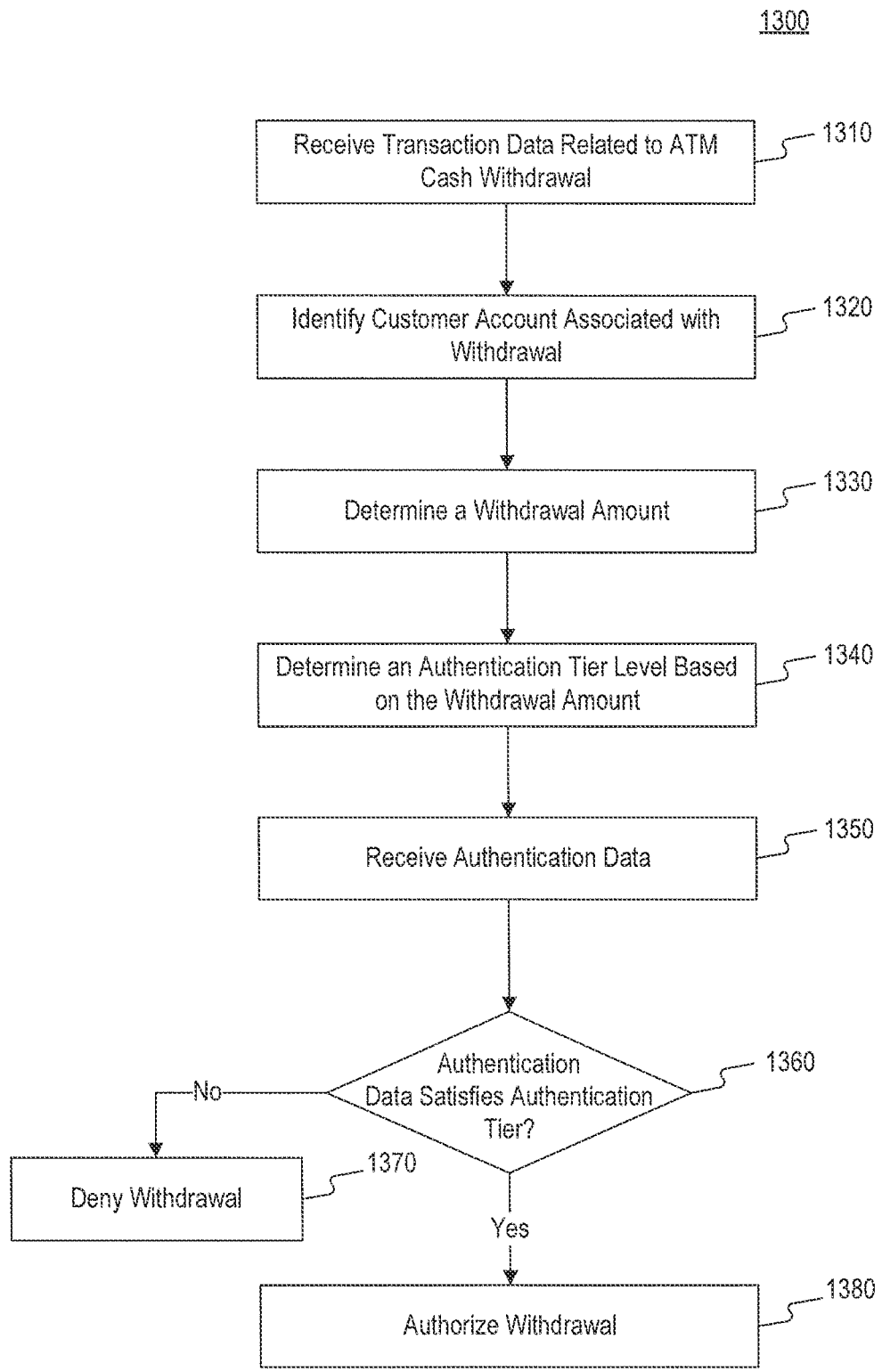
FIG. 13 is a flowchart of an exemplary multi-tiered authentication process relating to an ATM withdrawal transaction, consistent with disclosed embodiments.

FIG. 13 shows an exemplary authentication process 1300, consistent with disclosed embodiments, relating to an ATM withdrawal transaction. Process 1300 may be performed by processor 210 of, for example, device 120 executing instructions encoded on a computer-readable medium storage device. It is to be understood, however, that one or more steps of process 1300 may be implemented by other components of system 100 (shown or not shown), including biometric database 150 and/or user device 110.

At step 1310, device 120 may receive transaction data related to an ATM cash withdrawal. For example, a user may indicate through a mobile application installed on user device 110 that he or she wishes to make an ATM withdrawal. At step 1320, device 120 may then identify a customer account associated with the transaction. Device 120 may identify the customer account by locating the matching customer account based on the transaction data. Additionally or alternatively, the mobile application on user device 110 the customer may be operating to initiate the transaction may require the user to log into a user account. If the user is logged into a user account on the mobile application, user device 110 may then automatically transmit the necessary information to device 120 in order for device 120 to identify the corresponding customer account.

Device 120 may then determine the withdrawal amount (step 1330). The withdrawal amount may be automatically transmitted to device 120 by user device 110 when the user initiates the ATM withdrawal transaction. Additionally or alternatively, the withdrawal amount may be included in the transaction data received by device 120 at step 1310. Based on the customer account and the withdrawal amount, device 120 may then determine an authentication tier level for the transaction (step 1340). For example, the higher the withdrawal amount, the higher the authentication tier level may be in order to have the withdrawal transaction authorized.

At step 1350, device 120 may receive authentication data, as discussed in detail with respect FIGS. 9 and 10. Device 120 (or alternatively biometric database 150) may then determine if the received authentication data matches the customer identification data, and therefore satisfies the authentication tier (step 1360). Device 120 (or biometric database 150) may determine if the received authentication data matches the customer identification data by conducting a comparison as discussed in detail with respect to FIG. 6. If the received authentication data does not match the stored customer identification data, and therefore does not satisfy the authentication tier, (step 1360—no), device 120 may deny the transaction (step 1370). In certain aspects, device 120 may be configured to generate and provide a message to user device 110 (or some other device) that the transaction was denied. If the received authentication data matches the customer identification data (step 1360—yes), device 120 may then indicate that the authentication tier is satisfied. For example, device 120 may be configured to execute software that generates information used to provide an indication reflecting the status of the authentication analysis, whether a transaction is authorized, etc. For example, in some embodiments, device 120 may be configured to provide information to user device 110 that device 110 may use to generate and provide a message in an interface presented in a display device of user device 110. For instance, user device 110 may be configured, based on information provided by device 120 to display a message to the user that the authentication tier is satisfied or notifying the user that the transaction has been authorized. Additionally or alternatively, device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, device 120 may authorize the transaction and allow the withdrawal (step 1380).

Figure 14:
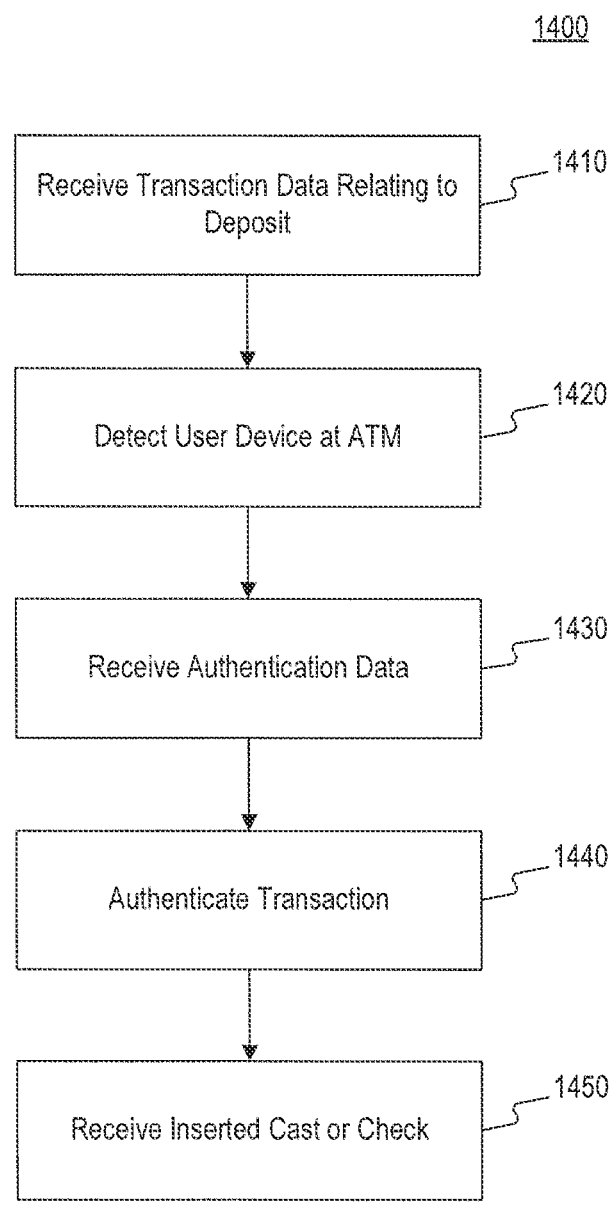
FIG. 14 is a flowchart of an exemplary process for making a deposit, consistent with the disclosed embodiments.

FIG. 14 shows an exemplary process for depositing funds, consistent with disclosed embodiments. Process 1400 may be performed by processor 210 of, for example, device 120 and/or local device 130 executing instructions encoded on a computer-readable medium storage device. It is to be understood, however, that one or more steps of process 1400 may be implemented by other components of system 100 (shown or not shown), including user device 110.

At step 1410, device 120 may receive transaction data related to a deposit of funds. As previously discussed with reference to FIGS. 3 and 4, for example, user device 110 may execute a mobile application associated with the financial service provider associated with device 120. The user device 110 may transmit transaction data via network 140 to device 120. Transaction data may be entered manually into user device 110 by a user, for example by typing it on a keyboard or other input device (not shown), using voice recognition software, etc. Transaction data may also be entered and transmitted automatically, for example, by a mobile application on user device 110. Alternatively or additionally, local device 130 may receive the transaction data from user device 110. For example, user device 110 may enter information requesting to deposit funds into a financial service account at an ATM provided by a financial service provider (e.g., an entity associated with device 120). User device 110 may be configured to generate an interface to request transaction data from the user regarding the deposit. User device 110 may receive the user input of transaction data and store the received transaction data for processing in accordance with one or more operations consistent with the disclosed embodiments Local device 130 may detect the customer with a user device 110 at an ATM (step 1420). In certain aspects, local device 130 may be configured to execute software that performs processes to determine whether a user (e.g., customer) with a user device 110 is within a predetermined distance or range of distance(s) of local device 130, in this case an ATM. For example, in certain aspects, local device 130 may determine whether a user (e.g., customer) with a user device 110 is within one foot, two feet, six inches, etc., of local device 130. For instance, local device 130 may detect the customer by detecting user device 110, through network 140 (Wi-Fi, BLE, NFC, etc.), for example. User device 110 may need to be detected at a certain threshold distance before local device 130 will connect and communicate with user device 110. For example, user device 110 may need to be within 6 inches of local device 130 before the devices connect to conduct the transaction. Additionally or alternatively, local device 130 may first detect the customer (step 1420) and then receive the transaction data (step 1410), as described with reference to FIG. 4. For example, user device 110 may be configured to execute software that generates a prompt to (or causes a prompt to be generated to) the user to initiate a financial transaction. Initiating a financial transaction, for example, may cause user device 110 to transmit transaction data to local device 130.

In certain embodiments, device 120 may determine whether user device 110 is at the local device 130 (e.g., ATM) (step 1420). For example, device 120 may be configured to execute software that performs processes to determine whether a user (e.g., customer) with a user device 110 is within a predetermined distance or range of distance(s) of local device 130. In one aspect, device 120 may be configured to execute software that relates the distance of user device 110 to local device 130, to a distance of the customer associated with user device 110. For example, device 120 may be configured to receive a signal from local device 130 indicating that it has detected a signal from user device 110. Device 120 may then determine the physical location of user device 110 (and, for instance, the customer) with respect to local device 130.

At step 1430, local device 130 and/or device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., SureSwipesM or the like). Biometric data may include, for example, a fingerprint scan, voice recognition, facial recognition, retina or iris scan, or palm vein scan.

At step 1440, device 120 and/or local device 130 may authenticate and authorize the transaction, as described in detail with respect to FIGS. 3 and 4. For example, in one embodiment, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

In certain aspects, device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local device 130, or the ATM. For example, local device 130 may contain a screen or other display. In certain embodiments, messages, such as those reflecting the results of authentication operations, may be displayed to the user via the screen or display of local device 130.

At step 1450, local device 130 (e.g., the ATM) may receive cash or a check consistent with the amount indicated in the transaction data. Local device 130 may, for example, receive cash or a check in the amount of the deposit request, without the user ever having to physically manipulate components of local device 130 (e.g., use a keypad on local device 130, swipe a card, etc.). In certain embodiments, device 120 may be configured to transmit information to local device 130 indicating that the transaction has been authenticated.

In certain embodiments, inserting cash or a check into the ATM may complete the transaction. Prior to or following the insertion of cash or a check, the ATM may display to the user a message indicating that the transaction is processing. For example, local device 130 may contain a screen or other display. In certain embodiments, messages, such as those reflecting the results of authentication operations, may be displayed to the user via the screen or display of local device 130. Similarly, following insertion of the cash or check, the ATM may display to the user a message indicating that the transaction is complete.

Figure 15:
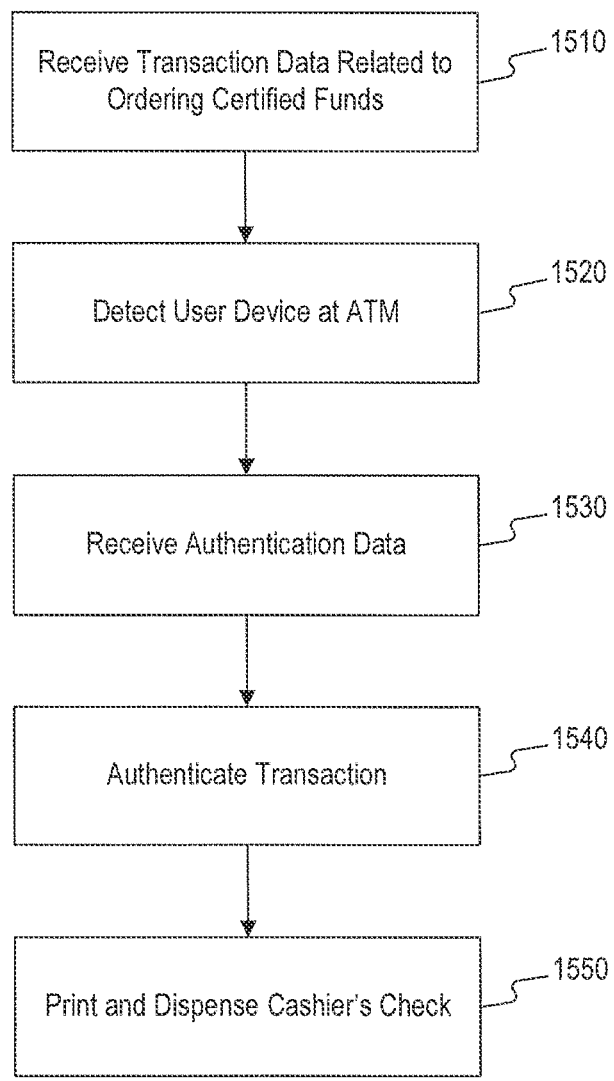
FIG. 15 is a flowchart of an exemplary process for placing an order for certified funds, consistent with the disclosed embodiments.

FIG. 15 shows an exemplary process for ordering certified funds or cashier's checks, consistent with disclosed embodiments. Process 1500 may be performed by processor 210 of, for example, device 120 and/or local device 130 executing instructions encoded on a computer-readable medium storage device. It is to be understood, however, that one or more steps of process 1500 may be implemented by other components of system 100 (shown or not shown), including user device 110.

At step 1510, device 120 may receive transaction data related to a deposit of funds, as previously discussed with reference to FIGS. 3 and 4. As an example, user device 110 may execute a mobile application associated with the financial service provider associated with device 120. User device 110 may transmit transaction data via network 140 to device 120. Transaction data may be entered manually into user device 110 by a user, for example, by typing it on a keyboard or other input device (not shown), using voice recognition software, etc. Transaction data may also be entered and transmitted automatically, for example, by a mobile application on user device 110. Alternatively, local device 130 may receive the transaction data from user device 110. For example, user device 110 may enter information requesting certified funds from a financial service provider. User device 110 may be configured to generate an interface to request transaction data from the user regarding the certified funds. User device 110 may receive the user input of transaction data, and store the received transaction data for processing in accordance with one or more operations consistent with the disclosed embodiments.

Local device 130 may detect the customer with a user device 110 at an ATM or within a branch location (step 1520). In certain aspects, local device 130 may be configured to execute software that performs processes to determine whether a user (e.g., customer) with a user device 110 is within a predetermined distance or range of distance(s) of local device 130. For example, in certain aspects, local device 130 may determine whether a user (e.g., customer) with a user device 110 is within one foot, two feet, six inches, etc., of local device 130. For instance, local device 130 may detect the customer by detecting user device 110, through network 140 (Wi-Fi, BLE, NFC, etc.), for example.

User device 110 may be required to be detected at a certain threshold distance before local device 130 will connect and communicate with user device 110. For example, user device 110 may need to be within 6 inches of local device 130 before the devices connect to conduct the transaction. Additionally or alternatively, local device 130 may first detect the customer (step 1420) and then receive the transaction data (step 1510), as described with reference to FIG. 4. For example, user device 110 may be configured to execute software that generates a prompt to (or causes a prompt to be generated to) the user to initiate a financial transaction. Initiating a financial transaction, for example, may cause user device 110 to transmit transaction data to local device 130.

In certain embodiments, device 120 may determine whether user device 110 is at the local device 130 (e.g., ATM) (step 1520). For example, device 120 may be configured to execute software that performs processes to determine whether a user (e.g., customer) with a user device 110 is within a predetermined distance or range of distance(s) of local device 130. In one aspect, device 120 may be configured to execute software that relates the distance of user device 110 to local device 130, to a distance of the customer associated with user device 110. For example, device 120 may be configured to receive a signal from local device 130 indicating that it has detected a signal from user device 110. Device 120 may then determine the physical location of user device 110 (and, for instance, the customer) with respect to local device 130.

At step 1530, local device 130 and/or device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., SureSwipesM or the like). Biometric data may include, for example, a fingerprint scan, voice recognition, facial recognition, retina or iris scan, or palm vein scan.

At step 1540, device 120 and/or local device 130 may authenticate and authorize the transaction, as described in detail with respect to FIGS. 3 and 4. For example, in one embodiment, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

In certain aspects, device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local device 130, or the ATM. For example, local device 130 may contain a screen or other display. In certain embodiments, messages, such as those reflecting the results of authentication operations may be displayed to the user via the screen or display of local device 130.

At step 1550, local device 130, the ATM, may print and dispense a cashier's check consistent with the information indicated by the user in the transaction data. Local device 130 may, for example, print and dispense a cashier's check, without the user ever having to physically manipulate components of local device 130 (e.g., use a keypad on local device 130, swipe a card, etc.). In certain embodiments, device 120 may be configured to transmit information to local device 130 indicating that the transaction has been authenticated.

In certain embodiments, printing and dispensing the cashier's check by the ATM may complete the transaction. Prior to or during the printing and dispensing of the cashier's check, the ATM may display to the user a message indicating that the transaction is processing. For example, local device 130 may contain a screen or other display. In certain embodiments, messages, such as those reflecting the results of authentication operations, may be displayed to the user via the screen or display of local device 130. Similarly, following printing and dispensing the cashier's check, the ATM may display to the user a message indicating that the transaction is complete.

Figure 16:
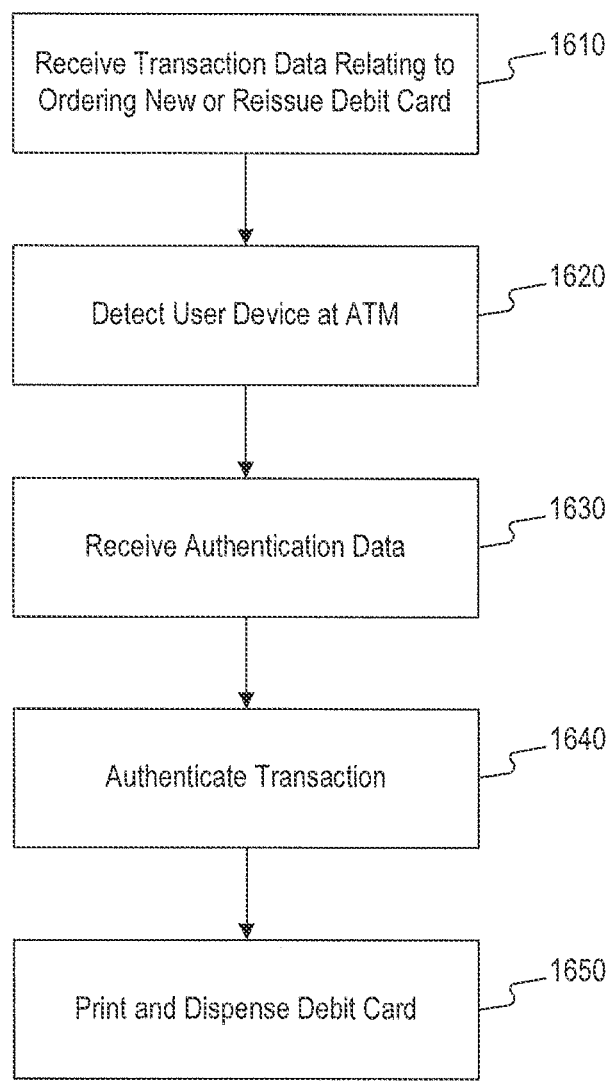
FIG. 16 is a flowchart of an exemplary process for ordering a new or reissue debit card, consistent with the disclosed embodiments.

FIG. 16 shows an exemplary process for ordering a new or reissue debit card, consistent with disclosed embodiments. Process 1600 may be performed by processor 210 of, for example, device 120 and/or local device 130 executing instructions encoded on a computer-readable medium storage device. It is to be understood, however, that one or more steps of process 1600 may be implemented by other components of system 100 (shown or not shown), including user device 110.

At step 1610, device 120 may receive transaction data related to ordering a new or reissue debit card, as previously discussed with reference to FIGS. 3 and 4. As an example, user device 110 may execute a mobile application associated with the financial service provider associated with device 120. User device 110 may transmit transaction data via network 140 to device 120. Transaction data may be entered manually into user device 110 by a user, for example, by typing it on a keyboard or other input device (not shown), using voice recognition software, etc. Transaction data may also be entered and transmitted automatically, for example, by a mobile application on user device 110. Alternatively, local device 130 may receive the transaction data from user device 110. For example, user device 110 may enter information requesting a new or reissued debit card related to a financial service account provided by a financial service provider (e.g., an entity associated with device 120). User device 110 may be configured to generate an interface to request transaction data from the user regarding the request. User device 110 may receive the user input of transaction data and store the received transaction data for processing in accordance with one or more operations consistent with the disclosed embodiments. Transaction data for ordering a new or reissue debit card may include, for example, an account number and card design.

Local device 130 may detect the customer with a user device 110 at an ATM (step 1620). In certain aspects, local device 130 may be configured to execute software that performs processes to determine whether a user (e.g., customer) with a user device 110 is within a predetermined distance or range of distance(s) of local device 130. For example, in certain aspects, local device 130 may determine whether a user (e.g., customer) with a user device 110 is within one foot, two feet, six inches, etc., of local device 130. For instance, local device 130 may detect the customer by detecting user device 110, through network 140 (Wi-Fi, BLE, NFC, etc.), for example. User device 110 may need to be detected at a certain threshold distance before local device 130 will connect and communicate with user device 110. For example, user device 110 may need to be within 6 inches of local device 130 before the devices connect to conduct the transaction. Additionally or alternatively, local device 130 may first detect the customer (step 1620) and then receive the transaction data (step 1610), as described with reference to FIG. 4. For example, user device 110 may be configured to execute software that generates a prompt to (or causes a prompt to be generated to) the user to initiate a financial transaction, such as the ordering of a new or reissue debit card. Initiating a financial transaction, for example, may cause user device 110 to transmit transaction data related to the order to local device 130.

In certain embodiments, device 120 may determine whether user device 110 is at the local device 130 (e.g., ATM) (step 1620). For example, device 120 may be configured to execute software that performs processes to determine whether a user (e.g., customer) with a user device 110 is within a predetermined distance or range of distance(s) of local device 130. In one aspect, device 120 may be configured to execute software that relates the distance of user device 110 to local device 130, to a distance of the customer associated with user device 110. For example, device 120 may be configured to receive a signal from local device 130 indicating that it has detected a signal from user device 110. Device 120 may then determine the physical location of user device 110 (and, for instance, the customer) with respect to local device 130.

At step 1630, local device 130 and/or device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., SureSwipe8 or the like). Biometric data may include, for example, a fingerprint scan, voice recognition, facial recognition, retina or iris scan, or palm vein scan.

At step 1640, device 120 and/or local device 130 may authenticate and authorize the transaction, as described in detail with respect to FIGS. 3 and 4. For example, in one embodiment, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

In certain aspects, device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local device 130, or the ATM. For example, local device 130 may contain a screen or other display. In certain embodiments, messages, such as those reflecting the results of authentication operations may be displayed to the user via the screen or display of local device 130.

At step 1650, local device 130, the ATM, may print and dispense a debit card as ordered. Local device 130 may, for example, print and dispense the requested debit card, without the user ever having to physically manipulate components of local device 130 (e.g., use a keypad on local device 130, swipe a card, etc.). In certain embodiments, device 120 may be configured to transmit information to local device 130 indicating that the transaction has been authenticated.

In certain embodiments, printing and dispensing the debit card may complete the transaction. Prior to or following the printing and dispensing of the debit card, the ATM may display to the user a message indicating that the transaction is processing. For example, local device 130 may contain a screen or other display. In certain embodiments, messages, such as those reflecting the results of authentication operations may be displayed to the user via the screen or display of local device 130. Similarly, following dispensing the debit card, the ATM may display to the user a message indicating that the transaction is complete.

Figure 17:
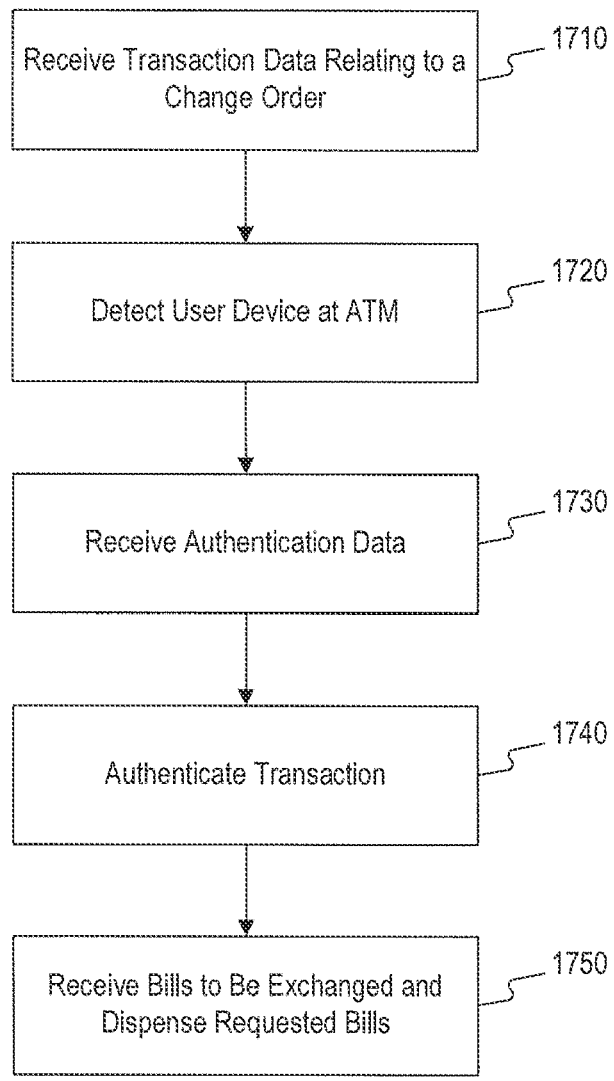
FIG. 17 is a flowchart of an exemplary process for submitting a change order, consistent with the disclosed embodiments.

FIG. 17 shows an exemplary process for submitting a change order, consistent with disclosed embodiments. A change order may be submitted by the owner of a small business who may submit large bills in exchange for small bills, for example, in order to be able to make change for customers throughout the day. Additionally or alternatively, a change order may be submitted to exchange a quantity of small bills for larger bills. Process 1700 may be performed by processor 210 of, for example, device 120 and/or local device 130 executing instructions encoded on a computer-readable medium storage device. It is to be understood, however, that one or more steps of process 1700 may be implemented by other components of system 100 (shown or not shown), including user device 110.

At step 1710, device 120 may receive transaction data related to a change order, as previously discussed with reference to FIGS. 3 and 4. As an example, user device 110 may execute a mobile application associated with the financial service provider associated with device 120. User device 110 may transmit transaction data via network 140 to device 120. Transaction data may be entered manually into user device 110 by a user, for example, by typing it on a keyboard or other input device (not shown), using voice recognition software, etc. Transaction data may also be entered and transmitted automatically, for example, by a mobile application on user device 110. Alternatively, local device 130 may receive the transaction data from user device 110. For example, user device 110 may enter information requesting a change order related to a financial service account provided by a financial service provider (e.g., an entity associated with device 120). User device 110 may be configured to generate an interface to request transaction data from the user regarding the request. User device 110 may receive the user input of transaction data and store the received transaction data for processing in accordance with one or more operations consistent with the disclosed embodiments. Transaction data for ordering a change order may include, for example, the denomination of bills they would like to exchange, the denomination of bills they would like to receive, and a location where they would like to make the exchange if the customer is not already at a branch or ATM location.

Local device 130 may detect the customer with a user device 110 at an ATM (step 1720). In certain aspects, local device 130 may be configured to execute software that performs processes to determine whether a user (e.g., customer) with a user device 110 is within a predetermined distance or range of distance(s) of local device 130. For example, in certain aspects, local device 130 may determine whether a user (e.g., customer) with a user device 110 is within one foot, two feet, six inches, etc., of local device 130. For instance, local device 130 may detect the customer by detecting user device 110, through network 140 (Wi-Fi, BLE, NFC, etc.), for example. User device 110 may need to be detected at a certain threshold distance before local device 130 will connect and communicate with user device 110. For example, user device 110 may need to be within 6 inches of local device 130 before the devices connect to conduct the transaction. Additionally or alternatively, local device 130 may first detect the customer (step 1720) and then receive the transaction data (step 1710). For example, user device 110 may be configured to execute software that generates a prompt to (or causes a prompt to be generated to) the user to initiate a financial transaction, such as the change order. Initiating a financial transaction, for example, may cause user device 110 to transmit transaction data related to the order to local device 130.

In one aspect, device 120 may be configured to execute software that relates the distance of user device 110 to local device 130, to a distance of the customer associated with user device 110. For example, device 120 may be configured to receive a signal from local device 130 indicating that it has detected a signal from user device 110. Device 120 may then determine the physical location of user device 110 (and, for instance, the customer) with respect to local device 130.

At step 1730, local device 130 and/or device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, device 120 may receive authentication data through user device 110. If, for example, local device 130 receives the authentication data, the data may then be transmitted to device 120 for authentication. Authentication data may include, for example, a username and password, social security number, ATM pin, biometric data, or other data associated with user identification methods (e.g., SureSwipe8 or the like). Biometric data may include, for example, a fingerprint scan, voice recognition, facial recognition, retina or iris scan, or palm vein scan.

At step 1740, device 120 and/or local device 130 may authenticate and authorize the transaction, as described in detail with respect to FIGS. 3 and 4. For example, in one embodiment, device 120 may authenticate the transaction by comparing the received authentication data with stored customer data corresponding to the particular user. When the customer data matches the authentication data, the transaction may be authenticated, and device 120 may then authorize the transaction. Device 120 may transmit a signal to local device 130 that the transaction has been authenticated and authorized via network 140. Alternatively, local device 130 may authenticate and authorize the transaction independent from device 120. The amount and type of authentication data required for device 120 to authenticate the transaction may be determined by the amount of the transaction. For example, a higher transaction amount may require additional or more secure authentication data.

In certain aspects, device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local device 130, or the ATM. For example, local device 130 may contain a screen or other display. In certain embodiments, messages, such as those reflecting the results of authentication operations may be displayed to the user via the screen or display of local device 130.

At step 1750, local device 130, the ATM, may receive the bills to be exchanged and dispense the new bills. Local device 130 may, for example, allow for receipt of the bills for exchange and, once the quantity of bills received is confirmed, dispense the requested new denomination of bills, without the user ever having to physically manipulate components of local device 130 (e.g., use a keypad on local device 130, swipe a card, etc.). In certain embodiments, device 120 may be configured to transmit information to local device 130 indicating that the transaction has been authenticated.

In certain embodiments, dispensing the requested denominations of bills may complete the transaction. Prior to or following dispensing, the ATM may display to the user a message indicating that the transaction is processing. For example, local device 130 may contain a screen or other display. In certain embodiments, messages, such as those reflecting the results of authentication operations may be displayed to the user via the screen or display of local device 130. Similarly, following dispensing the requested bills, the ATM may display to the user a message indicating that the transaction is complete.

In some examples, some or all of the logic for the above-described techniques may be implemented as a computer program or application or as a plugin module or subcomponent of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those of skill in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A server system comprising:
   one or more processors and memory storing instructions that, when executed by the one or more processors, cause operations comprising:
   in response to (i) a mobile device wirelessly transmitting a short-range wireless signal to a local device local to the mobile device and (ii) the mobile device being detected, based on the short-range wireless signal, as being within a predetermined distance of the local device, providing presentation instructions to present multiple access initiation options on a user interface of the mobile device, the access initiation options comprising a resource withdrawal or transfer, a card reset, or a call center call using the local device;
   in response to a selection of a first option via the user interface to initiate an access request for an access operation with the local device, generating an authentication request associated with a biometric authentication capability based on the biometric authentication capability (i) being detected by the server system as an authentication capability of the mobile device via interaction with the mobile device and (ii) corresponding to a first authentication tier that is selected by the server system over a second authentication tier due to the first authentication tier (a) corresponding to an access amount of the access request and (b) not corresponding to a different access amount to which the second authentication tier corresponds, the second authentication tier being different from the first authentication tier;
   obtaining the access amount of the access request from the mobile device via the first option on the user interface;
   in response to detecting the biometric authentication capability of the mobile device based on a detection of a biometric scanner on the mobile device, generating a prompt for biometric user input to obtain, via the biometric scanner, authentication data for completing the access operation with the local device, wherein the authentication data comprises one or more of fingerprint data, retina scan data, iris scan data, heartbeat pattern data, facial recognition data, voice recognition data, or palm vein scan data;
   obtaining, from the mobile device via the prompt, the authentication data for completing the access operation with the local device in connection with the authentication request;
   granting, based on the authentication data, access to the local device for completing the access operation with the local device; and
   transmitting, based on the authentication data, an authentication confirmation to the mobile device.

2. The server system of claim 1, the operations further comprising:
   detecting a fingerprint authentication capability of the mobile device based on a detection of a fingerprint scanner being on the mobile device,
   wherein generating the authentication request comprises, in response to detecting the fingerprint authentication capability of the mobile device, generating the authentication request to include at least one prompt related to fingerprint scanning.

3. The server system of claim 1, wherein the authentication data comprises one or more of retina scan data, iris scan data, or facial recognition data.

4. A method comprising:
   executing, by one or more processors of a server system, operations comprising:
   in response to (i) a mobile device wirelessly transmitting a short-range wireless signal to a local device local to the mobile device and (ii) the mobile device being detected, based on the short-range wireless signal, being within a predetermined distance of the local device, transmitting presentation instructions to the mobile device to present access initiation options on a user interface of the mobile device, the access initiation options comprising a resource withdrawal or transfer, a card reset, or a call center call using the local device;
   in response to a selection of a first option of the access initiation options via the user interface to initiate an access request for an access operation with the local device, generating an authentication request associated with a biometric authentication capability and with a first authentication tier based on the biometric authentication capability (i) being detected by the server system as an authentication capability of the mobile device via interaction with the mobile device and (ii) corresponding to the first authentication tier, wherein the first authentication tier is selected by the server system for the authentication request over a second authentication tier in connection with the first authentication tier (a) corresponding to an access amount of the access request and (b) not corresponding to a different access amount to which the second authentication tier corresponds, the second authentication tier being different from the first authentication tier;

obtaining the access amount of the access request from the mobile device via the first option on the user interface;

in response to detecting the biometric authentication capability of the mobile device based on a detection of a biometric scanner on the mobile device, generating a prompt for biometric user input to obtain, via the biometric scanner authentication data for completing the access operation with the local device, wherein the authentication data comprises one or more of fingerprint data, retina scan data, iris scan data, heartbeat pattern data, facial recognition data, voice recognition data, or palm vein scan data;

obtaining, from the mobile device via the prompt, the authentication data for completing the access operation with the local device, the authentication data corresponding to the first authentication tier;

granting, based on the authentication data, access to the local device for completing the access operation with the local device; and transmitting, based on the authentication data, an authentication confirmation to the mobile device.

5. The method of claim 4, the operations further comprising:

detecting a fingerprint authentication capability of the mobile device based on a detection of a fingerprint scanner being on the mobile device, wherein generating the authentication request comprises, based on detecting the fingerprint authentication capability of the mobile device, generating the authentication request to include at least one prompt related to fingerprint scanning.

6. The method of claim 4, wherein granting access to the local device for completing the access operation with the local device comprises transmitting, based on the authentication data, dispensing instructions to the local device to dispense one or more items from within the local device to complete the access operation with the local device.

7. The method of claim 4, wherein detecting the mobile device comprises detecting the mobile device as being within a first predetermined distance of the local device while the mobile device is not within a second predetermined distance of the local device, the method further comprising:

subsequently detecting the mobile device as being within the first and second predetermined distances of the local device; and transmitting, based on the authentication data and the mobile device being detected as being within the first and second predetermined distances of the local device, dispensing instructions to the local device to dispense one or more items from within the local device to complete the access operation with the local device.

8. The method of claim 4, wherein granting access to the local device comprises granting, based on the authentication data, granting access to the local device, for completing the access operation with the local device, without a user of the mobile device having to physically interact with the local device before the granting of access to the local device.

9. The method of claim 4, wherein the authentication data comprises one or more of retina scan data, iris scan data, heartbeat pattern data, facial recognition data, voice recognition data, or palm vein scan data.

10. One or more non-transitory computer-readable media storing instructions that, when executed by one or more processors of a server system, cause operations comprising:

in response to (i) a mobile device wirelessly transmitting a short-range wireless signal to a local device local to the mobile device and (ii) the mobile device being detected, based on the short-range wireless signal, being within a predetermined distance of the local device, causing the mobile device to present access initiation options on a user interface of the mobile device, the access initiation options comprising a resource withdrawal or transfer, a card reset, or a call center call using the local device;

in connection with a selection of a first option of the access initiation options via the user interface to initiate an access request for an access operation with the local device, generating an authentication request associated with a biometric authentication capability based on the biometric authentication capability (i) being detected by the server system as an authentication capability of the mobile device via interaction with the mobile device and (ii) corresponding to a first authentication tier that is selected over a second authentication tier in connection with the first authentication tier (a) corresponding to an access amount of the access request and (b) not corresponding to a different access amount to which the second authentication tier corresponds, the second authentication tier being different from the first authentication tier;

obtaining the access amount of the access request from the mobile device via the first option on the user interface;

in response to detecting the biometric authentication capability of the mobile device based on a detection of a biometric scanner on the mobile device, generating a prompt for biometric user input to obtain, via the biometric scanner, authentication data for completing the access operation with the local device, wherein the authentication data comprises one or more of fingerprint data, retina scan data, iris scan data, heartbeat pattern data, facial recognition data, voice recognition data, or palm vein scan data;

obtaining, from the mobile device via the prompt, the authentication data for completing the access operation with the local device, the authentication data corresponding to the first authentication tier;

granting, based on the authentication data, access to the local device for completing the access operation with the local device; and transmitting, based on the authentication data, an authentication confirmation to the mobile device.

11. The one or more non-transitory computer-readable media of claim 10, the operations further comprising:

detecting a fingerprint authentication capability of the mobile device based on a detection of a fingerprint scanner being on the mobile device, wherein generating the authentication request comprises, based on detecting the fingerprint authentication capability of the mobile device, generating the authentication request to include at least one prompt related to fingerprint scanning.

12. The one or more non-transitory computer-readable media of claim 10, wherein granting access to the local device for completing the access operation with the local device comprises transmitting, based on the authentication data, dispensing instructions to the local device to dispense one or more items from within the local device to complete the access operation with the local device.

13. The one or more non-transitory computer-readable media of claim 10, wherein detecting the mobile device comprises detecting the mobile device as being within a first predetermined distance of the local device while the mobile device is not within a second predetermined distance of the local device, the operations further comprising:
   subsequently detecting the mobile device as being within the first and second predetermined distances of the local device; and
   transmitting, based on the authentication data and the mobile device being detected as being within the first and second predetermined distances of the local device, dispensing instructions to the local device to dispense one or more items from within the local device to complete the access operation with the local device.

14. The one or more non-transitory computer-readable media of claim 10, wherein granting access to the local device comprises granting, based on the authentication data, granting access to the local device, for completing the access operation with the local device, without a user of the mobile device having to physically interact with the local device before the granting of access to the local device.

15. The one or more non-transitory computer-readable media of claim 10, wherein the authentication data comprises one or more of retina scan data, iris scan data, heartbeat pattern data, facial recognition data, voice recognition data, or palm vein scan data.

* * * * *